(12) United States Patent
McDaniel et al.

(10) Patent No.: US 7,829,622 B2
(45) Date of Patent: *Nov. 9, 2010

(54) METHODS OF MAKING POLYMER COMPOSITES CONTAINING SINGLE-WALLED CARBON NANOTUBES

(75) Inventors: Neal D. McDaniel, Bartlesville, OK (US); Daniel E. Resasco, Norman, OK (US); Leandro Balzano, Sugar Land, TX (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 941 days.

This patent is subject to a terminal disclaimer.

(21) Appl. No.: 11/705,399

(22) Filed: Feb. 12, 2007

(65) Prior Publication Data

US 2010/0160553 A1 Jun. 24, 2010

Related U.S. Application Data

(63) Continuation-in-part of application No. 11/489,235, filed on Jul. 19, 2006, now abandoned, which is a continuation-in-part of application No. 10/834,351, filed on Apr. 28, 2004, application No. 11/705,399, which is a continuation-in-part of application No. 10/464,041, filed on Jun. 18, 2003, now Pat. No. 7,153, 903.

(60) Provisional application No. 60/773,133, filed on Feb. 13, 2006, provisional application No. 60/465,957, filed on Apr. 28, 2003, provisional application No. 60/390,129, filed on Jun. 19, 2002.

(51) Int. Cl.
*C08K 3/04* (2006.01)

(52) U.S. Cl. .................. 524/496; 524/495; 524/847

(58) Field of Classification Search ............. 524/495, 524/496, 847
See application file for complete search history.

(56) References Cited

U.S. PATENT DOCUMENTS

| | | | |
|---|---|---|---|
| 3,746,657 A | 7/1973 | Miller et al. |
| 4,456,694 A | 6/1984 | Blaskie et al. |
| 4,574,120 A | 3/1986 | Thompson |
| 4,663,230 A | 5/1987 | Tennent |
| 5,165,909 A | 11/1992 | Tennent et al. |
| 5,227,038 A | 7/1993 | Smalley et al. |
| 5,300,203 A | 4/1994 | Smalley |
| 5,405,996 A | 4/1995 | Suzuki et al. |
| 5,424,054 A | 6/1995 | Bethune |
| 5,456,897 A | 10/1995 | Moy et al. |
| 5,482,601 A | 1/1996 | Ohshima et al. |
| 5,500,200 A | 3/1996 | Mandeville et al. |
| 5,543,378 A | 8/1996 | Wang |
| 5,556,517 A | 9/1996 | Smalley |
| 5,560,898 A | 10/1996 | Uchida et al. |
| 5,578,543 A | 11/1996 | Tennent et al. |
| 5,587,141 A | 12/1996 | Ohshima et al. |
| 5,591,312 A | 1/1997 | Smalley |
| 5,603,907 A | 2/1997 | Grochowski |
| 5,641,466 A | 6/1997 | Ebbesen et al. |
| 5,648,056 A | 7/1997 | Tanaka |
| 5,695,734 A | 12/1997 | Ikazaki et al. |
| 5,698,175 A | 12/1997 | Hiura et al. |
| 5,707,916 A | 1/1998 | Snyder et al. |
| 5,744,235 A | 4/1998 | Creehan |
| 5,747,161 A | 5/1998 | Iijima |
| 5,753,088 A | 5/1998 | Olk |
| 5,773,834 A | 6/1998 | Yamamoto et al. |
| 5,780,101 A | 7/1998 | Nolan et al. |
| 5,814,290 A | 9/1998 | Niu et al. |
| 5,877,110 A | 3/1999 | Snyder et al. |
| 5,965,267 A | 10/1999 | Nolan et al. |
| 5,985,232 A | 11/1999 | Howard et al. |
| 5,997,832 A | 12/1999 | Lieber et al. |
| 6,099,965 A | 8/2000 | Tennent et al. |
| 6,221,330 B1 | 4/2001 | Moy et al. |
| 6,312,303 B1 | 11/2001 | Yaniv et al. |
| 6,333,016 B1 | 12/2001 | Resasco et al. |
| 6,346,189 B1 | 2/2002 | Dai et al. |
| 6,401,526 B1 | 6/2002 | Dai et al. |
| 6,413,487 B1 | 7/2002 | Resasco et al. |
| 6,426,134 B1 | 7/2002 | Lavin et al. |
| 6,432,866 B1 | 8/2002 | Tennent et al. |
| 6,479,939 B1 | 11/2002 | Yaniv et al. |
| 6,573,643 B1 | 6/2003 | Kumar et al. |
| 6,580,225 B2 | 6/2003 | Yaniv et al. |
| 6,596,187 B2 | 7/2003 | Coll et al. |
| 6,599,961 B1 | 7/2003 | Pienkowski et al. |

(Continued)

FOREIGN PATENT DOCUMENTS

EP 0 945 402 A1 9/1999

(Continued)

OTHER PUBLICATIONS

PCT/US00/15362, International Search Report, Oct. 17, 2000.

(Continued)

*Primary Examiner*—Peter Szekely
(74) *Attorney, Agent, or Firm*—McAfee & Taft

(57) ABSTRACT

Methods of forming carbon nanotube-polymer composites comprising single-walled carbon nanotubes. The carbon nanotube-polymer composites comprise highly dispersed carbon nanotubes having high melt elasticity and high conductivity.

42 Claims, 26 Drawing Sheets

U.S. PATENT DOCUMENTS

| | | | |
|---|---|---|---|
| 6,656,339 | B2 | 12/2003 | Talin et al. |
| 6,664,722 | B1 | 12/2003 | Yaniv et al. |
| 6,677,015 | B2 | 1/2004 | Himmelmann et al. |
| 6,683,783 | B1 | 1/2004 | Smalley et al. |
| 6,692,717 | B1 | 2/2004 | Smalley et al. |
| 6,699,457 | B2 | 3/2004 | Cortright et al. |
| 6,752,977 | B2 | 6/2004 | Smalley et al. |
| 6,756,025 | B2 | 6/2004 | Colbert et al. |
| 6,761,870 | B1 | 7/2004 | Smalley et al. |
| 6,919,064 | B2 | 7/2005 | Resasco et al. |
| 6,936,233 | B2 | 8/2005 | Smalley et al. |
| 6,939,525 | B2 | 9/2005 | Colbert et al. |
| 6,955,800 | B2 | 10/2005 | Resasco et al. |
| 6,962,892 | B2 | 11/2005 | Resasco et al. |
| 6,994,907 | B2 | 2/2006 | Resasco et al. |
| 7,094,386 | B2 | 8/2006 | Resasco et al. |
| 7,153,903 | B1 * | 12/2006 | Barraza et al. ............... 524/847 |
| 2001/0031900 | A1 | 10/2001 | Margrave et al. |
| 2002/0084410 | A1 | 7/2002 | Colbert et al. |
| 2002/0094311 | A1 | 7/2002 | Smalley et al. |
| 2002/0096634 | A1 | 7/2002 | Colbert et al. |
| 2002/0127169 | A1 | 9/2002 | Smalley et al. |
| 2002/0127171 | A1 | 9/2002 | Smalley et al. |
| 2002/0159944 | A1 | 10/2002 | Smalley et al. |
| 2002/0165091 | A1 | 11/2002 | Resasco et al. |
| 2003/0077515 | A1 | 4/2003 | Chen et al. |
| 2003/0089893 | A1 | 5/2003 | Niu et al. |
| 2003/0091496 | A1 | 5/2003 | Resasco et al. |
| 2003/0147802 | A1 | 8/2003 | Smalley et al. |
| 2003/0175200 | A1 | 9/2003 | Smalley et al. |
| 2003/0180526 | A1 | 9/2003 | Winey et al. |
| 2003/0213939 | A1 | 11/2003 | Narayan et al. |
| 2004/0009346 | A1 | 1/2004 | Jang et al. |
| 2004/0028859 | A1 | 2/2004 | LeGrande et al. |
| 2004/0033429 | A1 | 2/2004 | Castle et al. |
| 2004/0131532 | A1 | 7/2004 | Resasco et al. |
| 2004/0197260 | A1 | 10/2004 | Resasco et al. |
| 2004/0223900 | A1 | 11/2004 | Khabashesku et al. |
| 2004/0234767 | A1 | 11/2004 | Leddy et al. |
| 2005/0054517 | A1 | 3/2005 | Xu et al. |
| 2005/0249656 | A1 | 11/2005 | Smalley et al. |
| 2006/0025515 | A1 | 2/2006 | Scaringe et al. |
| 2006/0039848 | A1 | 2/2006 | Matarredona et al. |
| 2006/0039849 | A1 | 2/2006 | Resasco et al. |
| 2006/0057055 | A1 | 3/2006 | Resasco et al. |

FOREIGN PATENT DOCUMENTS

| | | |
|---|---|---|
| JP | 06-228824 | 8/1994 |
| JP | 11-139815 | 5/1999 |
| WO | WO 97/09272 | 3/1997 |
| WO | WO 98/39250 | 9/1998 |
| WO | WO 98/42620 | 10/1998 |
| WO | WO 00/17102 | 3/2000 |
| WO | WO 00/26138 | 5/2000 |
| WO | WO 00/73205 | 12/2000 |
| WO | WO 02/060813 A2 | 8/2002 |
| WO | WO 03/048038 | 6/2003 |
| WO | WO 04/001107 | 12/2003 |

OTHER PUBLICATIONS

PCT/US02/23155, International Search Report, Jul. 21, 2003.

PCT/US03/19664, International Search Report, Mar. 31, 2004.

PCT/US04/12986, International Search Report, May 26, 2005.

EP 01 93 9821, European Search Report, Jun. 9, 2004.

Alvarez, et al., "Synergism of Co and Mo in the catalytic production of single-wall carbon nanotubes by decomposition of CO", *Elsevier Science Ltd.*, Carbon 39 (2001), pp. 547-558.

Anderson et al., "50 nm Polystyrene Particles via Miniemulsion Polymerization", Macromolecules, American Chemical Society, vol. 35, pp. 574-576, 2002.

Bandow et al., "Effect of the Growth Temperature on the Diameter Distribution and Chirality of Single-Wall Carbon Nanotubes", *The American Physical Society*, Physical Review Letters, vol. 80, No. 17, (1998) pp. 3779-3782.

Bandow et al., "Purification of Single-Wall Carbon Nanotubes by Microfiltration," *J.Phys.Chem.B*, vol. 101, (1997) pp. 8839-8842.

Bahr et al., "Functionalization of Carbon Nanotubes by Electrochemical Reduction of Aryl Diazonium Salts: A Bucky Paper Electrode," *J. Am. Chem. Cos.* vol. 123 (2001) pp. 6536-6542.

Bethune et al. "Cobalt-Catalysed Growth of Carbon Nanotubes with Single-Atomic-Layer Walls", Letters to Nature, vol. 363, pp. 605-607, Jun. 17, 1993.

Bower et al., "Deformation of Carbon Nanotubes in Nanotube-Polymer Composites", Applied Physics Letters, vol. 74, No. 22, pp. 3317-3319, May 31, 1999.

V. Brotons et al., "Catalytic influence of bimetallic phases for the synthesis of single-walled carbon nanotubes", Journal of Molecular Catalysis, A: Chemical, vol. 116, pp. 397-403, Dec. 16, 1997.

Buffa et al., "Side-Wall Functionalization of Single-Walled Carbon Nanotubes with 4-Hydroxymethylaniline Followed by Polymerization of ε-Caprolactone," *Macromolecules*, vol. 38, No. 20 (2005) pp. 8258-8263.

Cadek et al., "Mechanical and Thermal Properties of CNT and CNF Reinforced Polymer Composites", Structural and Electronic Properties of Molecular Nanostructures, American Institute of Physics, pp. 562-565, 2002.

Cassell et al., "Large Scale CVD Synthesis of Single-Walled Carbon Nanotubes", J. Phys. Chem. B., American Chemical Society, vol. 103, pp. 6484-6492, 1999.

Chattopadhyay, et al., "A Route for Bulk Separation of Semiconducting from Metallic Singel-Wall Carbon Nanotubes", Journal of American Chemical Society, vol. 125, No. 11, pp. 3370-3375, 2003.

Chaturvedi et al., "Properties of pure and sulfided NiMoO4 and CoMoO4 catalysts: TPR, XANES and time-resolved XRD studies", Database Accession No. EIX99044490981 XP002246342, Proceedings of the 1997 Mrs Fall Symposium, Boston, MA, USA, Dec. 2-4, 1997; Mater Res Soc Symp Proc, Materials Research Society Symposium-Proceedings, Recent Advances in Catalytic Materials, 1998, Mrs. Warrendale, PA, USA.

Che et al., "Chemical Vapor Deposition Based Synthesis of Carbon Nanotubes and Nanofibers Using a Template Method", Chemical Mater., vol. 10, pp. 260-267, 1998.

Chen et al., "Bulk Separative Enrichment in Metallic or Semiconducting Single-Walled Carbon Nanotubes", Nano Letters, xxxx vol. 0, No. 0, page est: 4.9 A-E.

Chen et al., "Dissolution of Full-Length Single-Walled Carbon Nanotubes", J. Phys. Chem. B, vol. 105, pp. 2525-2528, 2001.

Chen et al., "Growth of carbon nanotubes by catalytic decompositon of $CH_4$ or CO on a Ni-MgO catalyst", Carbon vol. 35, No. 10-11, pp. 1495-1501, 1997.

Cheng et al.,"Bulk Morphology and Diameter Distribution of Single-Walled Carbon Nanotubes Synthesized by Catalytic Decomposition of Hydrocarbons", Chemical Physics Letters, vol. 289, pp. 602-610, Jun. 19, 1998.

Cheng et al., "Large-Scale and Low-Cost Synthesis of Single-Walled Carbon Nanotubes by the Catalytic Pyrolysis of Hydrocarbons", Applied Physics Letters, vol. 72, No. 25, pp. 3282-3284, Jun. 22, 1998.

Dai et al., "Single-Wall Nanotubes Produced by Metal-Catalyzed Disproportionation of Carbon Monoxide", Chemical Physics Letters, vol. 260, pp. 471-475, Sep. 27, 1996.

Database, Accession No. 1999-366878, Cano, "Canon KK", XP-002149235, May 25, 1999.

De Boer et al., "The cobalt-molybdenum interaction in $CoMo/SiO_2$ catalysts: A CO-oxidation study", *Elsevier Science Ltd.*, Solid State Ionics 63-65 (1993), pp. 736-742.

Deng et al., "Hybrid Composite of Polyaniline Containing Carbon Nanotube", Chinese Chemical Letters, vol. 12, pp. 1037-1040, 2001.

Dyke et al., "Unbundled and Highly Fucntionalized Carbon Nanotubes from Aqueous Reactions," *NanoLetters*, vol. 3, No. 9 (2003) pp. 1215-1218.

Fonseca et al., "Synthesis of single-and multi-wall carbon nanotubes over supported catalysts", Applied Physics A, vol. 67, pp. 11-22, 1998.

Franco et al., "Electric and magnetic properties of polymer electrolyte/carbon black composites", Solid State Ionics 113-115, pp. 149-160, 1998.

Gaspar et al., "The influence of Cr precursors in the ethylene polymerization on $Cr/SiO_2$ catalysts", Applied Catalysis A: General, vol. 227, pp. 240-254, 2002.

Gong et al., "Surfactant-Assisted Processing of Carbon Nanotube/Polymer Composites", Chemical Material, vol. 12, pp. 1049-1052, 2000.

Govindaraj et al., "Carbon structures obtained by the disproportionation of carbon monoxide over nickel catalysts", Materials Research Bulletin, vol. 33, No. 4, pp. 663-667, 1998.

Hafner et al., "Catalytic growth of single-wall carbon nanotubes from metal particles", Chemical Physics Letters, vol. 296, pp. 195-202, 1998.

Hamon et al., "End-group and defect analysis of soluble single-walled carbon nanotubes", Chemical Physics Letters, vol. 347 pp. 8-12, 2001.

Hernadi et al., "Catalytic synthesis of carbon nanotubes using zeolite support", Elsevier Science Inc. 1996.

Hwang et al., "Carbon nanotube reinforced ceramics", Journal of Materials Chemistry, vol. 11, pp. 1722-1725, 2001.

Hyperion Catalysis International Website; http://www.fibrils.com/esd.htm;"Unique Slough Resistant SR™ Series ESD Thermoplastic Product Line Offers Reduced Particle Contamination for Demanding Electronic Applications," and Hyperion Homepage http://www.fibrils.com.

Iijima, "Helical Microtubules of Graphitic Carbon", Letters to Nature, vol. 354, pp. 56-58, Nov. 7, 1991.

Iijima et al., "Single-Shell Carbon Nanotubes of 1-nm Diameter", Letters to Nature, vol. 363, pp. 603-605, Jun. 17, 1993.

Ivanov et al., "The Study of Carbon Nanotubules Produced by Catalytic Method", Chemical Physics Letters, vol. 223, pp. 329-335, 1994.

Jin et al., "Alignment of Carbon nanotubes in a polymer matrix by mechanical stretching", Applied Physics Letters, vol. 73, No. 9, pp. 1197-1199, Aug. 31, 1998.

Journet et al., "Large-Scale Production of Single-Walled Carbon Nanotubes by the Electric-Arc Technique", Letters to Nature, vol. 338, pp. 756-758, Aug. 21, 1997.

Kitiyanan et al., "Controlled production of single-wall carbon nanotubes by catalytic decomposition of CO on bimetallic Co-Mo catalysts", Chemical Physics Letters, vol. 317, pp. 497-503, Feb. 4, 2000.

Krishnankutty et al., "The Effect of Copper on the Structural Characteristics of Carbon Filaments Produced from Iron Catalyzed Decomposition of Ethylene," Catalysts Today, vol. 37, pp. 295-307, 1997.

Landfester et al., "Miniemulsion polymerization", Jun. 4, 2003, http://www.mpikg-golm.mpg.de/kc/landfester/, 1-22.

Landfester, "Polyreactions in Miniemulsions", Macromol. Rapid Commun., vol. 22, No. 12, pp. 896-936, 2001.

Landfester, "The Generation of Nanoparticles in Miniemulsions", Advanced Materials, vol. 13, No. 10, pp. 765-768, May 17, 2001.

Li et al., "Large-Scale Synthesis of Aligned Carbon Nanotubes", Science, vol. 274, pp. 1701-1703, Dec. 6, 1996.

McCarthy et al., "A Microscopic and Spectroscopic Study of Interactions between Carbon Nanotubes and a Conjugated Polymer", J. Phys. Chem. B, vol. 106, pp. 2210-2216, 2001.

Niyogi et al., Communications to the Editor, "Chromatographic Purification of Soluble Single-walled Carbon Nanotubes (s-SWNTs)", J. Am. Chem. Soc., vol. 123, pp. 733-734, 2001.

Patent Abstracts of Japan, vol. 1996, No. 12, Dec. 26, 1996, and JP 0 8 198611 A (NEC Corp), Aug. 6, 1996, Abstract.

Pompeo et al., "Water Solubilization of Single-Walled Carbon Nanotubes by Functionalization with Glucosamine", Nano Letters, American Chemical Society, vol. 2, No. 4, pp. 369-373, 2002.

Qian et al., "Load transfer and deformation mechanisms in carbon nanotube-polystyrene composites",Applied Physics Letters, American Institute of Physics, vol. 76, No. 20, pp. 2868-2870, May 15, 2000.

Razavi, "Metallocene catalysts technology and environment", Chemistry 3, pp. 615-625, 2000.

Rinzler et al., "Large-Scale Purification of Single-Wall Carbon Nanotubes: Process, Product, and Characterization," Applied Physics A, vol. 67, pp. 29-37, 1998.

Saito, et al, "Electronic structure of chiral graphene tubules," *Appl. Phys. Lett.* vol. 60, No. 18 (May 4, 1992) pp. 2204-2206.

Sears et al., "Raman scattering from polymerizing styrene. I. Vibrational mode analysis *a*)", J. Chem. Phys., vol. 75, No. 4, pp. 1589-1598.

Shaffer et al., "Fabrication and Characterization of Carbon Nanotube/Poly (vinyl alcohol) Composites**", Advanced Materials, vol. II, No. 11, pp. 937-941, 1999.

Tahji et al., "Purification Procedure for Single-Wall Nanotubes", J. Phys. Chem. B, vol. 101, pp. 1974-1978 (1997).

Thess et al., "Crystalline Ropes of Metallic Carbon Nanotubes", Science, vol. 273, pp. 483-487, Jul. 26, 1996.

Tiarks et al., "Encapsulation of Carbon Black by Miniemulsion Polymerization", Macromol. Chem. Phys., vol. 202, pp. 51-60, 2001.

Tiarks et al., "Silica Nanoparticles as Surfactants and Fillers for Latexes Made by Miniemulsion Polymerization", Langmuir, American Chemical Society, vol. 17, pp. 5775-5780, 2001.

Willems et al., "Control of the outer diameter of thin carbon nanotubes synthesized by catalytic decomposition of hydrocarbons", Chemical physics Letters, vol. 317, pp. 71-76, Jan. 28, 2000.

Yakobson et al.; "Fullerene Nanotubes: $C_{1,000,000}$ and Beyond," American Scientist, vol. 85, pp. 324-337, Jul.-Aug. 1997.

Zhao, et al., "Chromatographic Purification and Properties of Soluble Single-Walled Carbon Nanotubes", American Chemical Society, Page Est: 4.1, pp. A-E, Feb. 22, 2001.

Zhu et al., "Direct Synthesis of Long Single-Walled Carbon Nanotube Strands", Science, vol. 296, pp. 884-886, May 13, 2002.

U.S. Appl. No. 60/101,093, filed Sep. 18, 1998, Smalley et al.

U.S. Appl. No. 60/106,917, filed Nov. 3, 1998, Smalley et al.

U.S. Appl. No. 60/114,588, filed Dec. 31, 1998, Smalley et al.

U.S. Appl. No. 60/117,287, filed Jan. 26, 1999, Smalley et al.

U.S. Appl. No. 60/161,728, filed Oct. 27, 1999, Smalley et al.

Alvarez, et al., "Synergism of Co and Mo in the catalytic production of single-wall carbon nanotubes by decomposition of CO", *Elsevier Science Ltd.*, Carbon 39 (2001—no month), pp. 547-558.

Anderson et al., "50 nm Polystyrene Particles via Miniemulsion Polymerization", Macromolecules, American Chemical Society, vol. 35, pp. 574-576, (Dec. 18, 2001).

Bandow et al., "Effect of the Growth Temperature on the Diameter Distribution and Chirality of Single-Wall Carbon Nanotubes", *The American Physical Society*, Physical Review Letters, vol. 80, No. 17, (Apr. 27, 1998) pp. 3779-3782.

Bandow et al., "Purification of Single-Wall Carbon Nanotubes by Microfiltration," *J.Phys.Chem.B*, vol. 101, (1997—no month) pp. 8839-8842.

Bahr et al., "Functionalization of Carbon Nanotubes by Electrochemical Reduction of Aryl Diazonium Salts: A Bucky Paper Electrode," *J. Am. Chem. Cos.* vol. 123 (Jun. 14, 2001) pp. 6536-6542.

Brotons et al., "Catalytic influence of bimetallic phases for the synthesis of single-walled carbon nanotubes", Journal of Molecular Catalysis, A: Chemical, vol. 116, pp. 397-403, Dec. 16, 1997.

Buffa et al., "Side-Wall Functionalization of Single-Walled Carbon Nanotubes with 4-Hydroxymethylaniline Followed by Polymerization of ε-Caprolactone," *Macromolecules*, vol. 38, No. 20 (2005—no month) pp. 8258-8263.

Cadek et al., "Mechanical and Thermal Properties of CNT and CNF Reinforced Polymer Composites", Structural and Electronic Properties of Molecular Nanostructures, American Institute of Physics, pp. 562-565, (2002—no month).

Cassell et al., "Large Scale CVD Synthesis of Single-Walled Carbon Nanotubes", J. Phys. Chem. B., American Chemical Society, vol. 103, pp. 6484-6492, (Jul. 20, 1999).

Chattopadhyay, et al., "A Route for Bulk Separation of Semiconducting from Metallic Singel-Wall Carbon Nanotubes", Journal of American Chemical Society, vol. 125, No. 11, pp. 3370-3375, (Feb. 22, 2003).

Chaturvedi et al., "Properties of pure and sulfided NiMo04 and CoMo04 catalysts: TPR, XANES and time-resolved XRD studies", Database Accession No. EIX99044490981 XP002246342, Proceedings of the 1997 Mrs Fall Symposium, Boston, MA, USA, Dec. 2-4, 1997; Mater Res Soc Symp Proc, Materials Research Society Symposium-Proceedings, Recent Advances in Catalytic Materials, (1998—no month) Mrs Warrendale, PA, USA.

Che et al., "Chemical Vapor Deposition Based Synthesis of Carbon Nanotubes and Nanofibers Using a Template Method", Chemical Mater., vol. 10, pp. 260-267, (Jan. 19, 1998).

Chen et al., "Bulk Separative Enrichment in Metallic or Semiconducting Single-Walled Carbon Nanotubes", Nano Letters, vol. 3, No. 9, pp. 1245-1249, Sep. 2003.

Chen et al., "Dissolution of Full-Length Single-Walled Carbon Nanotubes", J. Phys. Chem. B, vol. 105, pp. 2525-2528, (Mar. 10, 2001).

Chen et al., "Growth of carbon nanotubes by catalytic decomposition of $CH_4$ or CO on a Ni-MgO catalyst", Carbon vol. 35, No. 10-11, pp. 1495-1501, (1997—no month).

De Boer et al., "The cobalt-molybdenum interaction in $CoMo/SiO_2$ catalysts: A CO-oxidation study", *Elsevier Science Ltd.*, Solid State Ionics 63-65 (1993—no month), pp. 736-742.

Deng et al., "Hybrid Composite of Polyaniline Containing Carbon Nanotube", Chinese Chemical Letters, vol. 12, pp. 1037-1040, (2001—no month).

Dyke et al., "Unbundled and Highly Functionalized Carbon Nanotubes from Aqueous Reactions," *NanoLetters*, vol. 3, No. 9 (2003—no month) pp. 1215-1218.

Fonseca et al., "Synthesis of single-and multi-wall carbon nanotubes over supported catalysts", Applied Physics A, vol. 67, pp. 11-22, (1998—no month).

Franco et al., "Electric and magnetic properties of polymer electrolyte/carbon black composites", Solid State Ionics 113-115, pp. 149-160, (1998—no month).

Gaspar et al., "The influence of Cr precursors in the ethylene polymerization on $Cr/SiO_2$ catalysts", Applied Catalysis A: General, vol. 227, pp. 240-254, (2002—no month).

Gong et al., "Surfactant-Assisted Processing of Carbon Nanotube/Polymer Composites", Chemical Material, vol. 12, pp. 1049-1052, (Mar. 17, 2000).

Govindaraj et al., "Carbon structures obtained by the disproportionation of carbon monoxide over nickel catalysts", Materials Research Bulletin, vol. 33, No. 4, pp. 663-667, (1998—no month).

Hafner et al., "Catalytic growth of single-wall carbon nanotubes from metal particles", Chemical Physics Letters, vol. 296, pp. 195-202, (Oct. 30, 1998).

Hamon et al., "End-group and defect analysis of soluble single-walled carbon nanotubes", Chemical Physics Letters, vol. 347 pp. 8-12, (Oct. 19, 2001).

Hernadi et al., "Catalytic synthesis of carbon nanotubes using zeolite support", Elsevier Science Inc. (1996—no month).

Hwang et al., "Carbon nanotube reinforced ceramics", Journal of Materials Chemistry, vol. 11, pp. 1722-1725, (May 1, 2001).

Hyperion Catalysis International Website; http://www.fibrils.com/esd.htm ;"Unique Slough Resistant SR™ Series ESD Thermoplastic Product Line Offers Reduced Particle Contamination for Demanding Electronic Applications," and Hyperion Homepage http://www.fibrils.com, Nov. 19, 2001.

Ivanov et al., "The Study of Carbon Nanotubules Produced by Catalytic Method", Chemical Physics Letters, vol. 223, pp. 329-335, (Jun. 24, 1994).

Krishnankutty et al., "The Effect of Copper on the Structural Characteristics of Carbon Filaments Produced from Iron Catalyzed Decomposition of Ethylene," Catalysts Today, vol. 37, pp. 295-307, (1997—no month).

Landfester, "Polyreactions in Miniemulsions", Macromol. Rapid Commun., vol. 22, No. 12, pp. 896-936, (2001—no month).

McCarthy et al., "A Microscopic and Spectroscopic Study of Interactions between Carbon Nanotubes and a Conjugated Polymer", J. Phys. Chem. B, vol. 106, pp. 2210-2216, (Feb. 8, 2001).

Niyogi et al., Communications to the Editor, "Chromatographic Purification of Soluble Single-walled Carbon Nanotubes (s-SWNTs)", J. Am. Chem. Soc., vol. 123, pp. 733-734, (Jan. 9, 2001).

Pompeo et al., "Water Solubilization of Single-Walled Carbon Nanotubes by Functionalization with Glucosamine", Nano Letters, American Chemical Society, vol. 2, No. 4, pp. 369-373, (Jan. 26, 2002).

Qian et al., "Load transfer and deformation mechanisms in carbon nanotube-polystyrene composites", Applied Physics Letters, American Institute of Physics, vol. 76, No. 20, pp. 2868-2870, May 15, 2000.

Razavi, "Metallocene catalysts technology and environment", Chemistry 3, pp. 615-625, (2000—no month).

Rinzler et al., "Large-Scale Purification of Single-Wall Carbon Nanotubes: Process, Product, and Characterization," Applied Physics A, vol. 67, pp. 29-37, (1998—no month).

Sears et al., "Raman scattering from polymerizing styrene. I. Vibrational mode analysis $^a)$", J. Chem. Phys., vol. 75, No. 4, pp. 1589-1598 (Aug. 15, 1981).

Shaffer et al., "Fabrication and Characterization of Carbon Nanotube/Poly (vinyl alcohol) Composites**", Advanced Materials, vol. II, No. 11, pp. 937-941, (1999—no month).

Tohji et al., "Purification Procedure for Single-Wall Nanotubes", J. Phys. Chem. B, vol. 101, pp. 1974-1978 (1997—no month).

Tiarks et al., "Encapsulation of Carbon Black by Miniemulsion Polymerization", Macromol. Chem. Phys., vol. 202, pp. 51-60, (2001—no month).

Tiarks et al., "Silica Nanoparticles as Surfactants and Fillers for Latexes Made by Miniemulsion Polymerization", Langmuir, American Chemical Society, vol. 17, pp. 5775-5780, (Aug. 21, 2001).

PCT/US07/03778, Int'l Search Report, Apr. 18, 2008.

* cited by examiner

METHODS OF MAKING POLYMER COMPOSITES CONTAINING SINGLE-WALLED CARBON NANOTUBES

CROSS REFERENCE TO RELATED APPLICATIONS

The present application claims priority to U.S. Provisional Application No. 60/773,133, filed Feb. 13, 2006.

The present application is also a continuation-in-part of U.S. Ser. No. 11/489,235, filed Jul. 19, 2006 now abandoned, which is a continuation-in-part of U.S. Ser. No. 10/834,351, filed Apr. 28, 2004, which claims priority to U.S. Provisional Application No. 60/465,957, filed Apr. 28, 2003.

The present application is also a continuation-in-part of U.S. Ser. No. 10/464,041, filed Jun. 18, 2003 now U.S. Pat. No. 7,153,903, which claims priority to U.S. Provisional Application No. 60/390,129, filed Jun. 19, 2002.

BACKGROUND OF THE INVENTION

Of the many different types of commercial plastics, both engineering and commodity types, linear polyethylenes (PE) hold a special place. Despite high resistance to chemicals, high electrical resistance, and the ability to be easily molded by numerous methods, this plastic is still the least costly resin available commercially. Certain grades of PE also offer strong resistance to diffusion by moisture and one grade in particular, called ultrahigh molecular weight (UHMW) PE, is considered tougher than any other commercial plastic, even more abrasion resistant than steel. UHMW PE is useful for bullet-proof vests, long-lived gears and even human bone replacement.

One characteristic of PE that is highly valued during processing is its melt elasticity. This property, also called "shear-thinning", is determined to a limited extent by the breadth of the molecular weight distribution and the amount of long chain branching. Thus, certain grades made from chromium and metallocene catalysts exhibit some shear-thinning character, while other PE grades, particularly those from Ziegler-Natta catalysts, display little. The degree of melt elasticity in PE is important because it determines much of the processing behavior of the molten polymers. Polymers with a high degree of elasticity, or shear-thinning character, flow easily under stress at high shear rates, but resist flow when allowed to stand under low or zero strain. In blow molding for example, the parison is extruded easily from the die under pressure, but once the molten tube has exited the die and there is no flow, it resists being pulled out of shape by gravity. Likewise, melt elasticity influences (1) swell during blow molding, (2) bubble stability, orientation, melt fracture, and extensional viscosity in film blowing, (3) melt strength in geomembrane resins, (4) sag during large diameter pipe extrusion, and even (5) various mechanical properties in the finished articles.

One method of improving the elasticity of the molten PE polymer, as well as some of the physical characteristics, is to blend in fillers such as calcium carbonate, talc, clay nanocomposites, carbon black, as well as carbon and glass fibers. In general these materials do increase the shear thinning character of the polymer, but to make a significant difference so much filler is required that it becomes impractical for other reasons. Although in some applications a higher conductivity would be desired, these fillers usually contribute little or nothing to the conductivity of the polymer composite.

Another advantage of highly shear thinning resins is their behavior during a fire. While not actually fire retardant, such materials do tend to hold together better during combustion, with less running or spattering that can spread the fire. Although polymers with high levels of long chain branching can be shear thinning, they also tend to have a high $E_a$, that is, a high activation energy for melt viscosity. This means than the melt viscosity decreases sharply with increasing temperature. Nonpolymeric fillers, on the other hand, tend to lower $E_a$, meaning that the viscosity contribution from the filler is less affected by temperature, allowing the low-shear viscosity to remain high even during a fire.

Conductivity is another feature that is often desirable in plastics. PE and polypropylene (PP) are not naturally conductive, and their use in chemical storage, fuel tanks, drums and other applications often requires grounding. This is usually accomplished not by modifying the resin itself, but by the addition of some form of conductive paint or metal attachment, which usually adds to the difficulty and cost of production. The usual fillers are not conductive at all; metal powders are the single exception, and an impractically large amount is required to make the final article conductive.

It would be desirable therefore to be able to produce polymer composites having high shear thinning character (high melt elasticity) which are also highly conductive.

BRIEF DESCRIPTION OF THE DRAWINGS

FIG. 4 is a photograph showing composite C9 from Cabosil EH-5, before and after intensive mixing extrusion 0.2% NT, 1 sq in.

FIG. 8 is a photograph showing composite B5, from Syloid 244 SS-NT in PE/TCB solution. 1 sq in.

FIG. 9 is a photograph showing composite D3, magnesia gelled around NT suspension, followed by polymerization: (a) unwashed, and (b) HCl washed. 1 sq in.

FIG. 10 is a photograph showing composite D2, magnesia gelled around NT suspension, followed by polymerization. 1 sq in.

FIG. 11 is a photograph showing composite D4 formed by coating pure NT with pure Ziegler-Natta components, then polymerizing ethylene: (a) as formed, and (b) after high intensity extrusion. 0.5×0.5 in.

DESCRIPTION OF THE INVENTION

Figure 1:
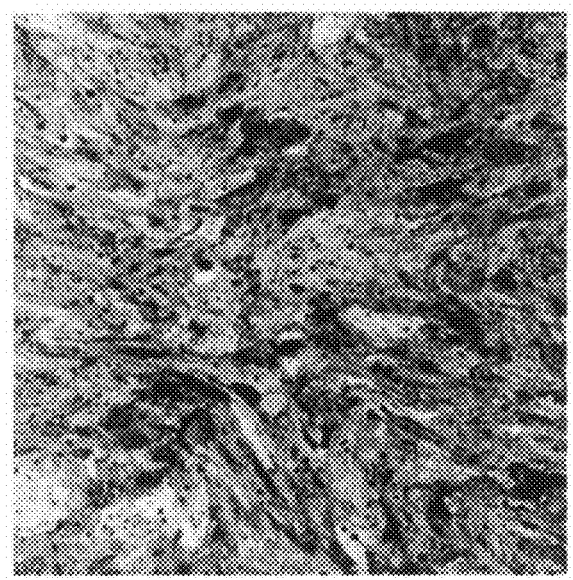
FIG. 1 is a photograph showing heterogeneity in a 1 in×1 in film obtained by polymerization on a Cr-based SS-NT (C14).

The present invention is directed to polymer composites comprising single-walled carbon nanotubes (SWNTs) and which have high shear thinning characteristics and which are highly conductive. The SWNTs used to produce the polymer composites preferably comprise SWNTs still associated with the catalytic material (metal catalyst) used to produce them, for example as described in U.S. Ser. No. 10/834,351 and U.S. Pat. No. 6,333,016, each of which is hereby expressly incorporated by reference herein in its entirety.

The present invention contemplates, in one embodiment, carbon nanotube-polymer composites formed from a mixture comprising (1) single-walled carbon nanotubes (SWNTs) grown on catalysts comprising a support material (e.g., silica) and an amount of catalytic metal, (e.g., cobalt and molybdenum) disposed on the support material, (2) a polymerization catalyst, disposed either on the support material or on the SWNTs (or both), and (3) one or more types of monomer.

In another embodiment, the present invention contemplates carbon nanotube-polymer composites formed from a mixture comprising (1) SWNTs having a polymerization catalyst disposed thereon, and (2) one or more types of monomers.

The SWNT polymer composites (carbon nanotube-polymer composites) contemplated herein have melt viscosity and electrical resistance characteristics which are improved over other polymers or polymer composites filled with other non-nanotube materials such as carbon black, titanium dioxide, magnetite, calcium carbonate and silica. Thermoplastic polymers are particularly contemplated herein, and more particularly, polyolefin polymers.

Polyolefin polymers such as PE, are well known and are useful in many applications. In particular, linear PE polymers possess properties which distinguish them from other PE polymers, such as branched ethylene homopolymers commonly referred to as LDPE (low density polyethylene). Certain of these properties are described by Anderson et al., U.S. Pat. No. 4,076,698.

A particularly useful polymerization medium for producing PE and PP polymers is a gas phase process. Examples of such are given in U.S. Pat. Nos. 3,709,853; 4,003,712; 4,011,382; 4,302,566; 4,543,399; 4,882,400; 5,352,749; and 5,541,270, and Canadian Patent No. 991,798, and Belgian Patent No. 839,380.

Metallocene catalysts are known, and can be used herein, for polymerizing and interpolymerizing monomers, including olefins such as ethylene. Metallocene catalysts comprise at least one transition metal component having at least one moiety selected from substituted or unsubstituted cyclopentadienyl, substituted or unsubstituted pentadienyl, substituted or unsubstituted pyrrole, substituted or unsubstituted phosphole, substituted or unsubstituted arsole, substituted or unsubstituted boratabenzene, and substituted or unsubstituted carborane, and at least one co-catalyst component. Typical organometallic co-catalysts are alkyl aluminoxanes, such as methyl aluminoxane, and boron containing compounds such as tris(perfluorophenyl)boron and salts of tetrakis(perfluorophenyl)borate. The metallocene catalysts can be supported on an inert porous particulate carrier.

The process of the present invention is particularly suitable for the production of homopolymers of monomers, such as olefins, particularly ethylene, and/or copolymers, terpolymers, and the like, of monomers, such as olefins, particularly ethylene, and at least one or more other olefin(s). Preferably the olefins are alpha-olefins. The olefins, for example, may contain from 2 to 16 carbon atoms. Particularly preferred for preparation herein by the process of the present invention are polyethylenes. Such polyethylenes are preferably homopolymers of ethylene and inter-polymers of ethylene and at least one α-olefin wherein the ethylene content is at least about 50% by weight of the total monomers involved.

Exemplary olefins that may be utilized herein include, but are not limited to, ethylene, propylene, 1-butene, 1-pentene, 1-hexene, 1-heptene, 1-octene, 4-methylpent-1-ene, 1-decene, 1-dodecene, 1-hexadecene, polyenes such as 1,3-hexadiene, 1,4-hexadiene, butadiene, cyclopentadiene, dicyclopentadiene, ethylidene norbornene, 4-vinylcyclohex-1-ene, dicyclopentadiene, 1,5-cyclooctadiene, 5-vinylidene-2-norbornene, and 5-vinyl-2-norbornene, and olefins formed in situ in the polymerization medium. When olefins are formed in situ in the polymerization medium, the formation of polyolefins containing long chain branching may occur.

Other monomers that can be used to form homopolymers or copolymers in the present invention include, but are not limited to, styrenes, isoprenes, adipic acids, hexamethylene diamines, urethanes, acrylic acids, acrylates including but not limited to methyl methacrylate, butyl methacrylate, lauryl methacrylate, dodecyl methacrylate, and stearyl methacrylate, acrylamides, acrylonitrile, vinyl chlorides, vinyls, vinyl benzyl chloride, vinyl acetate, acetates, arylacetylenes, fluorinated arylacetylenes, ethylene glycols, terephthalates, chlorinated hydrocarbons, fluorinated hydrocarbons, diisocyanates, dichlorides, epoxy resins (e.g., diamine/diepoxide), bisphenol A (BPA), and combinations thereof.

Polymers thus contemplated for use in the present invention include, but are not limited to, polyethylenes terephthalates, polyvinyl chlorides, polypropylenes, polystyrenes, polyurethanes, polytetrafluoroethylenes, polyamides, and polyacrylamides.

In a preferred embodiment, the process of the present invention is applicable to the polymerization of all monomers, thermoplastics, and olefins that can be polymerized, for example by using a catalyst known in the art, and are in a preferred embodiment α-olefins having 2 to 12 carbon atoms. For example, it is suitable for the homopolymerization of such α-olefins as ethylene, propylene, 1-butene, 1-hexene and 4-methyl-pentene and the copolymerization of ethylene and an α-olefin having 3-12 carbon atoms such as propylene, 1-butene, 1-hexene and 4-methylpentene-1, the copolymerization of propylene and 1-butene and the copolymerization of ethylene and one or more α-olefins.

Copolymerization with dienes is also preferable for the modification of polyolefins. Examples of diene compounds which may be used for this purpose include, but are not limited to, butadiene, 1,4-hexadiene, ethylidene norbornene and dicyclopentadiene. The comonomer content in the copolymerization may be selected optionally. For instance, when ethylene and an α-olefin having 3-12 carbon atoms is copolymerized, the α-olefin content in the copolymer is preferably 0-40 molar %, more preferably 0-30 molar %.

The present invention particularly contemplates a process for the improved distribution of SWNTs in polymers such as polyolefins (including, but not limited to, HDPE, LLDPE, PP, and PMP) wherein SWNTs are grown on a polymerization grade silica support (or other support material) to form an "as produced" SWNT-catalyst composition. Types of support material which may be used in the catalyst used to form "as-produced" SWNT-catalyst compositions (also referred to herein as "carbon nanotube product") include, but are not limited to, silica, alumina, MgO, $ZrO_2$, aluminum-stabilized magnesium oxides, $Al_2O_3$, La-stabilized aluminas, precipitated silicas, fumed silicas, silica gel, high porosity silica, mesoporous silicas including MCMs, MCM-41, and SBA-15, zeolites including Y, beta, mordenite, and KL, and wherein silicas may comprise for example Cabosil EH5, Syloid 244, MS3050, Hisil 210, or colloidal silica Ludox. Further, the metal of the metal catalyst may be at least one of a Group VIII, Group VIb, Group Vb, or lanthanide metal, or rhenium, or combinations thereof. More particularly, the metal may be at least one of Co, Ni, Ru, Rh, Fe, Pd, Ir, Pt, Cr, Mo, W, Re, or Nb, or combinations thereof. Preferably, the metal catalyst comprises at least one Group VIII metal and at least one Group VIb metal, for example Co and Mo, disposed on a silica support material.

The SWNT-catalyst composition (SWNT-metal catalyst composition) is preferably treated to be converted into a polymerization catalyst. Polymerization catalyst types include but are not limited to: Ziegler-Natta type (which is also defined herein as including original Ziegler catalysts), Phillips (chromium) type, and Metallocenes. The treated SWNT-metal catalyst composition is thus converted into a SWNT-polymerization catalyst, which may then be combined with a quantity of one or more monomers, such as an olefin, wherein the monomers are allowed to be polymerized or copolymerized by said SWNT-polymerization catalyst to form a polymer composition having SWNTs therein. In this process the dynamic melt viscosity of the SWNT-polymer composite is increased by at least 10 fold at a frequency of 0.1 rad/sec for example as compared to the same polymer made without the SWNT-catalyst composition. The electrical resistance of the polymer composite is less than $10^9$ ohm-cm, and preferably less than $10^8$ ohm-cm, $10^7$ ohm-cm, $10^6$ ohm-cm, $10^5$ ohm-cm, $10^4$ ohm-cm, $10^3$ ohm-cm, $10^2$ ohm-cm or $10^1$ ohm-cm.

Alternatively, the metal catalyst used to form the SWNTs may be converted into a polymerization catalyst (using methods described elsewhere herein) prior to the metal catalyst being used to catalyze formation of SWNTs thereon, then, after production of the carbon nanotube product (i.e., SWNT on the metal catalyst), the carbon nanotube-polymerization catalyst thus produced is combined with a monomer for production of the carbon nanotube-polymer composite as contemplated elsewhere herein. The metal catalyst of the metal catalyst-polymerization catalyst (pre-nanutobe) can comprise any of the metal catalysts described herein, and the metal catalyst-polymerization catalyst can be used to form any of the carbon nanotube-polymerization catalyst compositions, and thus any carbon nanotube-polymer composite, described herein.

The invention further contemplates a composite made by the process described herein. The invention contemplates a SWNT-polymer composite preferably comprising at least 1%, 5%, 10%, 20%, 30%, 40%, 50%, 60%, 70%, 80%, 90%, 95%, or 99.99% polymer and a quantity of SWNTs (e.g., 0.001%-10% to 20% to 30% or more) which exhibits electrical resistance less than $10^9$ ohm-cm, and preferably less than $10^8$ ohm-cm, $10^7$ ohm-cm, $10^6$ ohm-cm, $10^5$ ohm-cm, $10^4$ ohm-cm, $10^3$ ohm-cm, $10^2$ ohm-cm or $10^1$ ohm-cm. The SWNT-polymer composite may preferably comprise from 0.001%-5% SWNTs which exhibits electrical resistance less than $10^9$ ohm-cm, and preferably less than $10^8$ ohm-cm, $10^7$ ohm-cm, $10^6$ ohm-cm, $10^5$ ohm-cm, $10^4$ ohm-cm, $10^3$ ohm-cm, $10^2$ ohm-cm or $10^1$ ohm-cm. The SWNT-polymer composite more preferably may comprise up to 0.1%-3% SWNTs which exhibits electrical resistance of less than $10^9$ ohm-cm, and preferably less than $10^8$ ohm-cm, $10^7$ ohm-cm, $10^6$ ohm-cm, $10^5$ ohm-cm, $10^4$ ohm-cm, $10^3$ ohm-cm, $10^2$ ohm-cm or $10^1$ ohm-cm.

The invention further contemplates a SWNT-catalyst-polymer composite comprising at least 10%, 20%, 30%, 40%, 50%, 60%, 70%, 80%, 90%, 95%, or 99.99% polymer and a quantity of SWNT-catalyst composition (e.g., 0.001%-10% to 20% to 30% or more) wherein the dynamic melt viscosity of the SWNT-polymer composite is increased by at least 10 fold at a frequency of 0.1 rad/sec over the same polymer made without the SWNT-catalyst composition. The SWNT-polymer composite may, for example, comprise 0.001%-5% SWNTs wherein the dynamic melt viscosity of the SWNT-polymer composite is increased by at least 10 fold over the dynamic melt viscosity of the polymer without the quantity of SWNT-catalyst. The SWNT-polymer composite may more preferably comprise 0.1%-3% SWNTs wherein the dynamic melt viscosity of the SWNT-polymer composite is increased by at least 10 fold over the dynamic melt viscosity of the polymer without the quantity of SWNT-plus-catalyst.

A SWNT-polyolefin (e.g., PE or PP) composite as contemplated herein comprises a quantity of SWNTs (e.g., 0.001%-10% to 20% or more) and at least 1%, 5%, 10%, 20%, 30%, 40%, 50%, 60%, 70%, 80%, 90%, 95%, or 99.99% polyolefin such as PE which preferably has a weight average molecular weight of at least 500,000. The weight average MW of the polyolefin of the SWNT-polyolefin composite may be at least 800,000, or at least 1,000,000. The invention further contemplates in one embodiment a SWNT-catalyst composition comprising SWNT grown on a support material such as polymerization grade silica (e.g., PV and SA) containing a transition metal as described elsewhere herein.

In an alternative embodiment, BPA is used to make polycarbonate and epoxy resins with SWNTs as described herein. In one embodiment, the process includes polymerization of a short di-epoxide polymer that is produced from two monomers (typically, bis-phenol+epichlorohydrin), followed by the cure or hardening of the epoxy by crosslinking (typically a diamine) wherein SWNTs or SWNT-composites are added during the in-situ polymerization, in-situ cure, or in-situ crosslinking processes.

Preferably at least 50% of the SWNTs of the carbon nanotube-polymer composite formed herein have outer diameters of 0.7 nm to 1.0 nm, more preferably at least 70%, and still more preferably at least 90%. In another embodiment at least 50% of the SWNTs of the carbon nanotube-polymer composite formed herein have outer diameters of 1.0 nm to 1.2 nm, more preferably at least 70%, and most preferably at least 90%. In yet another embodiment, at least 50% of the SWNTs of the carbon nanotube-polymer composite formed herein have outer diameters of 1.2 nm to 1.8 nm, more preferably at least 70%, and most preferably at least 90%.

The invention also contemplates nanotube-catalyzing metal catalysts which have been converted into bicatalysts which are able to form both nanotubes in a first reaction step and thermoplastic polymer in a second reaction step. The bicatalysts comprise a support material (such as described elsewhere herein) which has been impregnated with one or more metals selected from Group VIII, Group VIb, Group Vb, rhenium, or the lanthanide group to form a metal catalyst and then has been treated to convert the metal catalyst into a Phillips, Ziegler-Natta, or metallocene polymerization catalyst to form the bicatalyst.

Alternatively, the invention comprises a carbon nanotube-polymerization catalyst (1) comprising a carbon nanotube product comprising single-walled carbon nanotubes and a metal catalyst, the metal catalyst comprising a metal disposed upon a support material, and wherein the single-walled carbon nanotubes were formed from the metal catalyst and are still associated therewith, and (2) wherein the carbon nanotube product has been treated to convert the metal catalyst therein into a Phillips, Ziegler-Natta, or metallocene catalyst, forming the carbon nanotube-polymerization catalyst. In an alternative environment, the invention comprises a SWNT-polymerization catalyst comprising purified SWNTs which have been treated as described elsewhere herein to deposit a polymerization catalyst upon the SWNTs.

EXAMPLES

While the invention will now be described in connection with certain additional preferred embodiments in the following examples so that aspects thereof may be more fully understood and appreciated, it is not intended to limit the invention to these particular embodiments and examples. On the contrary, it is intended to cover all alternatives, modification and equivalents as may be included within the scope of the invention as described herein. Thus, the following examples, which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

Composites were made from SWNTs in a polyethylene matrix, in which different methods of preparation were used to disperse the nanotubes. These methods used, as a source of nanotubes, purified single-walled nanotubes (P-NT), as well as the original non-disassociated SWNT-catalyst composition (silica supported single-walled nanotubes, or SS-NT), having SWNTs associated with the catalyst in their original orientation. Composites were then made by 1) coprecipitation from a suspension of P-NT or SS-NT in a PE solution, or 2) forming a polymerization catalyst from the SS-NT or P-NT, and using it to polymerize ethylene. Since the polymerization catalysts rupture and expand with polymer build-up in the pores of the silica support in a procedure which represents a novel method of dispersing the nanotubes in polyethylene. Extrusion was also studied as a method of additional dispersion.

These polymer composites were then characterized by measuring their physical, melt rheological, and electrical properties. Nanotubes were found to have a powerful effect on the melt rheology, increasing the low shear viscosity dramatically. Escalating the nanotube concentration also increased the flexural and tensile moduli, decreased the elongation, and increased the electrical conductivity. Consistent trends were observed from all of these diverse properties: SS-NT had a stronger effect than P-NT, and within the SS-NT group the choice of silica type also had a major effect. Polymerization was generally preferred as the method of dispersing the nanotubes. The conductivity was in some cases quite high, approaching that of metal strips. In addition, the conductivity was found to be pressure sensitive.

This dispersion method, in addition to being inexpensive, produces conducting composites that can be molded into films and other shapes and subsequently co-molded with other articles to further increase their utility.

One of the problems with blending any filler into molten polyethylene or other polyolefin or polymer is the difficulty of dispersing the individual particles into the polymer matrix. High shear mixing is usually employed for this purpose, but certain fillers, such as carbon nanotubes, offer a special problem because they require dispersal at the angstrom or nanometer level, and they have a particularly strong Van der-Waals affinity for each other. These characteristics make it especially difficult to effectively disperse clusters of nanotubes, and then keep them dispersed in the polymer matrix. Indeed, the quality of dispersion is usually the limiting factor when engineering these composites.

To accomplish good dispersion of the nanotubes, several original experimental methods were tested. In addition to direct blending of the nanotubes into molten polymer, or into solutions of the polymer, the polymerization mechanism itself was utilized as a dispersion device; nanotubes still attached to their parent silica-supported catalyst, from which they were produced, were treated with chromium, metallocene, or Ziegler-Natta catalyst components, in order to form an active polymerization catalyst. These "dual-function catalysts" were then allowed to polymerize ethylene. Without wishing to be bound by theory, it is assumed to be a feature of ethylene polymerization that each hundred-micron catalyst particle is fractured into billions of smaller fragments, each of 0.1 micron diameter or less as a result of the rapid filling of the catalysts' pores with polymer, forcing the sub-particles away from each other. Each fragment becomes suspended in a coating of polymer that moves away from its neighbors in an expanding mass, while at the same time remaining loosely attached to the other fragments, maintaining the original micro-structure. Each catalyst particle therefore grows into a larger polymer particle composed of a very homogeneous mixture of polymer and catalyst fragments. This mechanism is often called the "multi-grain" model of particle fragmentation and growth. In the present invention, by making a polymerization catalyst out of the original "carbonization" catalyst, which still contains its loading of nanotubes, the nanotubes became more intimately dispersed than can be achieved from other methods.

The following examples demonstrate success in producing several nanotube/polyethylene composites using a variety of dispersion techniques. Each method's results have been evaluated by examining three properties of the composite: (1) Melt rheology, (2) Physical properties (tensile and flexural), and (3) Electrical conductivity. The nanotubes were found to impart high elasticity and high conductivity at low loadings, and major differences were noted between the various methods of their dispersal.

Carbon Nanotube Preparation

The majority of the SWNTs that were used in the production of SWNT/PE composites were generated by cobalt/molybdenum-catalyzed (CoMoCat™) decomposition of carbon monoxide on a porous silica support material. For example, after the silica support was impregnated with cobalt nitrate and ammonium heptamolybdate, the resultant metal catalyst was dried slowly at 125° C. for several hours. In one embodiment, the catalyst was calcined at 500° C. in air for two hours, reduced in $H_2$ at 500° C. for 30 minutes, and then exposed to 80 psi of flowing CO at 750° C. for 30 minutes to produce the nanotubes. The final result of this process was a black powder containing from 5-8% of SWNTs by weight. This material is referred to below as "silica-supported SWNT," or "SS-SWNT" or "SWNT-catalyst composition" or "SWNT-metal catalyst". Support materials other than silica are contemplated for use as indicated elsewhere herein, thus the SWNTs used herein are not limited to being produced by catalysts comprising silica.

The production of SWNTs via this so-called CoMoCat™ procedure at 750° C. is highly selective; the overwhelming majority of the produced nanotubes are 7-5 and 6-5 type single-walled nanotubes, which are approximately 0.8 nm (between 0.7 and 0.9 nm) in diameter. Once grown using these silica-based catalysts, these SWNTs can be separated, if desired, from the inert support material by ultrasonic agitation in either hydrofluoric acid or strongly caustic aqueous solutions, followed by extensive dilution with $H_2O$. High energy ultrasound can also used to separate the SWNTs prior to polymerization, and, once the SWNTs were separated, freeze-drying or the use of surfactants was often employed to prevent them from reagglomerating into larger "bundles." The finished material from this purification process is referred to herein as pure SWNT, or "P-SWNT" or "P-NT".

Four Methods of Dispersing Nanotubes in Polymer

Three different preparation techniques were tested in this study. These are described in general below. Further details on each catalyst preparation can be found in each section below.

A. Precipitation of PE around P-NT: Polyethylene homopolymer samples obtained from Chevron-Phillips company were heated and dissolved in trichlorobenzene (TCB), to which purified nanotubes (P-NT) were also added. These were then dispersed in the solution by high energy ultra-sonication (e.g., in a range of from 50-750 watts in 100 cc). The resultant solution, usually at about 120-130° C., was then quickly added to a large excess of stirring alcohol or acetone, causing the instantaneous precipitation of PE around the nanotubes. The acetone or alcohol slurry was then filtered leaving a black polymer on the filter paper and a clear colorless liquid passing through it. Final rinsing in acetone helped remove the last traces of trichlorobenzene, and the polymer was then dried under vacuum at about 60° C. Polymer composites made by this method are designated herein with the "A" prefix.

B. Precipitation of PE around SS-NT: This technique was similar to method A above except that the silica-supported nanotubes (SS-NT; also referred to herein as "SWNT plus catalyst")) were used instead of the pure nanotubes (P-NT). This resulted in carrying large amounts of silica along with nanotubes, but it retains the original structure of nanotubes created in the pores of the silica-catalyst (metal catalyst). In only one case was the SS-NT slurried in the trichlorobenzene, then sonicated before addition of PE. In all other cases, however, no sonication was used, in an attempt to preserve the original nanotube structure. Composites made by this method are designated herein with the "B" prefix.

C. Fragmentation of SS-NT via Polymerization: In another approach the original silica based catalyst containing cobalt, molybdenum and the SWNTs was converted into a polymerization catalyst. This converted polymerization catalyst was then used to polymerize ethylene, which is known to fracture the silica base down to fragments of 0.1 micron or less. These fragments then become buried in polyethylene, producing a highly homogeneous mixture of micro-dispersed catalyst in the polymer matrix. The nanotubes were made in the pores of the same silica, thereby providing a unique level or pattern of dispersion of NT in the polymer.

To make the converted polymerization catalyst, the parent cobalt-molybdenum/silica catalyst (or other SWNT-metal catalyst contemplated herein) is treated with chromium, titanium, or zirconium compounds in order to convert it into a Phillips, Ziegler-Natta, or metallocene type catalyst, respectively. All three types were tested. The Phillips catalysts were made by impregnating chromium nitrate onto the NT catalyst at a 1-2% loading along with the cobalt and molybdenum prior to nanotube formation. While this method did result in polymer, experience soon indicated that the Ziegler-Natta type catalysts were more easily prepared and controlled for this purpose. A metallocene catalyst was also made by impregnating a toluene solution of methylaluminoxane (MAO) and bis(n-butylcyclopentadienyl) zirconium dichloride into a NT support, following by drying. However this catalyst provided a less desirable activity (for PE) and it was difficult to handle the MAO colloid. The Ziegler-Natta preparation was the preferred catalyst for use in producing PE, was easy to prepare, and always yielded consistently high activity. Any of the three types of catalysts can be used to yield polyethylene or other olefins or other monomers. However, chromium derived PE can contain low levels of long chain branching, which can have small effects on low shear viscosity. This provided yet another reason for choosing the Ziegler-Natta preparation for these studies, the rheological analysis of the effect of nanotubes on viscosity was more straightforward when using a Ziegler-Natta resin. Consequently the Ziegler-Natta preparation became the preferred route for the present work using ethylene.

To prepare a Ziegler-Natta catalyst, the SS-NT was first calcined at 300-400° C. in nitrogen to remove moisture picked up during handling. This powder was then slurried in dry heptane, to which dibutyl magnesium was added in the amount of 0.1 to 0.2 mmol per gram of SS-NT. This amount, being considerably less than a monolayer, is completely adsorbed onto the SS-NT surface. To this slurry was then added 0.2 to 0.5 mL of $TiCl_4$, which reacts with the adsorbed dibutyl magnesium ($MgBu_2$) to form the active catalytic component.

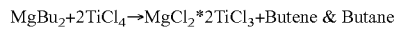

$$MgBu_2 + 2TiCl_4 \rightarrow MgCl_2 \cdot 2TiCl_3 + \text{Butene \& Butane}$$

Triethyl aluminum, 1-2 mmol, was then added as cocatalyst, followed by ethylene to form the polymer. The composites produced using this method are designated herein by the prefix "C".

D. Dispersal of P-NT by ultrasound, trapping in a gel matrix, then fragmentation by polymerization: In another approach the pure nanotubes were first suspended in an aqueous or organic medium by high energy ultrasound (e.g., at frequencies of 20-40 kHz). To maintain that dispersion, the liquid matrix was then gelled by the instantaneous precipitation of an oxide or hydroxide, thereby freezing the nanotubes in place. This metal oxide was in some cases silica, from the in-situ hydrolysis of $Si(OEt)_4$, or in other cases magnesia, from the in-situ formation of $Mg(OH)_2$ from a magnesium salt.

It was contemplated that this method of freezing nanotubes into the matrix of the oxide would yield a different pattern of incorporation into the pores compared to that of the original SS-NT. The nanotube-containing oxide was then used as a carrier to form a polymerization catalyst (catalytic carbon nanotube composition), as described in C above. The composites produced using these methods are designated herein by the prefix "D".

Description of Calcination Procedures

To activate or calcine the various catalysts described in these studies, a sample of about 10 grams of the oxide was placed in a 4.5 cm quartz tube fitted with a sintered quartz disk at the bottom. While the catalyst was supported on the disk, dry nitrogen was blown up through the disk at the linear rate of about 1.6 to 1.8 standard cubic feet per hour. An electric furnace around the quartz tube was then turned on and the temperature was raised at the rate of 400° per hour to the indicated temperature, such as 300-600° C. At that temperature the catalyst was allowed to fluidize for three hours in the dry nitrogen. Afterward the catalyst was collected and stored under dry nitrogen, where it was protected from the atmosphere until ready for further treatment and testing. After activation it was never allowed to experience any exposure to the atmosphere.

Ethylene Polymerization

Polymerization runs in this series of examples were generally made in a 2.2 liter steel reactor equipped with a marine stirrer rotating at 400 rpm. The reactor jacket contained boiling methanol connected to a condenser, to which nitrogen pressure was applied in order to control the reactor temperature. Electronic control instruments permitted the reaction temperature to be held to within half a degree centigrade during the run.

The desired amount of polymerization catalyst, often from 0.5 to 10 grams, was first charged under nitrogen to the dry reactor, then 1.2 L of isobutane liquid was added, and the reactor heated up to the specified temperature (usually 80-110° C.). When cocatalysts were used (optionally), such as triethylaluminum (TEA), 2 mL of a 1 molar heptane solution was added to the reactor midway during the isobutane addition. In some runs hydrogen was then added, from 5 to 30 psig on the reactor itself after isobutane addition, to control molecular weight. Finally ethylene was added to the reactor to equal a fixed pressure, normally between 300 and 450 psig, which was maintained during the experiment. The stirring was allowed to continue for the desired time, usually about 10-30 minutes, and the activity was noted by recording the flow of ethylene into the reactor to maintain the set pressure. After the allotted time, the ethylene flow was stopped and the reactor slowly depressurized and opened to recover 5-200 grams of granular polymer composite powder. Any other suitable polymerization system known by those of ordinary skill in the art could be similarly used.

Ethylene used was polymerization grade ethylene obtained from Union Carbide Corporation. This ethylene was then further purified through a column of ¼ inch beads of Alcoa A201 alumina, activated at 250° C. in nitrogen. Isobutane was polymerization grade obtained from Phillips Petroleum Co., Borger, Tex. It was further purified by distillation and it too was then passed through a column of ¼ inch beads of Alcoa A201 alumina, activated at 250° C. in nitrogen. Aluminum alkyl cocatalysts were obtained from Akzo Corporation as one molar solutions in heptane.

In some experiments, where a lower yield of polymer was desired per gram of catalyst, the polymerizations were done in a Diels-Alder bottle using dry heptane as solvent. After the addition of catalyst, heptane, and triethylaluminum cocatalyst, ethylene was added to maintain 7 psig in the bottle while a magnetic stirring bar kept the slurry agitated. The run was done at room temperature. Progress of the reaction could be monitored by weighing the vessel. After the desired yield had been reached, which took from a few minutes in some cases to almost an hour in others, the bottle was opened and the polymer removed by filtration. A black polymer stayed on the filter paper while a clear colorless heptane came through the paper.

Melt Elasticity Determination

Certain well known rheological parameters have been used herein in conjunction with independently measured molecular weight distribution to judge the degree of elasticity with and without addition of carbon nanotubes. Samples for viscosity measurements were compression molded at 182° C. for a total of three minutes. The samples were allowed to melt at a relatively low pressure for one minute and then subjected to a high molding pressure for an additional two minutes. The molded samples were then quenched in a cold (room temperature) press. 2 mm×25.4 mm diameter disks were stamped out of the molded slabs for rheological characterization. Fluff samples were stabilized with 0.1 wt % BHT dispersed in acetone and then vacuum dried before molding.

Small-strain oscillatory shear measurements were performed on a Rheometrics Inc. RMS-800 or ARES rheometer using parallel-plate geometry over an angular frequency range of 0.03-100 rad/s. The test chamber of the rheometer was blanketed in nitrogen in order to minimize polymer degradation. The rheometer was preheated to the initial temperature of the study. Upon sample loading and after oven thermal equilibration, the specimens were squeezed between the plates to a 1.6 mm thickness and the excess was trimmed. A total of approximately 8 minutes elapsed between the time the sample was inserted between the plates and the time the frequency sweep was started.

Strains were generally maintained at a single value throughout a frequency sweep but larger strain values were used for low viscosity samples to maintain a measurable torque. Smaller strain values were used for high viscosity samples to avoid overloading the torque transducer and to keep within the linear viscoelastic limits of the sample. The instrument automatically reduces the strain at high frequencies if necessary to keep from overloading the torque transducer.

These data were fitted to the Carreau-Yasuda equation to determine zero shear viscosity ($\eta_0$), relaxation time (τ), and a measure of the breadth of the relaxation time distribution (CY-a).

The well-known 3.4 power law was used to discern the contribution of the nanotubes to melt viscosity. Ziegler-Natta catalysts were used for these experiments because of their tendency to produce linear polymers having no long chain branching, in contrast to HDPE samples obtained from chromium oxide catalysts. This power law, which expresses the effect of linear chain entanglements, establishes a linear dependence of $\log(\eta_0)$ on $\log(M_w)$ for polymers having no LCB. The reference line used in this study is the correlation reported by Arnett and Thomas, who introduced the concept in the mid 1960s. This "Arnett line" has a slope of 3.41 for polyethylene. Addition of fillers to these polymers often results in increases in $\eta_0$.

Rheological breadth refers to the breadth of the transition region between Newtonian and power-law type shear rate for a polymer or the frequency dependence of the viscosity of the polymer. The rheological breadth is a function of the relaxation time distribution of a polymer resin, which in turn is a function of the resin molecular structure or architecture. Assuming the Cox-Merz rule, the rheological breadth may be calculated by fitting flow curves generated in linear-viscoelastic dynamic oscillatory frequency sweep experiments with a modified Carreau-Yasuda (CY) model, which is represented by the following equation:

$$E = E_o[1 + (T_\xi \dot{\gamma})^a]^{\frac{n-1}{a}}$$

where $E$=viscosity (Pa·s) $\dot{\gamma}$=shear rate (1/s)

a=rheological breadth $T_\xi$=relaxation time (s) [describes the location in time of the transition region]

$E_o$=zero shear viscosity (Pa·s) [defines the Newtonian plateau]

n=power law constant [defines the final slope of the high shear rate region]

To facilitate model fitting, the power law constant is held at a constant value.

Gel Permeation Chromatography

Molecular weights and molecular weight distributions were obtained from a Waters 150 CV Plus or a Polymer Labs PL220 Gel Permeation Chromatograph using trichlorobenzene as the solvent with a flow rate of 1 mL/min at a temperature of 140° C. BHT at a concentration of 0.5 g/L was used as a stabilizer in the solvent. An injection volume of 220 mL was used with a nominal polymer concentration of 6.5 mg/3.5 mL (at room temperature). The column set consisted of two Waters Styragel HT 6E mixed-bed or three or four PLGel Mixed A columns plus a guard column. A broad-standard integral method of universal calibration was used based on a Phillips Marlex BHB 5003 broad linear polyethylene standard. Parameter values used in the Mark-Houwink equation ($[h]=K \cdot M^a$) for polyethylene were $K=39.5(10^{-3})$ mL/g and a=0.726.

Other Polymer Characterization

Tensile and elongation measurements were conducted on an Instron 4400 with HRDE extensometer and according to a modified ASTM D638-86 procedure using Type 5 dog-bone tensile bars 0.15 in×0.07 in at the neck×0.5 in. Crosshead speed was 2.0 in/min.

Flexural modulus measurements (MPa) were conducted on an Instron 4505 at 0.5 in/min using a modified ASTM D790-95a procedure. The modification involved using compression molded slabs measuring 2 inch by 0.5 inch by 0.05 inch, and a 1 inch span.

Melt Index (MI) and high load melt index (HLMI) are commonly used viscosity measurements in which molten polymer at 190° C. is extruded under a constant load through a standard die. Both measurements are expressed in grams of polymer extruded per ten minutes. In accordance with ASTM D1238, condition 190/2, a 2,160 gram weight was used for MI, and a 21,600 gram weight for HLMI.

Conductivity Measurements

To measure the electrical resistance across these NT-PE composites a circular disk of 0.5 inch diameter and 0.05 inch thickness was first compression molded. This was done by heating the polymer to 350° F. in a 2 inch by 2 inch by 0.05 inch mold, applying about 625 psig pressure to the mold, waiting 5 minutes, then cooling under pressure for another 9 minutes to 150° F., where the hardened plaque was removed. The circular disk was then cut from this larger plaque. To each side of this disk was then smeared a small amount of micronized silver paste (sold under the name "Arctic Silver" for this purpose). A ¾ in brass disk was then pressed against the silver paste on each side of the disk, and the two metal plates with sample sandwiched between were then pressed together by means of a strong spring-loaded wood-gluing clamp. These two brass plates, which had been soldered to a wire, were then connected to a voltmeter. Human hands did not touch the sample during this measurement.

Electrical resistance, measured in ohms, was then taken as the two metal disks were being pressed together. Sometimes the force was varied to obtain maximum contact, and duplicates were obtained to achieve a consistent result. A "blank" determination was also made in which the composite was omitted, to determine the resistance of the other parts of the circuit. This resistance was small, usually 0.2 ohms at most, compared to sample measurements of many orders of magnitude larger.

The resistance measured in this way was then converted into a standard resistivity by multiplying by the area of the disk and dividing by the path length.

Conductivity as a function of pressure was determined by placing a sample of the composite (2 in×2 in×0.05 in) between two metal plates, which were then inserted in a hydraulic press between insulating barriers. Resistance between the plates was then monitored as the force exerted by the press was increased.

Polyethylene Control Samples

Certain polyethylene samples that were used for blending with P-NT or SS-NT, or as controls for rheological, tensile or flexural modulus tests. These samples were obtained from Chevron-Phillips laboratories. All were homopolymers made from Ziegler-Natta or Phillips type catalysts similar to those used in this study. When used as controls, these polymers were chosen to have a similar molecular weight and molecular weight distribution.

Detailed Description of Each Composite

Series A: PE in Solution Precipitated Around Pure Nanotubes (P-NT) (Composites A1-A4)

A1: HF-Purified, freeze-dried nanotubes (0.08 g) were added to trichlorobenzene (100 mL) and sonicated for 20 minutes bringing the temperature up to 130° C.), after which 2.42 g of PE control 263-82A was dissolved into the mixture with high speed mixing. After an additional 10 minutes of sonication, the product was poured into 2 L of 25° C. stirring acetone. Washing with acetone and drying produced a composite that comprised 3.2% NT (nanotubes). (Product 38059-58B)

A2: The procedure of A1 above was repeated using 0.15 g nanotubes and 2.35 g of PE control 273-82A. This produced a composite containing 6.0% NT. (Product 38059-59A)

A3: The procedure of A1 was repeated using 0.375 g nanotubes and 2.125 g of PE control 273-82A. This produced a composite containing 15.0% NT. (Product 38059-58C)

A4: The procedure of A1 was repeated using 4 g of PE control (Product 263-82A) and 0.14 g NT in dichlorobenzene. This produced a composite containing 3.4% NT. (Product 39059-57B)

Series B: PE in Solution Precipitated Around SS-NT (Composites B1-B9)

B1: A SS-NT sample (Co—Mo/silica catalyst that produced 7% SWNT by weight) was obtained from Southwest Nanotechnologies, made as described above. This black granular material (2.21 g) was ground to a powder in mechanical blender, and then was suspended in 100 mL trichlorobenzene by high energy sonication for 1 hour. When the temperature exceeded (by applied heat and also by sonication) 130° C., 2.51 g of PE was added (Product 38059-56D) and stirred with additional sonication for another 5 minutes. Afterward it was quickly poured into 2 L of 25° C. isopropanol. The precipitate was filtered and washed with additional acetone, then dried under vacuum at 60° C. overnight, yielding a NT/PE composite that was composed of 3.82% NT and 52% silica. (Product 38059-57A)

B2: A NT catalyst was prepared by impregnating 20 grams of Davison Syloid 244 silica with a solution of 0.613 g $(NH_4)_2MoO_4$ and 0.205 g $Co(NO_3)*6H_2O$ in 30 mL of deionized water. This silica was chosen because of it very fine particle size (SA=300 m2/g, PV~1.5 cc/g, avg particle size of only 3 microns). After being dried in a fluidized bed at 100° C., 10 g of this catalyst was calcined in dry air (see calcining procedure) overnight at 460° C. The next day the temperature was raised to 500° C. in nitrogen, then hydrogen gas was applied for about half an hour, followed by a nitrogen purge. The temperature was raised again in nitrogen to 750° C., where it was replaced by 1 atmosphere of carbon monoxide added at the rate of 0.2 linear ft/sec through the 8-inch fluidized bed. Exposure to CO continued for about 5.5 hours, after which the catalyst was purged with nitrogen for half an hour at 750° C., then quickly cooled to room temperature. This procedure yielded a fine black, conductive, powder. It was then pushed through a 100 mesh screen before storage for use below. (Product 38059-60A)

4.22 g of PE control 336-55 was dissolved into 200 mL trichlorobenzene with high agitation and enough heat to bring the mixture up to 130° C. After the polymer had formed a clear solution of consistent viscosity, 1.81 g of SS-NT (Product 38059-60A) was added. Note that in this preparation the nanotubes were not sonicated or ground, nor was the SS-NT ever exposed to sonication in this procedure. The mixture was stirred rapidly for about 10 minutes then poured into 2 L of 25° C. acetone. The precipitate was filtered, yielding a black powder while the liquid passing through the paper was completely clear and colorless. After an additional rinse in acetone, the sample was dried under vacuum at 60° C. to produce a composite comprising of 0.96% NT and 29% Silica. (Product 38059-60B)

B3: Another sample was made using the procedure and materials of B2 above, except that 3.47 g of SS-NT was used with 2.53 g of PE to yield a composite comprising of 1.85% NT and 56% silica. The nanotubes were neither sonicated nor ground up. (Product 38059-60C)

B4: Another sample was made using the procedure and materials of B2 above, except that 3.60 g of SS-NT was used with 0.8 g of PE to yield a composite comprising of 2.62% NT and 79% silica. The nanotubes were neither sonicated nor ground up. (Product 38059-61 D)

B5: Another sample SS-NT was made exactly as recorded above in B2. It was designated Product 38059-62A. A polymer sample was made using the procedure of B2 except that 9.00 g of PE was mixed with 1.00 g of the SS-NT. This yielded a composite containing 0.32% NT and 9.7% silica. The nanotubes were neither sonicated nor ground up. (Product 38059-62D)

B6: The procedure of B5 was repeated except that 2.00 g of the SS-NT (38059-62A) was added to 8.00 g of the PE. This yielded a composite comprising of 0.64% NT and 19% silica. The nanotubes were neither sonicated nor ground up. (Product 38059-62B)

B7: The procedure of B5 was repeated except that 2.00 g of the SS-NT (38059-62A) was added to 8.00 g of the PE. This yielded a composite comprising of 1.28% NT and 38.7% silica. The nanotubes were neither sonicated nor ground up. (Product 38059-62C)

B8: 1.06 g of the SS-NT from C11 (see below, Product 38059-65B, Cabosil EH-5, 2.19% NT) was sonicated 20 min in 100 mL TCB, then added to 2.00 g of the PE 336-55 in 300 mL TCB. A black gel formed inside the clear polymer solution. It was separated, dried and weighed. This yielded a composite comprising of 0.75% NT and 33.7% silica. The nanotubes were neither sonicated nor ground up. (Product 38059-67A)

B9: The procedure of B5 was repeated except that 0.97 g of the SS-NT from C11 (Product 38059-65B), Cabosil EH5, 2.19% NT) was added to 4.05 g of the PE 336-55. This yielded a composite comprising of 1.28% NT and 38.7% silica. The nanotubes were neither sonicated nor ground up. (38059-67B)

Series C: PE Made Inside Pores of SS-NT. (Composites C1-C13)

C1: NT were grown on a silica support as described in detail in the section above (Carbon Nanotube Preparation). This SS-NT product (containing 6% nanotubes) was ground in a blender, then calcined under $N_2$ at 400° C. 28 g of this material was then slurried in 200 mL heptane to which 7 mL of 0.7 M dibutyl magnesium was added slowly. After about ten minutes of further stirring, 0.5 mL of neat $TiCl_4$ was slowly added forming a catalytic carbon nanotube composition ("carbon nanotube-polymerization catalyst" or "catalyst"). This catalyst was not washed as before because the amounts of active components were chosen to fully adsorb onto the support. 6.41 g of this catalyst was added to the high pressure autoclave along with 2 mL of 1M triethylaluminum in heptane cocatalyst. Polymerization was accomplished at 90° C. under 300 total psi (isobutane, ethylene, and hydrogen), 6 psi $H_2$, in 1.2 L of isobutane. In 11 minutes, 113.4 g of composite was produced that comprised of 0.34% NT and 5.3% silica, by weight. (Product 38059-56C)

C2: Another aliquot (19.78 g) of the catalyst used for composite C1 was used for polymerization in the high pressure autoclave at 100° C. under 300 total psig. No $H_2$ was added. 1.2 L of isobutane was used as diluent and 2 mL of 1M heptane solution of triethylaluminum cocatalyst was added prior to ethylene addition. In 31 minutes, 115.5 g was produced of composite comprising 1.03% NT and 16.1% silica. (Product 38059-56D)

C3: The procedure of C1 was repeated using 10.95 g SS-NT, 2.2 mmol dibutyl magnesium, and 1.05 mL $TiCl_4$. Unlike C1, the catalyst was then rinsed 3 times in 200 mL heptane to remove any adsorbed reactants. Polymerization occurred at 100° C. for 20 minutes with 6 psi $H_2$ added, at 250 psi ethylene pressure, yielding 181.15 g of composite comprising 0.36% NT and 5.7% silica. (Product 38059-56B)

C4: SS-NT sample containing 7.8% nanotubes was used. 8.8 grams of this material was calcined in nitrogen at 300° C. to remove adsorbed moisture, then slurried in 100 mL heptane. Slowly, 6 mL of 0.7 M dibutyl magnesium was added, followed by 10 minutes of stirring, then 0.5 mL neat $TiCl_4$, another 10 minutes of stirring to allow complete adsorption, and finally 3 mL of 1M triethylaluminum. Polymerization was done in a Diels-Alder bottle at 7 psi ethylene for 55 minutes at 60° C. to produce a composite comprising 3.03% NT and 35.8% silica. (Product 38059-58A)

C5: Another SS-NT sample was produced using high porosity support especially designed for polymerization catalysts. Silica grade MS3050 was obtained from Philadelphia Quartz, having a pore volume of about 3 cc/g, a surface area of about 500 $m^2/g$, and an average particle size of near 100 microns. This silica was then impregnated with the cobalt and molybdenum salts (1:3) followed by drying and calcination at 500° C. in air. It should be noted that although this silica initially has a very high pore volume, the act of aqueous impregnation and drying usually brings down the pore volume (but not the surface area) to about 1.3 cc/g due to the high surface tension of water. This material was then reduced in hydrogen for half an hour at 500° C., followed by exposure to pressurized carbon monoxide (see Carbon Nanotube Preparation section above) for 1 hour. Analysis showed that this material contained 6.74% nanotubes.

This SS-NT was then converted into a catalytic carbon nanotube composition (Ziegler-Natta type) as described in C1. It was impregnated with 3 wt % dibutyl magnesium, then treated with a large excess of $TiCl_4$, followed by rinsing n heptane until the rinse liquid no longer turned white when wet acetone was added. Polymerization was accomplished in the high pressure autoclave at 85° C. and 430 psig for 5 minutes. 2 mL 1M triethylaluminum was added as cocatalyst, but not hydrogen. 0.64 g of catalyst was charged, 69.73 g of composite was recovered containing 0.06% nanotubes and 0.9% silica. (Product 38059-55F)

C6: Davison Syloid 244 is a polymerization grade silica support used to prepare SS-NT in this experiment, chosen for its especially fine particle size. Davison Syloid 244 is a gelled silica having a pore volume of about 1.5 cc/g, a surface area of about 300 $m^2/g$, and an average particle size of only 3 microns. 19.6 g of this silica was impregnated with 30 mL of an aqueous solution containing 0.2051 g $Co(NO_3)_2*6H_2O$ and 0.6127 g $(NH_4)2MoO_4$. The impregnation was accomplished in a Warring blender. 10 g of this material was calcined in air at 460° C. overnight, then reduced in hydrogen at 500° C. for half an hour, then exposed to CO at 750° C. for 5.5 hours at 1 atm. It was found to be conductive, and analysis showed that it contained about 3.2% NT. To "delump" any soft clumps formed during NT growth, the SS-NT was then pushed through a 100 mesh screen.

2.74 g of this material was slurried in 150 mL heptane, to which 3 mL of 0.7 M dibutyl magnesium solution was added, followed after 10 minutes of stirring by 0.3 mL neat $TiCl_4$ forming a catalytic carbon nanotube composition. After another 15 minutes of stirring 2 mL of 1M triethylaluminum was added and the polymerization commenced in a Diels-Alder bottle at 7 psig ethylene. After about 5 minutes of stirring, during which the temperature rose from 25° C. up to about 50° C., the reaction was terminated with a weight gain from PE of 2.98 g. The composite was filtered from the heptane (which came through the filter paper clear and colorless) and dried in a vacuum oven overnight at 70° C. The composite comprised 1.53% NT and 46.4% silica. (Product 38059-62E)

C7: The procedure of C6 was repeated except that a new batch of SS-NT was made using the Davison Syloid 244 silica. It was found to contain 2.55% carbon. 6.82 g of this SS-SNT was charged to a Diels-Alder bottle along with 5 mL dibutyl magnesium (0.7 M), 0.5 mL $TiCl_4$, and finally 3 mL of 1M triethylaluminum. The polymerization was carried out at room temperature, rising to about 40° C. over about 20 minutes, at which time it was stopped. Total weight gain during that time due to PE formation was 12.0 g. The slurry was filtered and dried in a vacuum oven overnight, yielding 19.4 g of a uniformly gray composite powder containing 0.67% nanotubes and 25% silica. (Product 38059-63C)

C8: The procedure of C6 was repeated to make yet another batch of SS-NT using another silica noted for its fine character. Cabosil EH-5, 400 m2/h and formed by flame hydrolysis of $SiCl_4$, was used to create a SS-NT containing 2.12% carbon. To the Diels-Alder bottle was charged 4.5 mL of 0.7 M dibutyl magnesium, 0.3 mL $TiCl_4$, and then 1.5 mL 1 M triethylaluminum. Polymerization was stopped in 1 hour and 52 minutes after a weight gain of 28.0 g due to PE formation. The composite contained 0.43% nanotubes and 20% silica. (Product 38059-63D)

C9: Another polymer was made from the same SS-NT as in C8. 3.12 g of SS-NT was charged into the Diels-Alder bottle along with 350 g heptane, 3.5 mL of 0.7 M dibutyl magnesium, 0.25 mL $TiCl_4$ forming a catalytic carbon nanotube composition, and finally 3 mL of 1M triethylaluminum. After 20 minutes with 7 psi ethylene applied the reaction was stopped after a weight gain due to polyethylene of 25.64 g. After drying under vacuum overnight at 60° C. the filter cake weighed 30.1 g. This composite contained about 0.22% nanotubes and about 10% silica. (Product 38059-64A)

C10: Another polymer was made from the same SS-NT as in C8. 7.49 g of SS-NT was charged into the Diels-Alder bottle along with 370 g heptane, 3.5 mL of 0.7 M dibutyl magnesium, 0.2 mL $TiCl_4$ forming a catalytic carbon nanotube composition, and finally 3 mL of 1M triethylaluminum. After 20 minutes with 7 psi ethylene applied the reaction was stopped after a weight gain due to polyethylene of 18.5 g. After drying under vacuum overnight at 60° C. the filter cake weighed 30.1 g. This composite contained about 0.61% nanotubes and about 28% silica. (Product 38059-64B)

C11: Another SS-NT sample was made by the procedure in C10 using Cabosil EH-5 silica. This material was found to contain 2.19% carbon. 3.28 g of this material was introduced into a Diels-Alder bottle along with 300 g heptane, then 4 mL 0.7 M dibutyl magnesium, then 0.4 mL $TiCl_4$, and finally 3 mL triethyl aluminum. After 8 minutes 9.90 g of PE was formed, the polymerization was stopped, and the slurry filtered and the filtrate dried under vacuum at 60° C. After drying 15.30 g of composite was recovered, containing 0.55% NT and 27% silica. (Product 38059-65C)

C12: Another polymer was made from the same SS-NT described in C-11. 3.12 g of this material was introduced into a Diels-Alder bottle along with 300 g heptane, then 4 mL 0.7 M dibutyl magnesium, then 0.3 mL $TiCl_4$, and finally 3 mL triethyl aluminum. After 21 minutes 15.00 g of PE was formed, the polymerization was stopped, and the slurry filtered and the filtrate dried under vacuum at 60° C. After drying 19.72 g of composite was recovered, containing 0.33% NT and 16% silica. (Product 38059-66A)

C13: Another polymer was made from the same SS-NT described in C-11. 5.70 g of this material was introduced into a Diels-Alder bottle along with 325 g heptane, then 6 mL 0.7 M dibutyl magnesium, then 0.4 mL $TiCl_4$, and finally 3 mL triethyl aluminum. After 4 minutes 7.15 g of PE was formed, the polymerization was stopped, and the slurry filtered and the filtrate dried under vacuum at 60° C. After drying 13.57 g of composite was recovered, containing 0.89% NT and 43% silica. (Product 38059-66B)

Series D: Dispersal of P-NT by Ultrasound, Trapping in a Gel Matrix, then Fragmentation by Polymerization (Composites D1-D4)

D1: Freeze-dried, HF-purified NT (0.3 g) was suspended in a concentrated aqueous NaDDBS (sodium dodecylbenzene sulfonate) solution and subjected to high energy sonication for 45 minutes. Another solution was formed by combining 11.5 g of Silbond 40 (oligomerized tetraethyl orthosilicate—40% $SiO_2$ by weight) with 12 mL of ethanol. 25 mL of water containing 1.5 mL concentrated HCl was slowly added to cause complete hydrolysis and formation of a silica sol. The sol was then split into three aliquots to which ⅙, ⅓, and ½ of the NT suspension was added. This mixture was sonicated at low power for 1 hour. Gellation was caused by adding about 30% aqueous ammonia to each aliquot, increasing the volume by 50% (admittedly a large excess). Each sample was then washed three times with ethanol, then dried, yielding silicas containing 5%, 10% and 15% nanotubes.

Ziegler-Natta impregnation of the silica sample containing 15% NT was performed as described above in procedure C6. 1 g of the SS-NT sample was heated in nitrogen to about 300° C. for a few minutes to remove moisture. Then it was slurried in heptane, to which 0.5 mL dibutylmagnesium (0.7 M) was added, followed by 0.5 mL of $TiCl_4$. The catalyst was then rinsed several times in dry heptane and then dried. 0.83 g of this catalyst was charged to the high pressure autoclave, followed by 1.2 L isobutane, 2 mL of 1M triethylaluminum, and 7.5 psi hydrogen. Ethylene polymerization was then carried out at 90° C. under 300 psig total pressure, including $H_2$. After 20 minutes the reaction was stopped, producing 57.5 g of a composite that was 0.22% NT and 1.2% silica. (Product 38059-56E)

D2: To 14.59 HF-purified NT/$H_2O$ gel (1.5% NT, never dried) was added 1.75 g $MgCl_2*6H_2O$. The mixture was stirred and sonicated for one half-hour, followed by a 1:1 dilution with water. Then 15 mL of 30% $NH_{3\,(aq)}$ was added to cause the magnesium to gel as H-bound $Mg(OH)_2$. This gel was washed with 1 L methanol, filtered cleanly (colorless liquid passing through), dried under vacuum, and then calcined at 300° C. under $N_2$ to release $H_2O$ and form a magnesia gel. This material was then slurried in heptane to which 0.3 mL of $TiCl_4$, was added. The mixture was heated to 50° C. for 15 minutes, stirred, and then washed 3 times with heptane. It was dried and charged to the high pressure autoclave (0.21 g). 1.2 L of isobutane was added as diluent, along with 2 mL 1M triethylaluminum cocatalyst. Polymerization occurred at 80° C. under 550 psig total pressure (no $H_2$) for 10 minutes producing 4.52 g of a composite comprising 1.72% NT and 2.9% magnesia. (Product 38059-56F)

D3: 25.66 g of the HF-purified NT gel (1.5%, never dried) was added to 65 mL of N-methylpyrrolidone (NMP) and 30 mL $H_2O$. 15.92 g of $MgCl_2.6H_2O$ was then dissolved in this mixture, which was sonicated at low power for one hour. Then 50 mL of 30% $NH_{3\,(aq)}$ was added to cause the magnesium to gel as H-bound $Mg(OH)_2$. The gel was washed with $H_2O$ to remove NMP, dried under vacuum at 80° C., and then calcined under $N_2$ at 400° C. to produce MgO. This product was then impregnated with excess 0.6 mL of $TiCl_4$, heated to 50° C. with stirring, and finally washed several times with heptanes to remove unreacted $TiCl_4$. After being dried the recovered mass which was then charged to the autoclave was 2.63 g. Polymerization was done at 90° C. under 300 psig total pressure, no $H_2$, in 1.2 L of isobutane and 2 mL of triethylaluminum. It produced 64.25 g of a composite that was then washed with hot 1.2M HCl (solution in methanol to effectively wet the polymer) for 30 minutes to remove MgO. The product was then washed with pure methanol and dried. Analysis of the 1 L HCl wash indicated that it contained 0.0.018% Mg by weight, indicating that only about 12% of the magnesia dissolved in the acidic alcohol. The composite comprised 0.30% NT. (Product 38059-56G)

D4: NT were detached from their silica-based support via high energy sonication, then purified via washing with HF followed by large amounts of water. 0.35 g of this NT powder was then isolated by freeze-drying. The pure material was impregnated directly with 3% by weight of dibutyl magnesium, which was dried under nitrogen on a hot plate. 1 mL of $TiCl_4$ was then added to form Ziegler-Natta catalyst, as before. This black solid was then washed several times in heptane and dried again. Polymerization occurred in the autoclave in 1.2 L of isobutane to which was added 2 mL of triethylaluminum. The temperature was set at 80° C. and the pressure at 450 psig total, including 10 psi $H_2$. In 5 minutes 48.6 g was produced of a composite comprising 0.74% NT and no inert material. (Product 38059-56A)

Results

Dispersal Methods

Researchers generally regard dispersal as the critical parameter in producing an effective composite material, regardless of the filler to be used. This is especially true for carbon nanotubes due to their unusually small particle size and their particularly strong affinity for each other. Polyethylene may be an especially difficult matrix as well, due to its high molecular weight and hydrophobic nature. Therefore in this work several methods of dispersal have been investigated, including novel methods utilizing the polymerization mechanism itself. These techniques (discussed earlier) are summarized below. Characterization of these dispersal methods involved three fundamental types of measurement: (1) melt rheology (resistance to flow), (2) mechanical properties (tensile and flexural), and (3) electrical properties (conductivity).

A. Coprecipitation of P-NT: Refined (purified) nanotubes were dispersed by intense ultrasound in trichlorobenzene, into which polyethylene was then dissolved. This mixture was then quickly combined with a large volume of alcohol causing instant precipitation of the NT/PE composite.

B. Coprecipitation of SS-NT: Unrefined nanotubes, still attached to their original silica catalyst material as previously described, were dispersed in trichlorobenzene with intense ultrasound as in A above, then precipitated similarly. As mentioned before, the original catalyst still having nanotubes attached thereto are called SS-NT (silica supported single walled nanotubes). In this way the original state of nanotube dispersal is at least partially maintained.

C. Polymerization from SS-NT: Catalytic ingredients capable of initiating ethylene polymerization, including Cr, Ziegler-Natta, and metallocene compounds, were impregnated on the SS-SSNT. Then the polymerization mechanism itself, which fractures the silica particles into sub-micron fragments, was relied on to disperse the nanotubes into the PE matrix.

D. Polymerization from NT-Gels: Pure nanotubes (P-NT) were dispersed by intense ultrasound into an aqueous or n-methylpyrrolidone solution. Ammonia was then added to cause gellation of the solution as a silica or magnesia hydrogel, freezing the nanotubes in place. These gels were then dried and converted into polymerization catalysts as described in C above. In one case the magnesia was then dissolved out of the polymer with alcoholic HCl. Another method involved impregnating the pure nanotubes, without dispersal, with Ziegler-Natta components followed by drying.

In addition some of these polymers were also melted and subjected to 10 minutes in an intensive mixing extruder.

Choice of Silica

Several silicas were used as catalyst supports in these experiments. Polymerization grade silicas are preferably above 300 $m^2/g$ and require a high pore volume (e.g., >1.0 cc/g mesopores) in order to fragment. Syloid 244, for example, sold by W.R. Grace, has the high porosity (SA=300 $m^2/g$, PV=1.5 cc/g) and purity necessary for polymerization catalysis. It is a gelled silica and has the additional advantage of having a very fine particle size (aps=3 micron). Thus, this material was also chosen to be impregnated with Co and Mo components to produce SS-NT.

Another silica tested was Cabosil EH-5. This material is a flame hydrolyzed silica comprising 7 nm primary particles fused into 200 nm chains. Agglomerates of up to 25 microns are formed upon handling, but polymerization should break up these agglomerates. With a surface area of 400 $m^2/g$ this material is not considered as having a pore structure; agglomerates are held together only by chain entanglements and hydrogen bonding. This material was impregnated with an aqueous Co/Mo solution and dried, which may have caused some additional loose agglomeration. Nevertheless this silica is thought to represent the finest distribution of small particles that can be easily achieved in the dry state. It is also a very clean silica, with regard to sodium content. Nanotubes were then grown on this silica to make SS-NT, which was used in procedure C to make a polymerization catalyst.

Several other silicas were also used. For example, Hisil 210 was obtained from Pittsburgh Plate Glass (PPG). This silica is sold primarily for rubber reinforcement and would not normally be considered to be suitable for use in polymerization. It is a precipitated silica, rather than gelled, which implies a relatively low porosity; PPG literature indicates a BET surface area of 135 $m^2/g$. Silica gel Davisil® grade 633 was obtained from Sigma-Aldrich; it has particle size 200-425 mesh; pore volume 0.75 $cm^3/g$ and surface area surface area 480 $m^2/g$.

Visual Homogeneity

Some idea of the degree of macroscopic homogeneity can be obtained by inspecting films of the composites, visually and with the aid of an optical microscope. Films of about 0.003 to 0.0003 inches thick were prepared by pressing a few milligrams of composite between metal plates at 350° F. Lexan film was used to prevent actual contact with the metal plate. This method only picks up average differences in nanotube concentration at the level of several microns. Microscopic dispersal at the sub-micron or nano-levels cannot be discerned.

Figure 2:
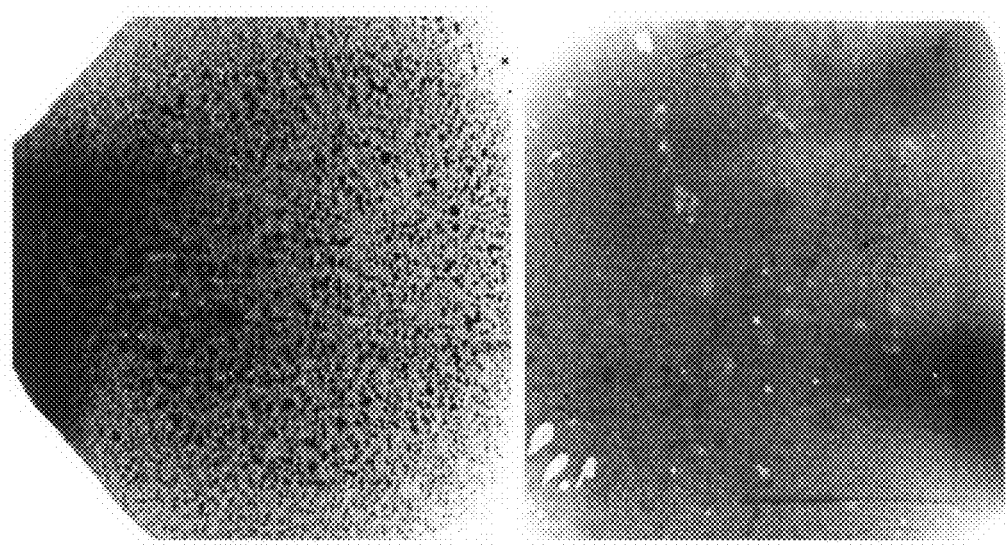
FIG. 2 is a photograph showing heterogeneity from Hisil 210 SS-NT. 1 sq in film, composite C2, 1% NT, 1 before and 2 after intensive mixing extrusion. The white areas are holes in the film.

By this method it became immediately obvious that some composites were not very homogeneous, at least at this level. One film for example, prepared from a chromium-based SS-NT containing 75% carbon, contained particularly large blotches of dark and less-dark material, suggesting that some PE particles contained more nanotubes than others. A 1 inch by 1 inch area is shown in FIG. 1. This might be attributed to several possible causes: (1) non-uniform impregnation of the Co/Mo solution, (2) non-uniform growth of nanotubes within the bed, (3) non-uniform impregnation of the polymerization ingredients, or (4) non-uniform polymer growth. Such heterogeneous samples were homogenized in an intensive mixing extruder for 10 minutes at 230-250° C. Films from such extruded polymer were then found to be visually quite homogeneous. An example is shown in FIG. 2.

Samples made from refined nanotubes were visually homogeneous. Another observation also suggests difficulty of dispersion at a small level. In preparation "A" the refined nanotubes were first intensely sonicated in trichlorobenzene, to the point that the suspension heated to >140° C. without external heat. Sometimes a cooling bath was used to prevent boiling the TCB solvent. This caused a fine suspension that did not completely settle out even after days at rest. Nevertheless a drop of this suspension, taken immediately from the hot sonicating liquid and placed on a glass slide, did not have the expected "inky" appearance, but instead revealed fine "grainy" structure under magnification. Therefore, although films appeared to be uniform macroscopically, this does not eliminate the possibility of microscopic clustering.

Figure 3:
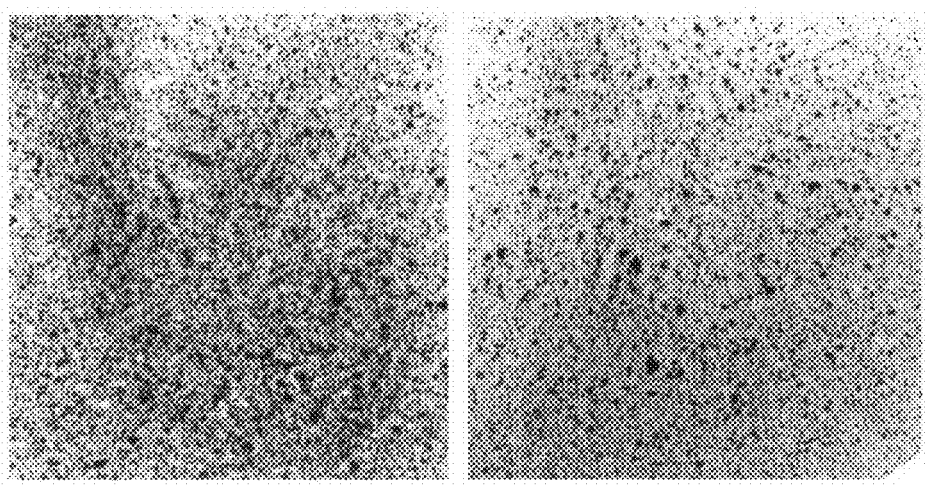
FIG. 3 is a photograph showing heterogeneity from Hisil 210 SS-NT. A 1 in×1 in film from composites C1 and C3. ~0.35% NT.

Without wishing to be bound by theory, it is observed that films made from Hisil 210 had a fine grainy texture, indicating that these particles may not have fragmented. This would be expected from the porosity of this silica. FIG. 2 shows one example of this (composite C2). Even after extrusion one can still pick out small catalyst grains. FIG. 3 shows two other examples, this time from composites C1 and C3. The other two composites that relied on Hisil 210 SS-NT, C4 and B1, contained too high a concentration of nanotubes to make a transparent film for observation.

Figure 4:
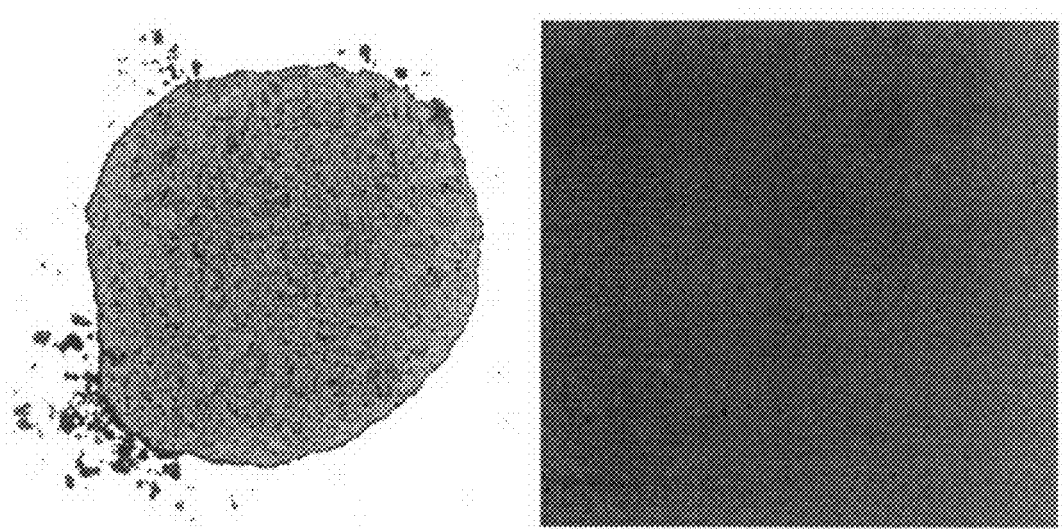

It is also possible that the highly reactive Ziegler-Natta components tended to adsorb preferentially onto the exterior of each silica particle, given that considerably less than a monolayer was applied. If so this would cause some heterogeneity in the film because a large part of the polymer would have been produced, probably with a lower nanotube concentration, around a darker core. It is worth noting that this effect would have been dependent on the silica particle size, and that the finest silica, the Cabosil EH-5, always produced the most homogeneous polymer by visual inspection. FIG. 4 shows a 1 in×1 in square of film, before and after intensive extrusion, from composite C9, which used Cabosil SS-NT.

Figure 5:
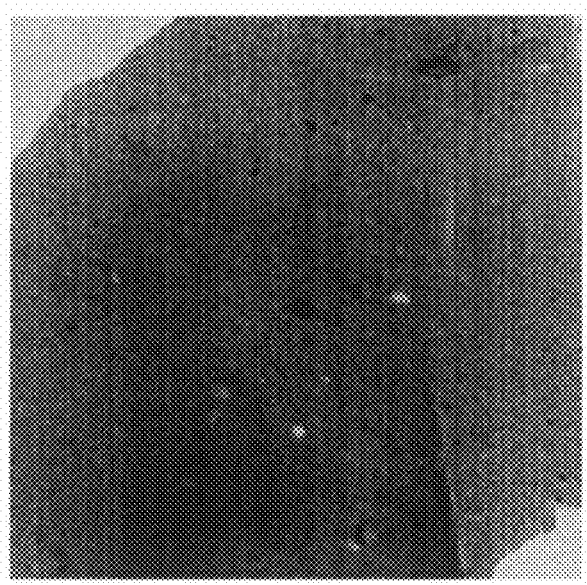
FIG. 5 is a photograph showing a 1 in×1 in square of composite C12, using Cabosil EH-5 SS-NT. 0.3% NT.
Figure 6:
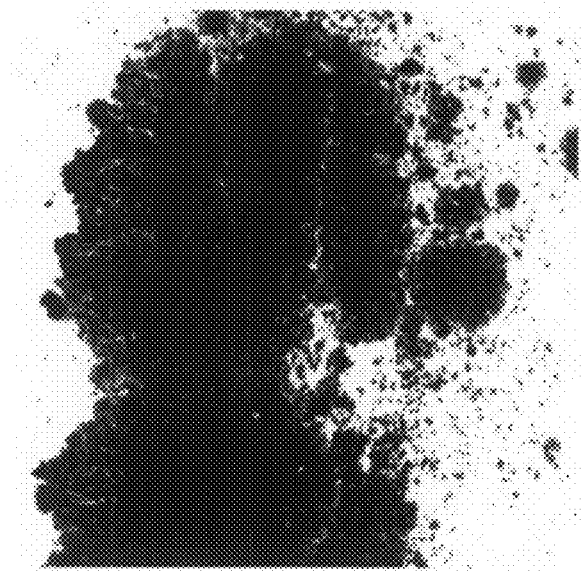
FIG. 6 is a photograph showing a 1 in×1 in square of composite C10, using Cabosil EH-5 SS-NT. 0.6% NT.

FIG. 5 shows another example from Cabosil EH-5 SS-NT; this time composite C12. Notice the difference in homogeneity between this sample and the ones in FIG. 3 using Hisil-210 silica, which contained the same 0.3% level of nanotubes. Composite C10, containing 0.6% NT, was so uniformly dark that films were not very transparent. This film is shown in FIG. 6 (compare to 1% NT Hisil 210 sample in FIG. 2). This further indicates the increased homogeneity in comparison to the Hisil 210 samples.

FIG. 7A shows an example in which the SS-NT was based on Syloid 244 silica. This was composite B6, which was formed by method C, polymerization. The 1 in×1 in square of film was very uniform and very dark even though it contained only 0.67% NT.

Figure 7:
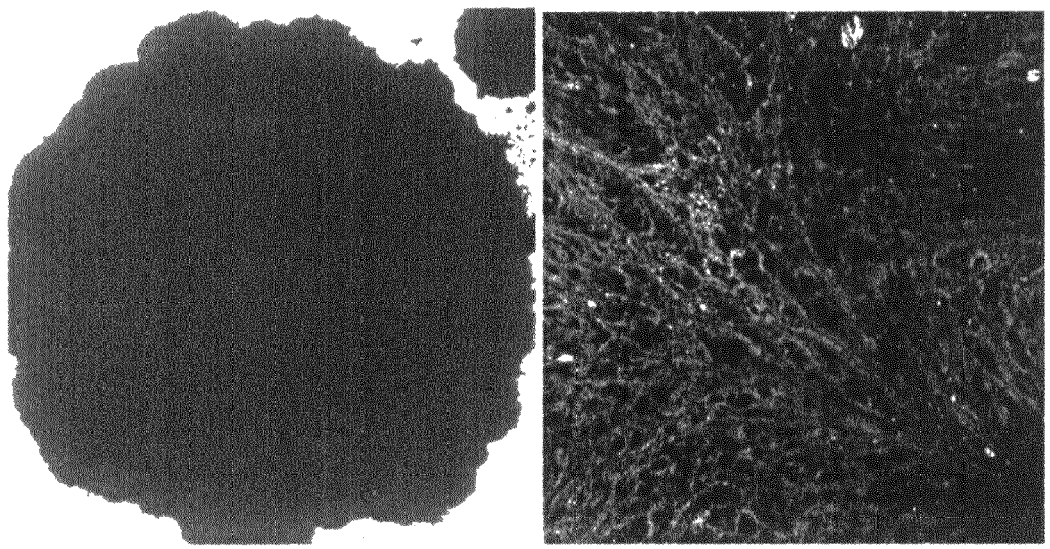
FIG. 7 is a photograph showing two films from Syloid 244 based SS-NT, incorporated by (a) polymerization or (b) suspension in PE/TCB solution (1 sq in, composites B6 and C7).

FIG. 7B shows another example in which the SS-NT was based on Syloid 244 silica, composite C7. However, this time it was incorporated by slurrying in a trichlorobenzene solution of polyethylene. Notably, this method of preparation produces a less uniform dispersion than polymerization from the same SS-NT. Both of these samples shown in FIGS. 7 and 7B contained about 0.64% nanotubes.

Figure 8:
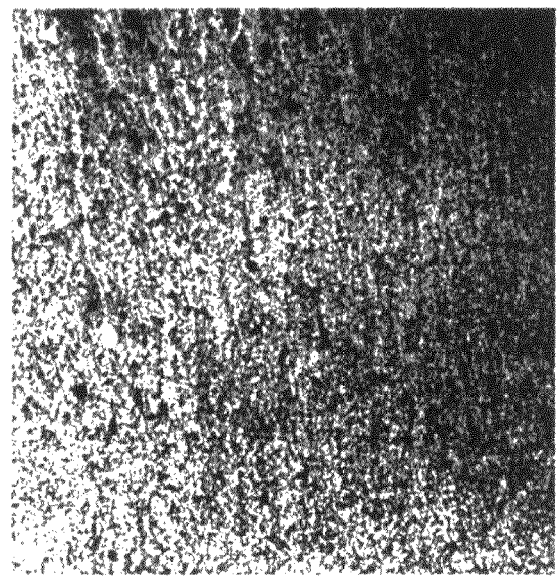

Another example of Syloid 244 SS-NT which was incorporated by suspension in a trichlorobenzene solution of polyethylene is shown in FIG. 8. The composite was B5, which contained about half the nanotube concentration as that in FIG. 13. Notice that it is also dark and fairly uniform, although not as homogeneous as that obtained by polymerization in FIG. 7A.

Figure 9:
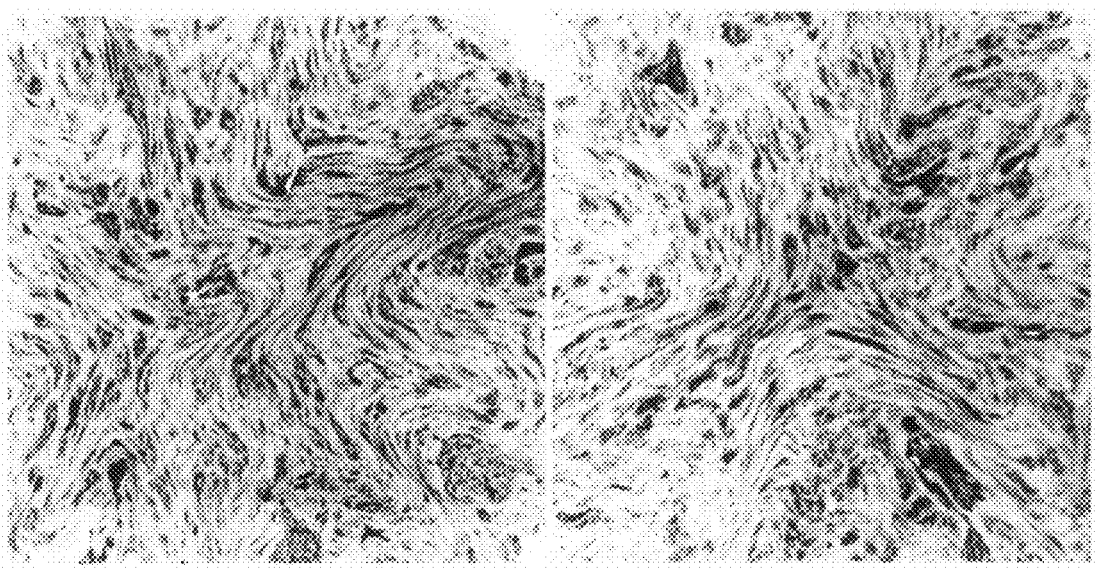

Another method of incorporating the nanotubes was method D, in which pure nanotubes were sonicated in n-methylpyrrolidone, from which magnesia was precipitated as a hydrogel. The films obtained from this approach gave mixed results. As an example, composite D3 is shown in FIG. 9 in the form of a 1"×1" square. The texture of this sample suggests that nanotube reagglomeration occurred sometime during the Procedure. It is also possible that with a large excess of magnesia, polymerization may not have been uniform. The film is shown before and after treatment with alcoholic HCl solution to remove the magnesia. Clearly this wash step did not change the nanotube distribution.

Figure 10:
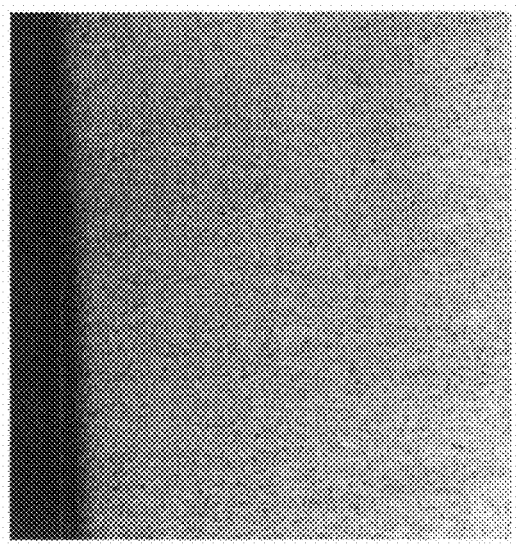

Another composite from nanotubes gelled in magnesia is D2, prepared similarly to D3 but without the final HCl wash. This composite was prepared using much less magnesia. This is shown in FIG. 10. The film appears to be quite uniform. While D3 fixed the nanotubes in about 10 times as much magnesia as nanotubes, D2 fixed them in a roughly equal weight of magnesia. This may also have contributed to the improved dispersion.

Figure 11:
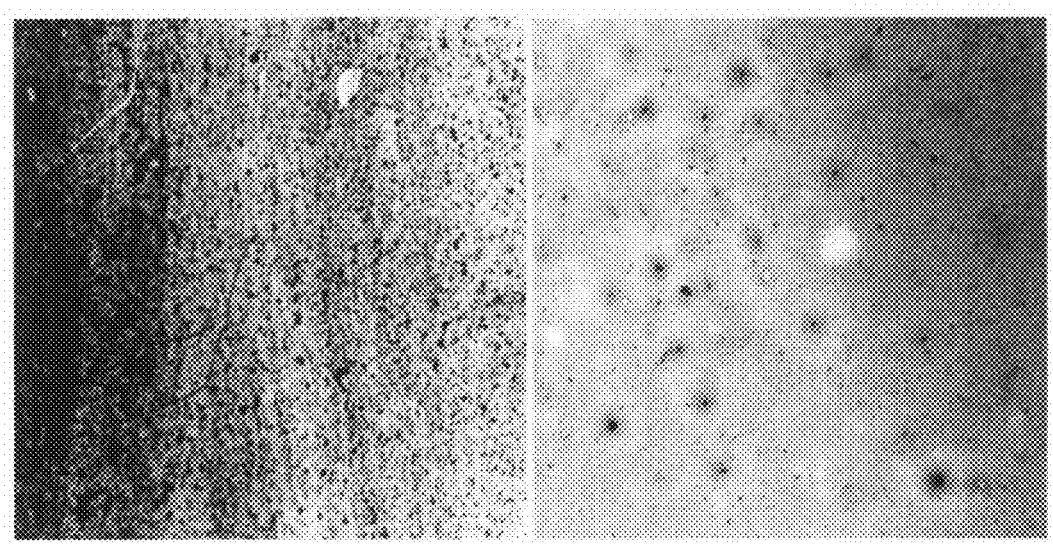

Finally another variation on this method of dispersal was also tested. In preparation D4, pure nanotubes were coated with pure Ziegler-Natta components, then dried and allowed to polymerize ethylene. FIG. 11 shows the film of this composite, before and after high intensity mixing in an extruder for 10 minutes. The unextruded film suggests that the nanotubes have remained in solid clumps. Extrusion helped break up and spread out these clumps to some extent, but considerable segregation still remains. Each remaining clump is surrounded by a darker area, indicating some spreading of these large nanotube clusters.

In summary, Hisil 210 samples were the least homogeneous and the Cabosil EH-5 samples were most uniformly distributed. Syloid 244 also produced very uniform samples. Using Syloid 244, it was possible to compare distribution by polymerization to distribution by suspension in PE/TCB solution. Distribution by polymerization was clearly preferred by this test. Distributing refined nanotubes by sonication in PE/TCB solution gave visually uniform samples, but gelling these same refined nanotubes in magnesia, followed by polymerization, gave mixed results.

Melt Rheology

Melt rheology measurements were obtained on all composites at 190° C. using a parallel plate viscometer. It was immediately apparent that these nanotubes, independent of dispersion method, exert a powerful influence on melt behavior. Even small amounts of nanotubes greatly increased the viscosity at all shear rates, and especially at low shear rates. This data is summarized in Table 1 below. Due to this unusually strong response the normal Carreau-Yasuda equation could not be applied to the majority of this data. In many cases these viscosity curves, or their visco-elastic derivatives, showed evidence of two populations widely separated in their relaxation behavior. Clearly these two contributions represent the two components in the composite—polymer and nanotubes. Another way of describing this strong viscosity response would be to call the composite a "network" or a "pseudo-network," in the rheological sense.

Figure 12:
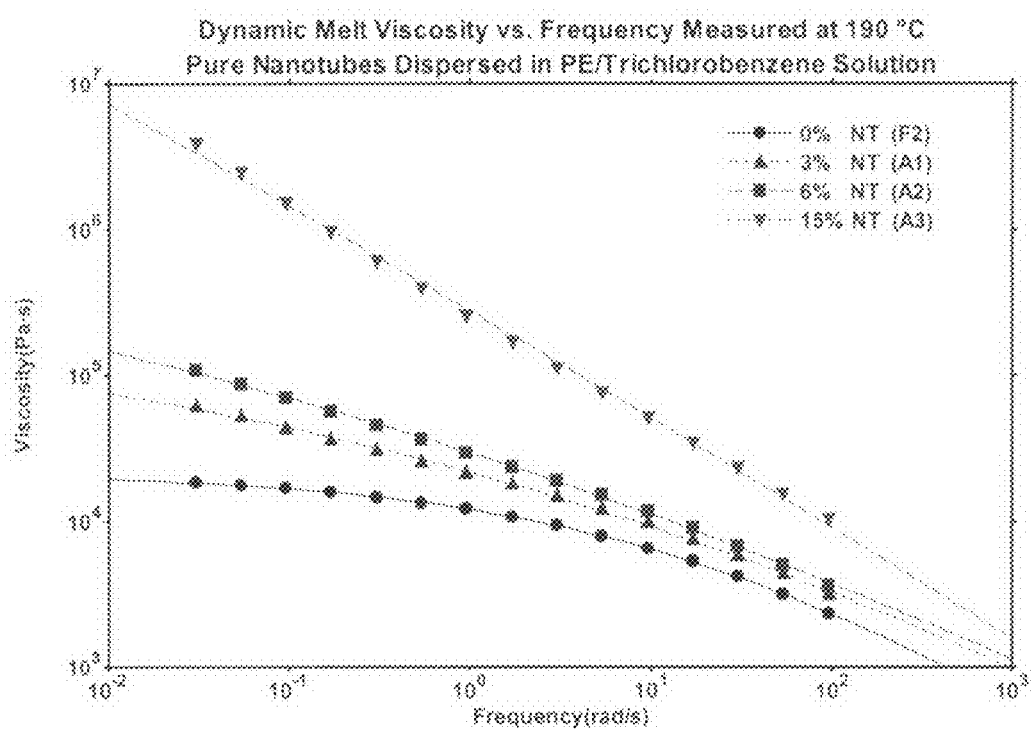
FIG. 12 is a graph showing viscosity curves for composites made by procedure A.

FIG. 12 shows the viscosity curves for several composites made by method A (NT and PE co-precipitated from TCB solution). Only the nanotube concentration was varied. The same polymer base was used in all cases. The increase in viscosity due to nanotubes is notable at all shear rates, but particularly so for the lower rates; low shear viscosity was observed to increase by several orders of magnitude.

Figure 13:
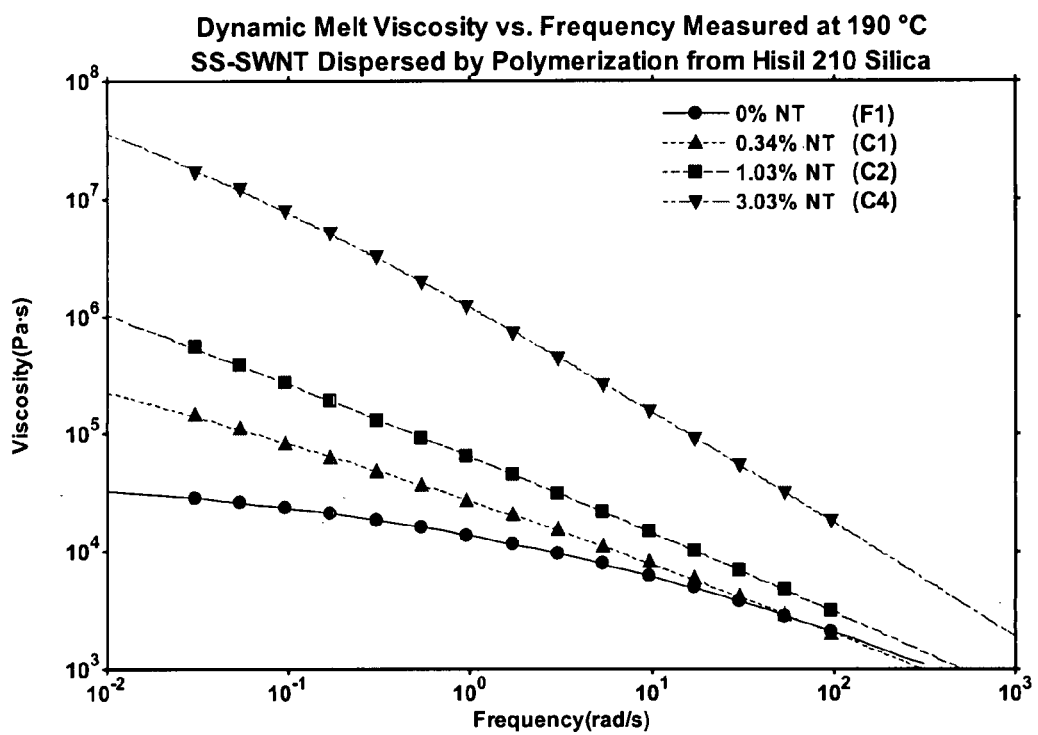
FIG. 13 is a graph showing viscosity curves for composites made by procedure B.

FIG. 13 plots the viscosity curves of several composites made by preparation method C (polymerization by SS-NT). These samples were made from Hisil 210 silica. Again the strong effect of the nanotubes is obvious—viscosity increases with NT concentration. However, by comparing FIGS. 12 and 13 it is clear that SS-NT has a much more powerful effect than the pure nanotubes (preparation methods C and A, respectively). Much less NT concentration is required in FIG. 13 than in FIG. 12 to achieve similar enhancements in viscosity.

TABLE 1

Rheological characterization of composites and control resins.

| Composite | Method | Base Support | % NT | Visc (0.01/sec) | Visc (0.1/sec) | Visc (100/sec) | Melt Index | HLMI | Tan Delta (0.1/sec) | Crossover Modulus HNGx | Mw/1000 | Inherent Viscosity |
|---|---|---|---|---|---|---|---|---|---|---|---|---|
| C14 | Polym-Cr | Inneos | 1.27% | 6.34E+05 | 1.88E+05 | 2.98E+03 | 0.015 | 2.062 | 0.8799 | 4.39E+03 | 307 | 2.91 |
| C3 | Polym-ZN | Hisil 210 | 0.36% | 1.45E+07 | 2.86E+06 | 1.03E+04 | 0.000 | 0.002 | 0.4502 | 1.55E+04 | 938 | 7.34 |
| C1 | Polym-ZN | Hisil 210 | 0.34% | 2.35E+05 | 8.35E+04 | 2.04E+03 | 0.085 | 8.457 | 1.1220 | 1.43E+04 | 236 | 2.56 |
| C2 | Polym-ZN | Hisil 210 | 1.03% | 1.04E+06 | 2.66E+05 | 3.12E+03 | 0.004 | 1.165 | 0.7180 | 4.54E+02 | 196 | 2.16 |
| C4 | Polym-ZN | Hisil 210 | 3.03% | 3.66E+07 | 7.50E+06 | 1.77E+04 | 0.000 | 0.000 | 0.4157 | 1.30E+05 | 800 | |
| D1 | Polym-ZN | SiO2 | 0.22% | 4.43E+04 | 1.87E+04 | 7.40E+02 | 1.127 | 102.5 | 1.4250 | 2.00E+04 | 169 | 1.96 |
| D2 | Polym-Gel | MgO | 1.72% | 1.07E+07 | 1.92E+06 | 5.06E+03 | 0.000 | 0.003 | 0.3733 | 1.31E+04 | 854 | 6.97 |
| D3 | Polym-Gel | MgO | 0.30% | 1.76E+07 | 2.70E+06 | 7.04E+03 | 0.000 | 0.000 | 0.3086 | 2.99E+03 | 1173 | 8.75 |
| D4 | Polym-ZN | None | 0.74% | 3.03E+03 | 1.20E+03 | 6.08E+01 | 151.200 | 12140 | 1.3430 | 9.60E+04 | 86 | 1.11 |
| A1 | TCB | None | 3.20% | 7.71E+04 | 4.38E+04 | 3.32E+03 | 0.213 | 7.290 | 2.2230 | 2.88E+05 | 173 | 2.20 |
| A3 | TCB | None | 15.00% | 7.06E+06 | 1.44E+06 | 9.20E+03 | 0.000 | 0.007 | 0.4911 | 2.36E+00 | 173 | 2.20 |
| A2 | TCB | None | 6.00% | 1.54E+05 | 7.00E+04 | 3.82E+03 | 0.114 | 5.041 | 1.6390 | 2.95E+05 | 173 | 2.20 |
| A4 | DCB | None | 3.53% | 3.76E+04 | 2.57E+04 | 2.20E+03 | 0.398 | 13.62 | 3.2090 | 1.15E+05 | 173 | 2.20 |
| B2 | TCB | Syloid 244 | 0.96% | 2.96E+07 | 4.80E+06 | 1.74E+04 | 0.000 | 0.000 | 0.3342 | 7.50E−01 | 106 | 1.46 |
| B6 | TCB | Syloid 244 | 0.64% | 4.99E+06 | 9.57E+05 | 5.48E+03 | 0.000 | 0.030 | 0.4628 | 1.83E+00 | 106 | 1.46 |
| B5 | TCB | Syloid 244 | 0.32% | 5.21E+04 | 2.47E+04 | 1.38E+03 | 0.572 | 29.8 | 1.7710 | 8.43E+04 | 106 | 1.46 |
| C7 | Polym-ZN | Syloid 244 | 0.67% | 5.50E+07 | 7.24E+06 | 7.42E+03 | 0.000 | 0.001 | 0.0581 | 3.58E+05 | 409 | 3.79 |
| C8 | Polym-ZN | Cab. EH5 | 0.43% | 4.57E+07 | 1.40E+07 | 3.15E+04 | 0.000 | 0.000 | 0.2385 | 1.83E+03 | 445 | 3.65 |
| C9 | Polym-ZN | Cab. EH5 | 0.22% | 1.70E+07 | 3.27E+06 | 1.05E+04 | 0.000 | 0.001 | 0.4361 | 2.49E+04 | 908 | 7.12 |
| C10 | Polym-ZN | Cab. EH5 | 0.61% | 4.29E+08 | 1.21E+07 | 1.54E+04 | 0.000 | 0.000 | 0.0695 | 1.16E+02 | 800 | |
| C12 | Polym-ZN | Cab. EH5 | 0.36% | 2.38E+07 | 5.04E+06 | 1.83E+04 | 0.000 | 0.001 | 0.4917 | 5.16E+04 | 800 | |
| F5 | Control | | 0.00% | 3.38E+06 | 1.17E+06 | 8.68E+03 | 0.001 | 0.045 | 0.8577 | 6.35E+04 | 895 | 7.00 |
| F4 | Control | | 0.00% | 9.68E+03 | 7.01E+03 | 9.92E+02 | 1.97 | 65.6 | 4.0420 | 1.53E+05 | 141 | 1.79 |
| F1 | Control | | 0.00% | 3.41E+04 | 2.37E+04 | 2.11E+03 | 0.437 | 14.8 | 3.3040 | 1.17E+05 | 225 | 2.49 |
| F2 | Control | | 0.00% | 2.03E+04 | 1.70E+04 | 2.35E+03 | 0.534 | 13.3 | 6.5660 | 1.38E+05 | 173 | 2.20 |
| F10 | Control | | 0.00% | 2.42E+03 | 2.30E+03 | 7.03E+02 | 4.75 | 117.9 | 12.0900 | 1.53E+05 | 110 | 1.50 |
| F6 | Control | | 0.00% | 7.71E+04 | 4.17E+04 | 1.95E+03 | 0.246 | 12.9 | 1.9220 | 5.39E+04 | 248 | 2.54 |
| F7 | Control | | 0.00% | 3.47E+03 | 2.53E+03 | 4.04E+02 | 7.95 | 301 | 3.8810 | 1.50E+05 | 89 | 1.31 |
| F8 | Control | | 0.00% | 6.03E+03 | 4.26E+03 | 5.68E+02 | 4.31 | 174 | 3.5250 | 1.16E+05 | 106 | 1.46 |
| F9 | Control | | 0.00% | 2.76E+05 | 1.63E+05 | 5.13E+03 | 0.035 | 1.224 | 2.0140 | 8.69E+04 | 406 | 3.87 |
| F3 | Control | | 0.00% | 3.09E+06 | 1.27E+06 | 1.05E+04 | 0.002 | 0.045 | 1.1390 | 1.14E+05 | 794 | 6.58 |
| F11 | Control | | 0.00% | 4.08E+05 | 2.64E+05 | 7.33E+03 | 0.020 | 0.490 | 2.4140 | 1.27E+05 | 413 | 4.20 |
| F12 | Control | | 0.00% | 1.89E+02 | 1.48E+02 | 5.87E+01 | 128 | 2070 | 5.5800 | 2.23E+13 | 42 | 0.72 |

Figure 14:
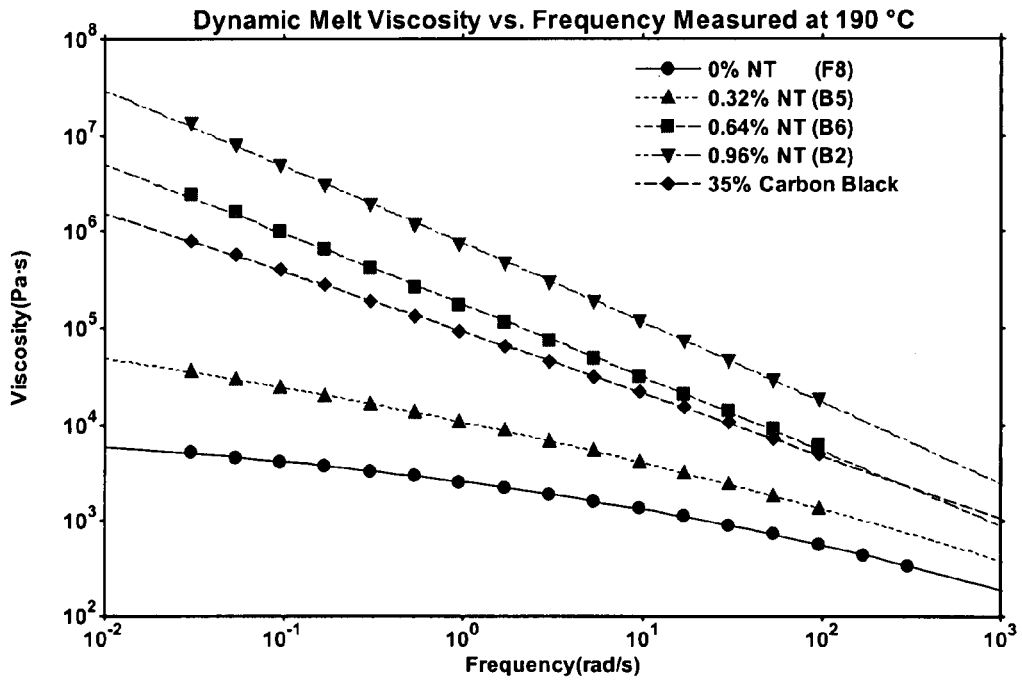
FIG. 14 is a graph showing viscosity curves for composites made from method B using Syloid 244 silica.

FIG. 14 shows still another series of viscosity curves, this time made by preparation method B (SS-NT and PE co-precipitated from TCB solution). The SS-NT used Syloid 244 as the base silica. Again, the nanotubes have a remarkable impact on viscosity. In this case, the Syloid 244 based SS-NT provided a still more powerful effect than was observed for series A or C, above. A 0.6% NT composite prepared by method B, in FIG. 14, has viscosity increased by about the same amount as the 3% NT composite did in FIG. 13. Thus we conclude that Syloid 244 (having finer particle size) was about 4-5 times more effective than Hisil 210. Likewise, the Syloid based SS-NT (FIG. 14) are about 20-30 times more effective than the pure nanotubes used in series A (FIG. 12).

It is also interesting to compare the viscosity enhancement from nanotubes with that from other fillers. FIG. 14 shows the viscosity curve from similar PE resins into which amorphous carbon black (perhaps the closest conventional filler in terms of chemical composition) was blended. Carbon black, having a particle size of several microns, is widely used as an additive in commercial PE to provide ultraviolet light protection. The normal loading of 2% has a negligible effect on melt viscosity. The "masterbatch blend" shown in FIG. 14 contained 35% carbon black. At this level there is a noticeable increase on viscosity, but the magnitude of this increase from 35% CB is approximately equivalent to that of 0.5% NT in FIG. 14, or about 10% NT using the pure nanotubes in FIG. 12.

Figure 15:
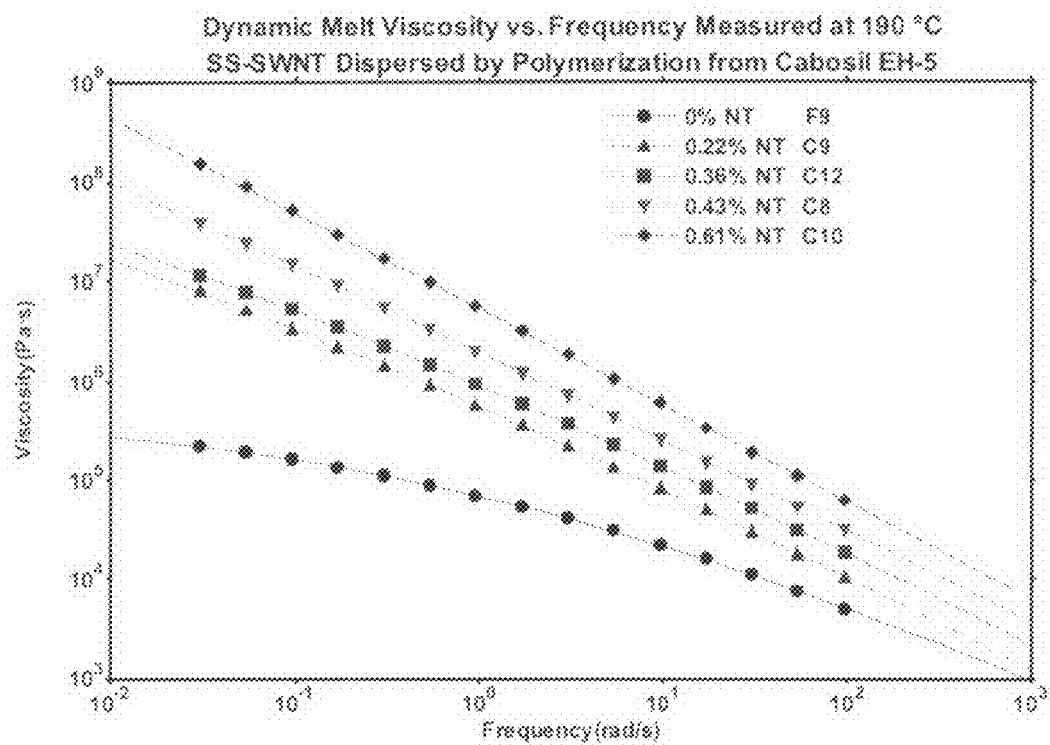
FIG. 15 is a graph showing viscosity curves of composites based on polymerization from Cabosil EH-5.

Finally FIG. 15 shows yet another series of viscosity curves, this time from method C, polymerization from SS-NT, in which the silica base was Cabosil EH-5. In this series the NT influence on viscosity is very similar to that of Syloid 244 in FIG. 14, though perhaps slightly stronger. Again this suggests that the fine particle size of the Cabosil is helpful.

It is not always obvious from the viscosity curves alone which dispersal method is most effective. This is because the different dispersal methods often used (or produced in the case of preparation C and D) polymers of different molecular weight, and therefore of different natural viscosity. For example, compare the base polymer (0% NT) in FIG. 14 to that in FIG. 15. One way to address this is to select a certain reference frequency, then subtract the polymer viscosity at that frequency from the composite viscosity measured at the same frequency.

To quantify the viscosity changes brought about by nanotubes, the following treatment was used. Control polymers were made, without nanotubes, with widely varying molecular weight from the same Ziegler-Natta catalyst recipe used to make the experimental composites. Viscosity curves were obtained for these polymers. Two low-shear frequencies were then selected as reference points, 0.01/sec and 0.1/sec, at which viscosity readings were taken from each curve. These viscosity values were then plotted against molecular weight, and the resulting log-log plot formed a straight line. This line is similar to the so-called "3.4 power law" or "Arnett" line obtained for linear polyethylene, except the measured low-shear viscosity is used instead of the extrapolated zero-shear viscosity. This modification was necessary because it was not possible to extrapolate the extreme viscosity behavior observed from these nanotube composites. This line was then used as the reference for each composite. The composite viscosity, observed at 0.01/sec or 0.1/sec, was divided by the control viscosity at equivalent molecular weight to obtain a "viscosity response" from the nanotubes for each composite. The log of this ratio was then used for comparisons.

Figure 16:
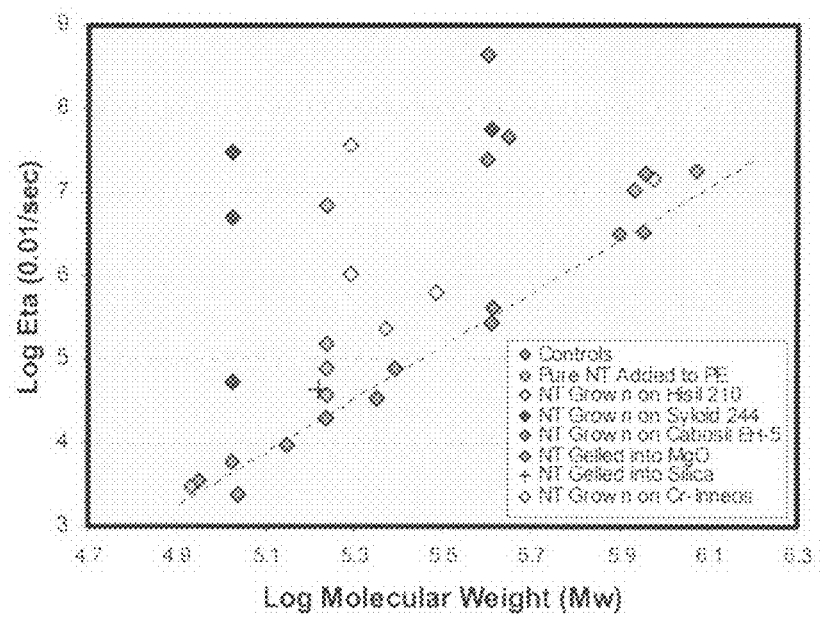
FIG. 16 is a graph showing dependence of viscosity at 0.01/sec as a function of molecular weight.
Figure 17:
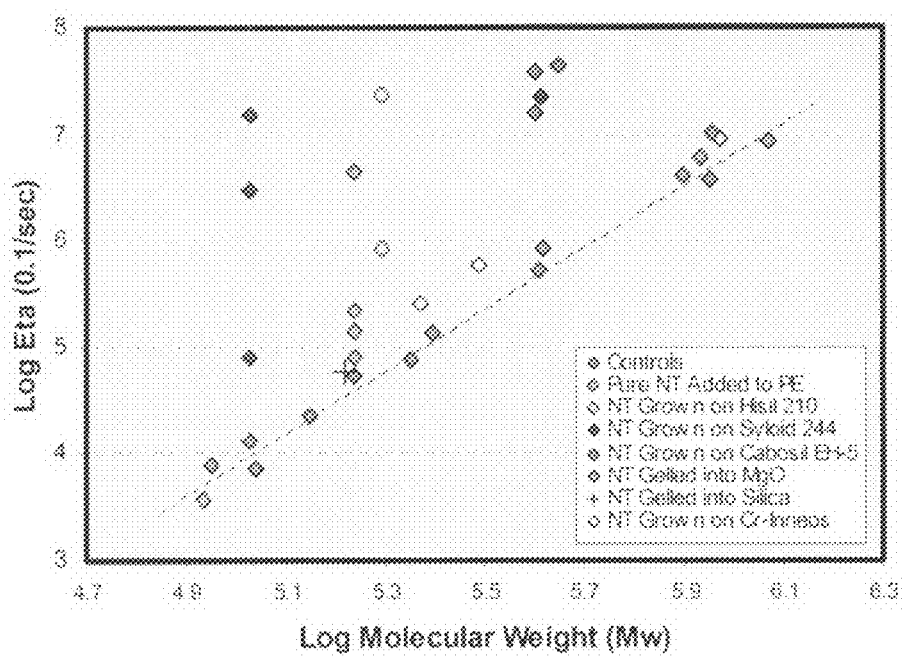
FIG. 17 is a graph showing dependence of viscosity at 0.1/sec as a function of molecular weight.

FIG. 16 gives an example of this treatment. The log of the viscosity of many samples, measured at 0.01/sec, is plotted against log of the weight average molecular weight ($M_w$). Notice that the control resins form a straight line. Notice also that nanotube composites are generally above this line. The difference (composite minus line) is taken as a quantification of the influence of the nanotubes. One can see in the figure that some methods of dispersal seem to be much more effective than others. A similar plot is also obtained at 0.1/sec shear rate. This is shown in FIG. 17.

To compare the effect of the nanotubes from different preparations, the "viscosity response factor" was used. This is the log of the composite viscosity (plotted in FIG. 16 or 17) minus the log of the control viscosity (the green line) at the same molecular weight. This "viscosity response factor" was then plotted against nanotube concentration in the composite for the various different dispersal methods. This plot is shown in FIG. 18 (at 0.01/sec) and in FIG. 19 (at 0.1/sec).

Figure 18:
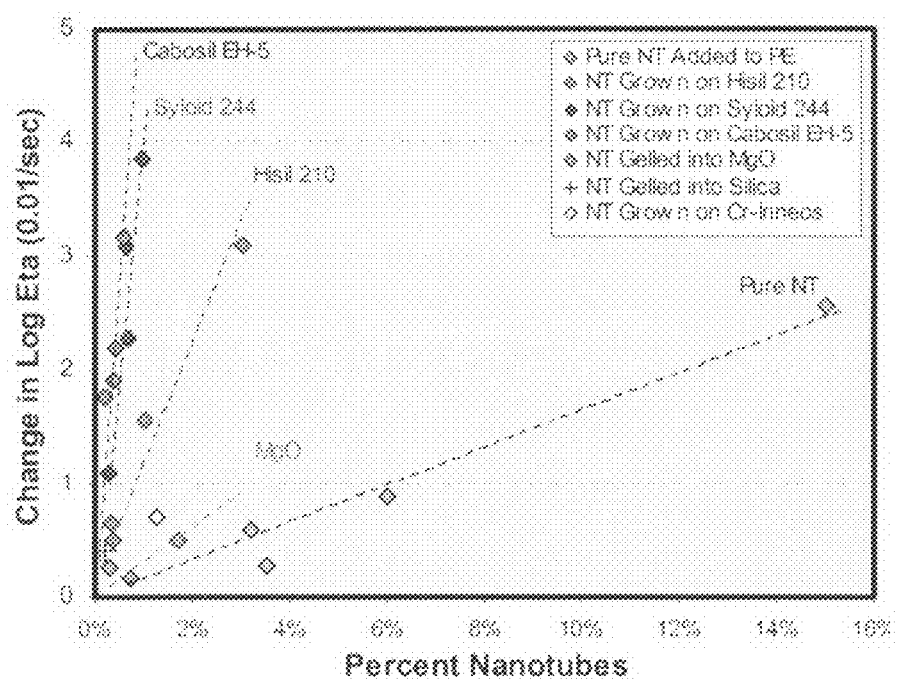
FIG. 18 is a graph showing viscosity response factor at 0.1/sec as a function of nanotube concentration for various dispersal methods.

Inspecting FIG. 18 one can see a line running through the origin for each of several families of composites. As could be surmised from the viscosity curves themselves, precipitating the pure nanotubes from PE/trichlorobenzene solution (method A) had the lowest viscosity response of all. The corresponding line had a slope of 0.16. That is, each percent of nanotubes increased the viscosity by a factor of $10^{0.16}$, or about $\sqrt{2}$. Next in effectiveness were the samples made from magnesia gel, which form the orange line in FIG. 18. These composites were only marginally more viscous than the pure NT line when adjusted for nanotube concentration. The slope of this line was 0.29, meaning that each percent of nanotubes increased viscosity by a factor of $10^{0.29}$, or about $\sqrt{2}$.

Regarding composites made by polymerization (method C) using SS-NT based on Hisil 210 silica, this approach was much more effective at increasing viscosity than method A (FIG. 18).

Regarding composites made from SS-NT based on Syloid 244 silica, the steep slope of this line (FIG. 18) indicates that this silica is much more effective than Hisil 210 when used in this application. As suggested previously, this difference can be explained by Syloid 244's relatively high surface area, high mesopore volume, low sodium, and very small particle size. The slope of the line is 4.0, meaning that each percent of nanotubes added raises the viscosity by $10^4$. All of these composites except one were made by method B, precipitated from PE/trichlorobenzene solution. This indicates that suspension in TCB does not in itself cause the low efficiency observed in the pure NT composites (the violet line). One composite from this series was generated via polymerization from a SS-NT based on Syloid 244. It seems to lie on the same line as the other samples, indicating, in this case at least, that the choice of dispersion method is less significant than the choice of silica.

Finally, the most effective carbon-nanotube dispersion method, of those investigated in this study, is represented by samples made by polymerization from SS-NT based on Cabosil EH-5 silica (FIG. 18). This silica is a flame hydrolyzed, feathery material with surface area of 400 m$^2$/g, which may account for its increased efficiency. The slope of this line is 5.38.

Figure 19:
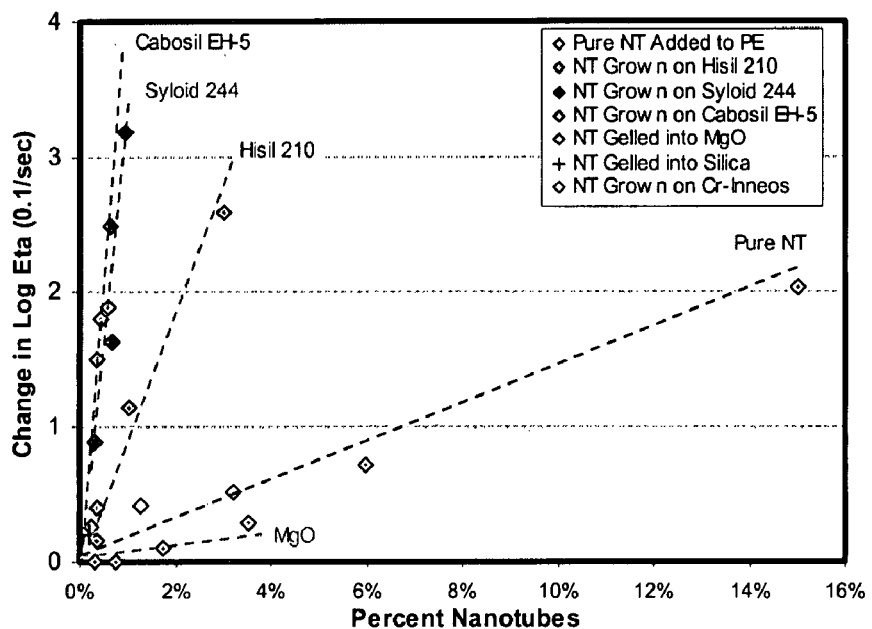
FIG. 19 is a graph showing viscosity response factor at 0.1/sec as a function of nanotube concentration for various dispersal methods.

FIG. 19 shows the viscosity response factor for these same samples when measured at a shear rate of 0.1/sec instead of 0.01/sec. In general the two FIGS. 18 and 19) are similar, and lead to the same conclusions. The slopes of all these lines are shown in Table 2 below. It is remarkable that each method yields the same rank order (elasticity is described below), and also approximately the same magnitude. To illustrate this surprising agreement between the methods, Table 3 shows the same slopes, only normalized.

TABLE 2

Response factors* to nanotubes (line slope from figures).

Figure 24:
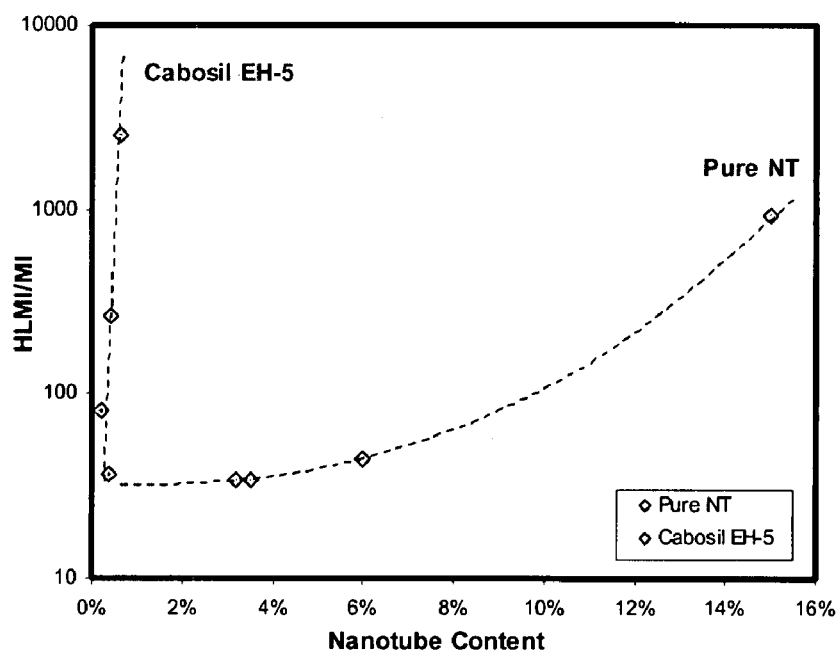
FIG. 24 is a graph showing HLM/MI ratio as a function of nanotube concentration for the two composite extremes High HLM/MI indicates high elasticity.
Figure 25:
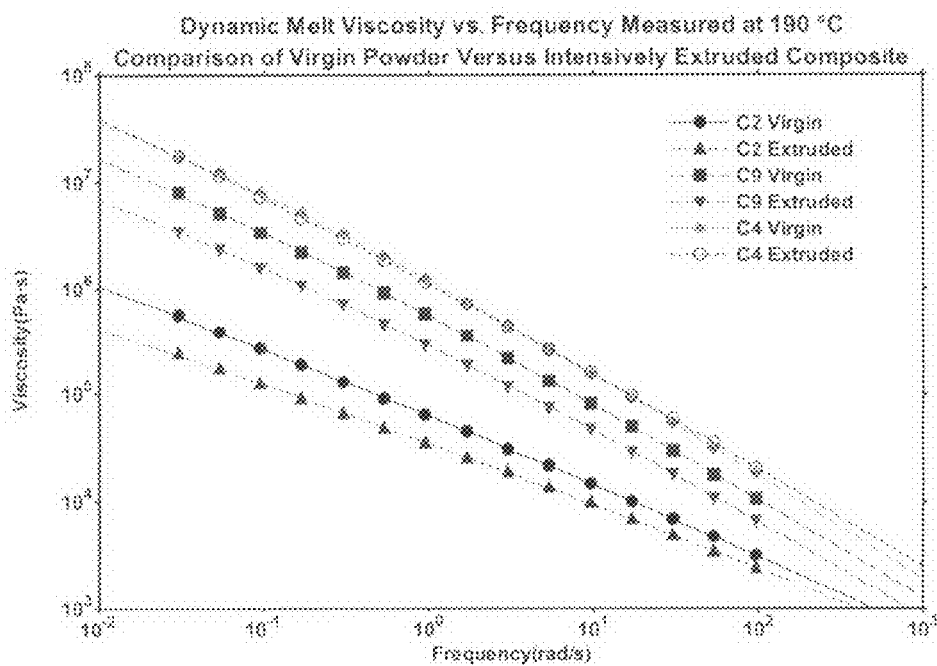
FIG. 25 is a graph showing viscosity curves before and after three composites were subjected to intensive mixing extrusion.
Figure 27:
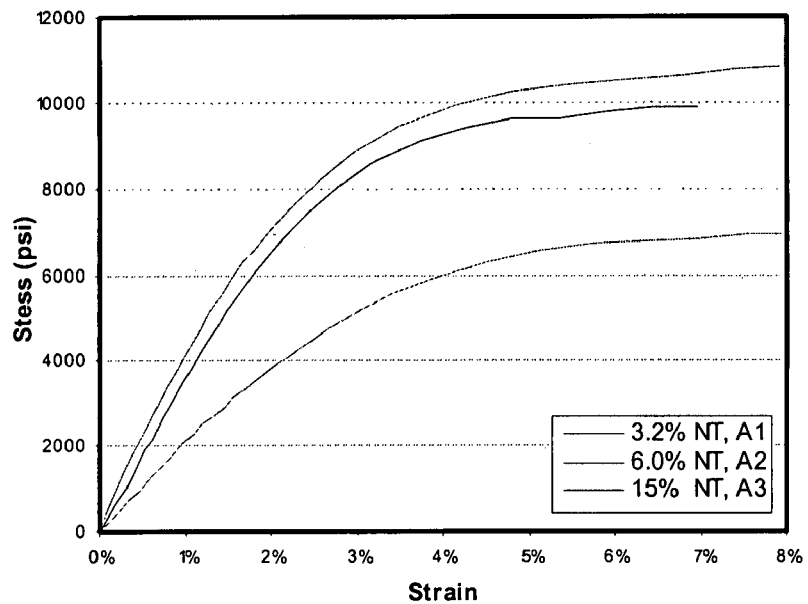
FIG. 27 is a graph showing flexural curves for composites made by method A, pure nanotubes suspended in PE/TCB solution, and precipitated.
Figure 29:
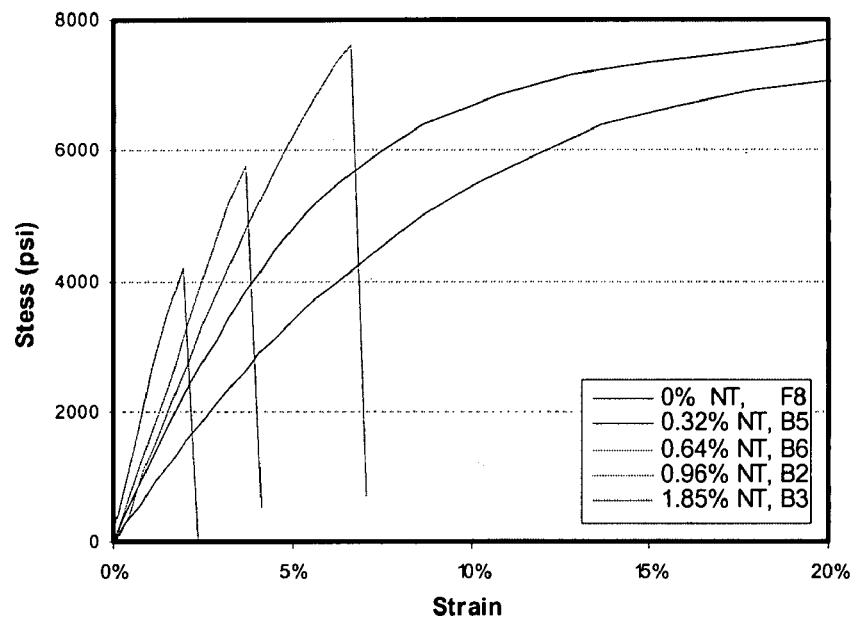
FIG. 29 is a graph showing flexural curves for composites made by method B, coprecipitation from PE/TCB solution, n using nanotubes supported on Syloid 244 silica.
Figure 30:
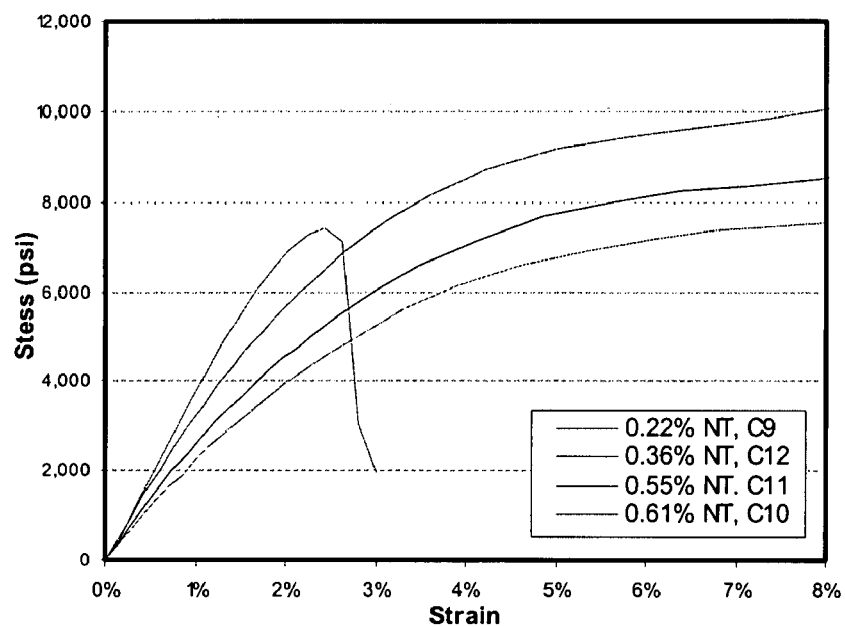
FIG. 30 is a graph showing flexural curves for composites made by polymerization using Cabosil EH-5 supported nanotubes.
Figure 37:
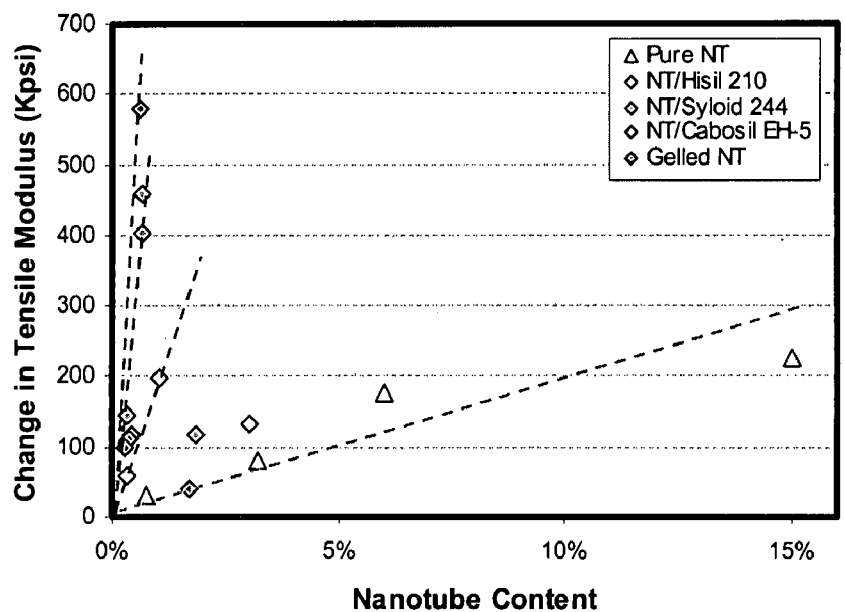
FIG. 37 is a graph showing change in tensile modulus with varying nanotube concentration for various composite families.
Figure 42:
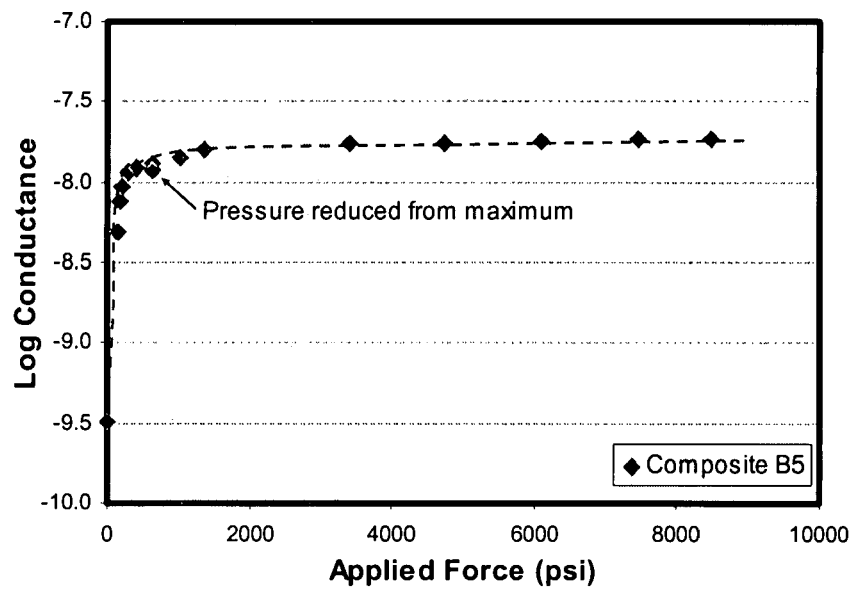
FIG. 42 is a graph showing conductivity of composite B5 as a function of externally applied pressure.
Figure 43:
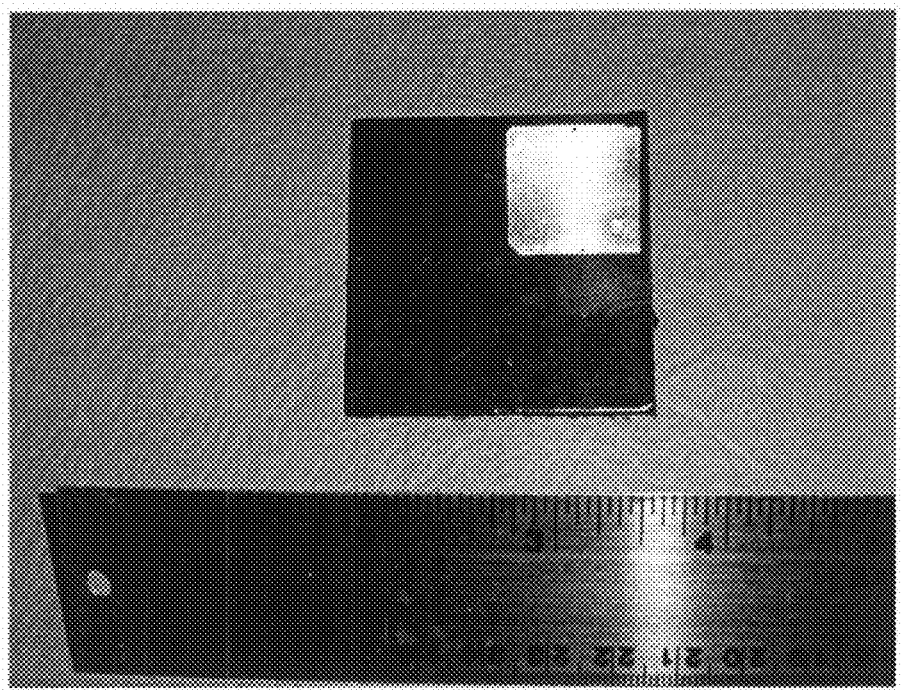
FIG. 43 is a photograph showing a metal foil imbedded by press-molding into surface of plaque.
Figure 44:
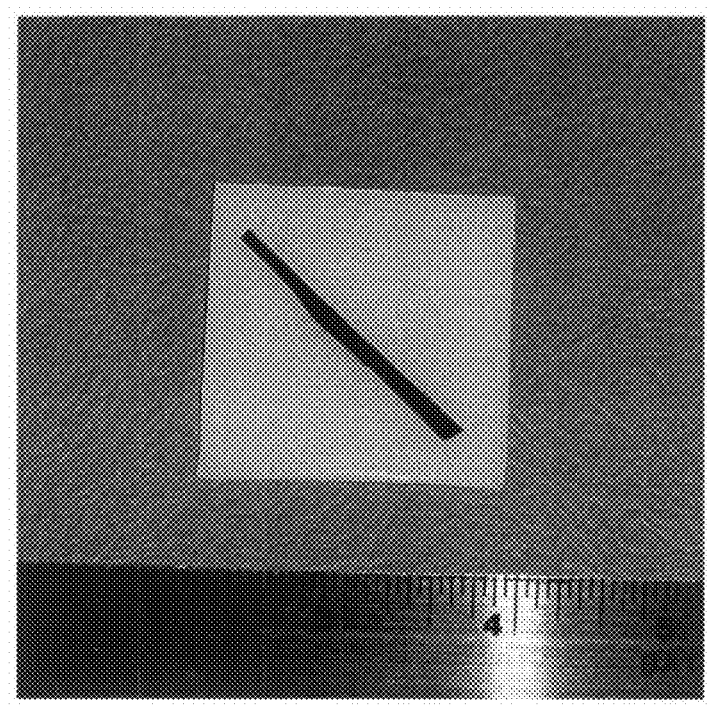
FIG. 44 is a photograph showing a thin strip of conductive film press-molded onto the surface of a non-conductive plaque.
Figure 45:
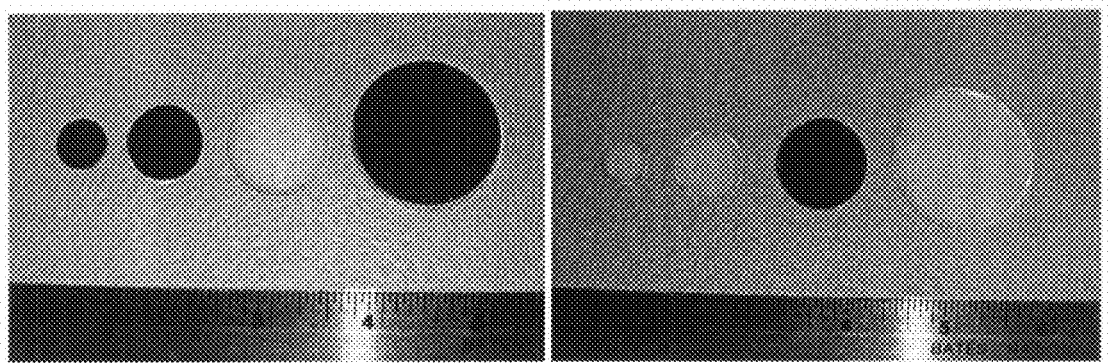
FIG. 45 is a photograph showing objects painted with sonicated NT/TCB suspension on one side, then press-molded to form a black surface layer containing conductive, embedded nanotubes. Forward and reverse views.
Figure 46:
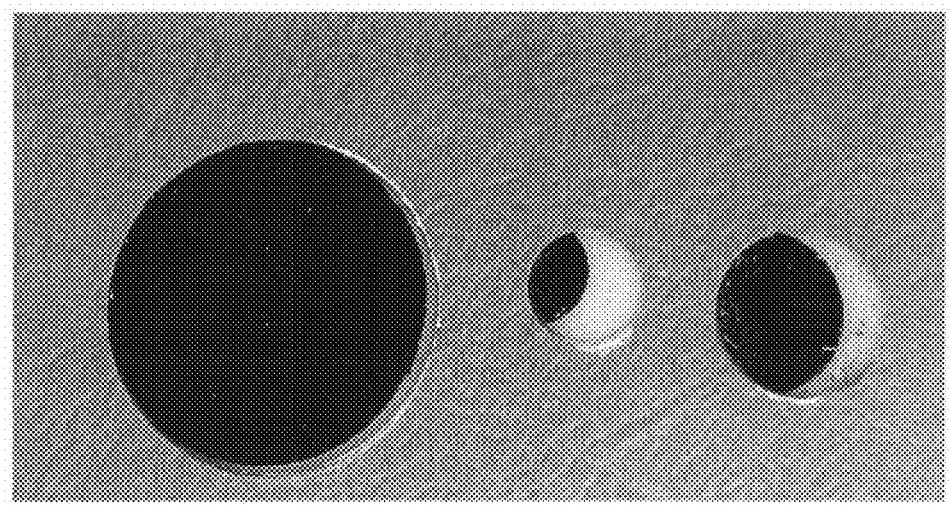
FIG. 46 is a photograph showing objects painted with NT/TCB suspension and press-molded to form a embedded nanotube surface that is conductive and cannot be easily removed.

| | | Method = | | | | |
|---|---|---|---|---|---|---|
| | | Pure NT | MgO | Hisil 210 | Syloid 244 | Cabosil EH-5 |
| Viscosity (0.01/sec) | FIG. 24 | 0.16 | 0.29 | 1.09 | 4.00 | 5.38 |
| Viscosity (0.1/sec) | FIG. 25 | 0.13 | 0.06 | 0.88 | 3.20 | 3.75 |
| Elasticity (Tan Delta) | FIG. 27 | 0.6 | 2.1 | 5.2 | 15.5 | 20.9 |
| Shear Response | FIG. 29 | 0.26 | 2.00 | 3.00 | 6.55 | 9.35 |
| HLMI/MI | FIG. 30 | 18 | | | | 605 |
| Flexural Modulus | FIG. 37 | 997 | 3577 | 4707 | 14306 | 25000 |
| Tensile Modulus | FIG. 42 | 2000 | | 19417 | 62656 | 94933 |
| Elongation | FIG. 43 | −27 | −139 | −131 | −258 | −703 |
| Conductivity | | 144 | 238 | 345 | 1767 | 2533 |

(*For example, a viscosity slope of n indicates that each 1% NT increases the viscosity by $10^n$.)

TABLE 3

Normalized response factors.

| | | Method = | | | | |
|---|---|---|---|---|---|---|
| | | Pure NT | MgO | Hisil 210 | Syloid 244 | Cabosil EH-5 |
| Viscosity (0.01/sec) | FIG. 24 | 3.0% | 5% | 20% | 74% | 100% |
| Viscosity (0.1/sec) | FIG. 25 | 3.5% | 2% | 23% | 85% | 100% |
| Elasticity (Tan Delta) | FIG. 27 | 2.6% | 10% | 25% | 74% | 100% |
| Shear Response | FIG. 29 | 2.8% | 21% | 32% | 70% | 100% |

TABLE 3-continued

Normalized response factors.

| | | Method = | | | | |
|---|---|---|---|---|---|---|
| | | Pure NT | MgO | Hisil 210 | Syloid 244 | Cabosil EH-5 |
| HLMI/MI | FIG. 30 | 3.0% | | | 57% | 100% |
| Flexural Modulus | FIG. 37 | 4.0% | 14% | 19% | 57% | 100% |
| Tensile Modulus | FIG. 42 | 2.1% | | 20% | 66% | 100% |
| Elongation | FIG. 43 | 3.9% | 20% | 19% | 37% | 100% |
| Conductivity | | 5.7% | 12% | 14% | 73% | 100% |

Figure 20:
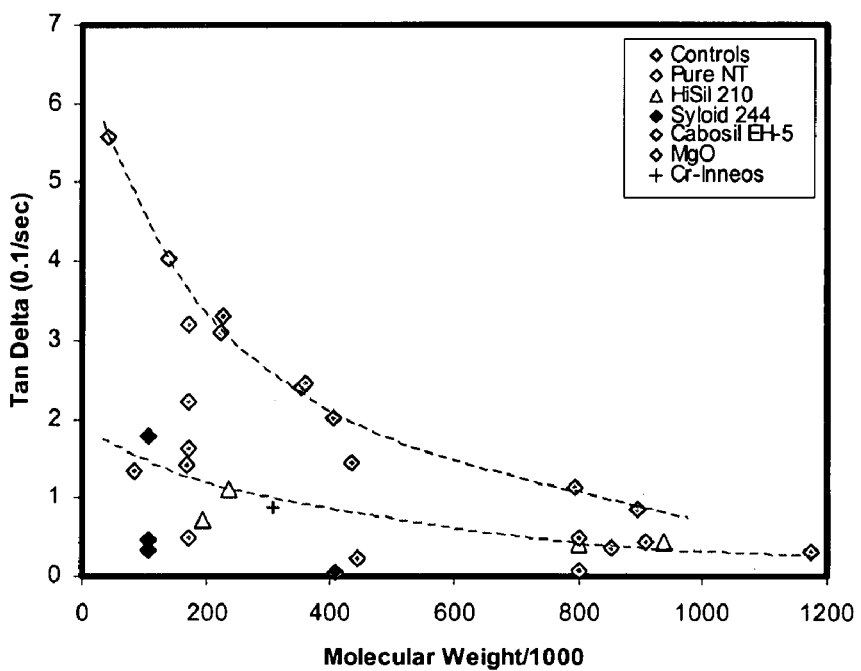
FIG. 20 is a graph showing tan delta at 0.1/sec as a function of molecular weight for various dispersal methods. Low tan delta indicates high elasticity.

Another effect of the SWNTs on the melt rheology of the polymer composite is an increase in elasticity. One measure of elasticity is the tan delta, which is the ratio of the loss modulus to the storage modulus. Thus a decrease in tan delta indicates an increase in elasticity. A low shear rate, like 0.1/sec, is usually chosen for comparisons. The tan delta for the polymer composites and control resins is listed in Table 1. Since elasticity is also a function of molecular weight, it is customary to plot tan delta against $M_w$. FIG. 20 presents such a plot. Notice that tan delta (0.1/sec) decreases for the control resins as the molecular weight is raised, making a well defined line. This line was used as the reference line. Composite tan deltas all lie below the reference line, indicating that the SWNTs increase the elasticity of the resin, often by a large amount.

Figure 21:
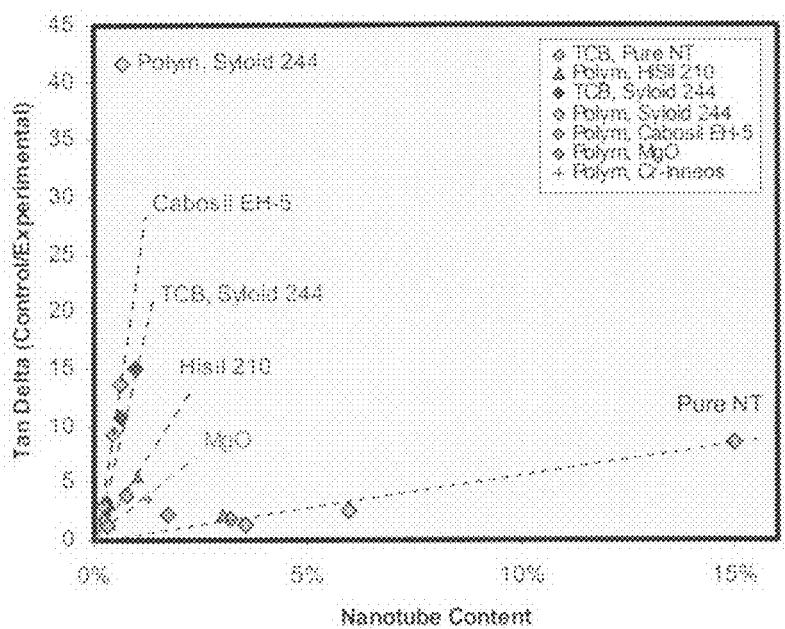
FIG. 21 is a graph showing tan delta at 0.1/sec as a function of molecular weight for various dispersal methods. Low tan delta indicates high elasticity.

The green line in FIG. 20 can be used much like the reference line in FIG. 16. The further the tan delta drops, the more elastic the composite is. To develop an "elasticity index" for comparison of these composites, we have divided the control tan delta by the composite tan delta, both at the same molecular weight, as was done in the case of viscosity. Therefore, the large observed "elasticity index" corresponds to a large increase in elasticity caused by the nanotubes. FIG. 21 shows this elasticity index for the various preparation methods.

FIG. 21 looks very similar to the viscosity response lines in FIG. 18; increasing the nanotube content also increases the elasticity. Pure nanotubes, added by dispersing in TCB, had the least effect on elasticity. SS-NT formed by gelling the nanotubes in a magnesia matrix were slightly more effective. Polymers made from SS-NT based on Hisil 210 were next. Finally TCB dispersed SS-NT from Syloid 244 was quite effective and polymers from Cabosil EH-5 were even a little better. It is the same ranking and magnitude seen from the viscosity curves. The slopes of these lines are listed in Tables 2 and 3 above.

There is one difference in FIG. 21, however; the one sample made by polymerization on Syloid 244 did not fall on the line with the composites made by TCB dispersal of Syloid 244. The method of dispersal by polymerization (method C) appears to be far superior in this example (versus method B). The slope of the method C line is three times that of method B, using the same silica.

Figure 22:
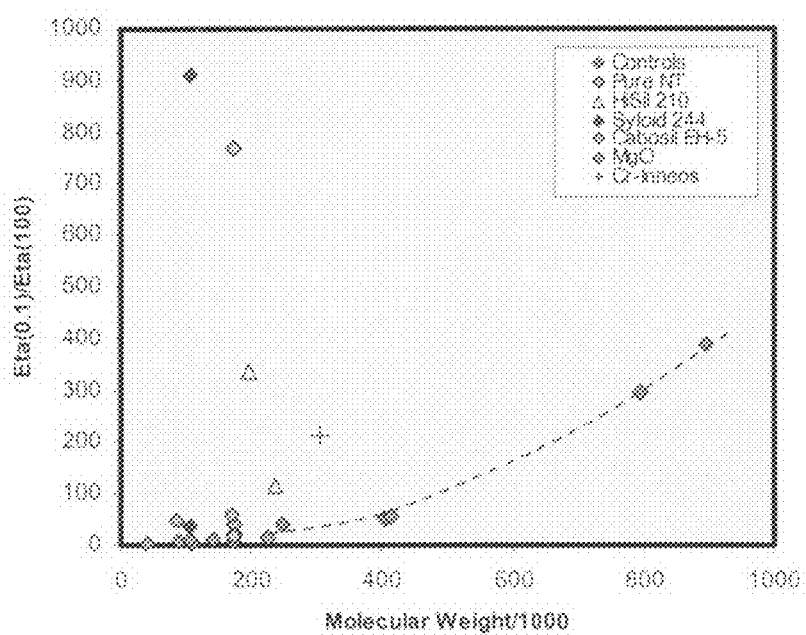
FIG. 22 is a graph showing shear response (SR) as a function of molecular weight for various dispersal methods. High SR indicates high elasticity.

Another measure of elasticity is the shear response of the viscosity curve. This is obtained by dividing the low shear viscosity eta (0.1/sec) by the high-shear viscosity eta (100/sec). This gives one measure of the slope of the viscosity curve. A high shear response indicates high elasticity. Again there is a molecular weight dependence. FIG. 22 shows the shear response plotted against molecular weight for these composites and control runs. The control runs form a tight line which can again serve as a reference line. All of the composites lie above the reference line, indicating increased elasticity. Many of them were so large that they could not be shown conveniently on the same axis in FIG. 22. To quantify the effect of nanotubes on shear response we developed the SR ratio. This was obtained by dividing the observed shear response (viscosity @ 0.1/sec over viscosity @ 100/sec) by the shear response expected from a control polymer of equal molecular weight.

Figure 23:
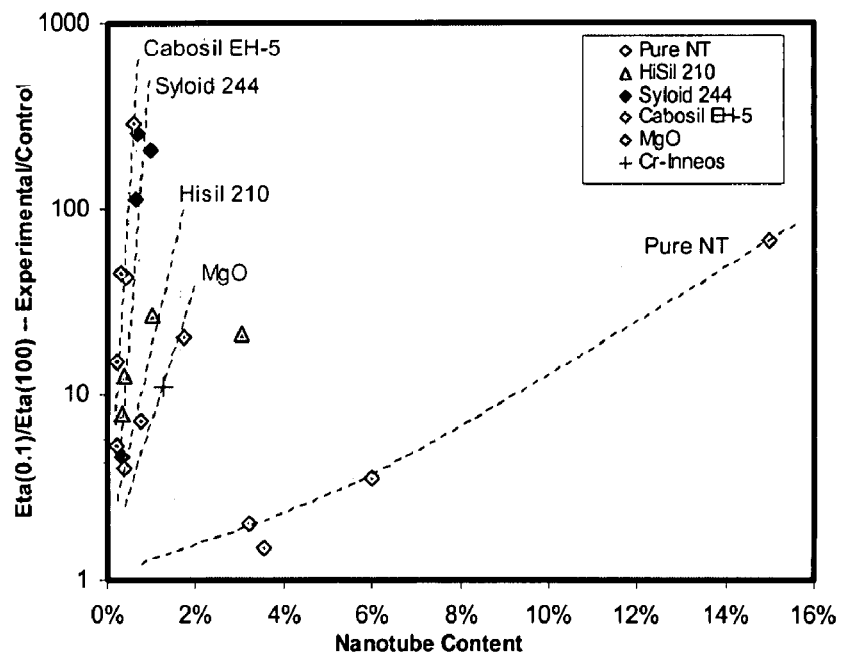
FIG. 23 is a graph showing shear response (SR) as a function of molecular weight for various dispersal methods. High SR indicates high elasticity.

FIG. 23 plots the SR ratio for various composites against the nanotube concentration. Again the same families of composites emerge as separate lines, in the same rank order, and of about the same magnitude. The Cabosil-EH5 group exhibited the highest increase in shear response, followed by Syloid 244, then Hisil 210, magnesia gel, and finally the pure nanotubes added via TCB solution were least effective. Again, there seemed to be a difference between preparation method B and method C when comparing Syloid 244 composites. The one Syloid sample that was made by polymerization was higher in shear response than the others made by precipitation from PE/TCB solution. In this case that difference from preparation method was not as pronounced as in FIG. 21.

The slopes of the lines in FIG. 23 (from the log plot as shown) are listed in Tables 2 and 3 above. The notable agreement between the results of these various methods, especially evident in Table 3 (the normalized table), refutes any doubt as to the dispersion methods' hierarchy of nanotube efficiencies (that is, the effectiveness of each nanotube).

One other, less precise, indicator of elasticity is the HLMI/MI ratio, both of which were also reported in Table 1. Plots of HLMI/MI versus Mw indicated no well behaved dependence on molecular weight for the control runs. Furthermore, plots of HLMI/MI against nanotube content also contained too much scatter to be meaningful on the whole. However, our two composite families that displayed the most extreme behavior (pure nanotubes by method A and polymerization from Cabosil SS-NT by method C) did seem to show a well defined trend, which is shown in FIG. 24. Again the Cabosil group exhibited a much stronger response than the pure NT group. The slopes of these lines are listed in Tables 2 and 3, and show agreement with the other methods.

It was questionable whether extrusion could further enhance the dispersion of these composites, and thereby increase their effectiveness. Hence, a small laboratory extruder was located in which the molten polymer could recirculate continuously for indefinite amounts of time. Three composites were chosen for this test, two using SS-NT and a third which used pure nanotubes. Rheology was obtained on these samples before extrusion, then about four grams of the material were intensively mixed in the extruder for 10-15 minutes at 240-260° C. About 0.2% BHT was added for stabilization. Afterward the polymer was molded into plaques and the rheology was obtained again for comparison (see FIG. 25).

Extrusion was not observed to enhance the nanotubes' effect on the viscosity of the composites. In the case of the composite containing pure nanotubes, C4, extrusion had no effect; the viscosity curve after extrusion was identical to that seen before extrusion. In the other two cases, where SS-NT from Hisil 210 was added, extrusion actually lowered the viscosity at all shear rates. This decrease in viscosity might be due in part to mechanical degradation of the polymer, even though 0.4% BHT was added.

Figure 26:
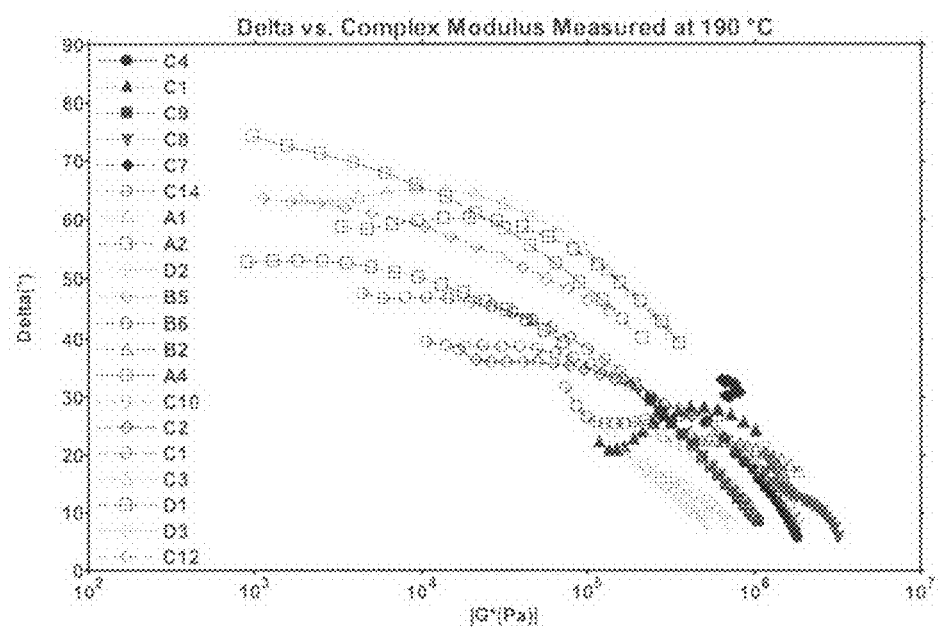
FIG. 26 is a graph showing a Van Gurp-Palmen Plot of all composites, indicating two components.

Finally, a VanGurp-Palmen plot of these composites is shown in FIG. 26. This type of plot is often used to judge the elasticity of polyethylene samples. Linear polyethylenes show a smooth curve progressing to 90 degrees at low frequencies. Other shapes, not moving toward 90 degrees on the right, indicate high elasticity, which can come from many sources. These composite plots indicate extremely high elasticity. Indeed, some of the shapes have not been seen before from polyethylene and can be considered extreme. Many of the composites turn down, then turn back up, indicating contributions from two components that exhibit extremely different relaxation behaviors. Of course these two contributions are ascribed to the polymer and, distinctly, the nanotubes.

Flexural Modulus

To determine the effect of nanotubes on the physical properties of polyethylene, two basic tests were conducted on small samples of these composites, flexural modulus and tensile modulus. The results of the flexural tests are listed in Table 4 below.

TABLE 4

Flexural Modulus Tests

| Composite | Process | Support | % NT | Mw/1000 | Fexural Modulus Kpsi |
|---|---|---|---|---|---|
| A1 | TCB | None | 3.20% | 173 | 222 |
| A2 | TCB | None | 6.00% | 173 | 406 |
| A3 | TCB | None | 15.00% | 173 | 471 |
| B1 | TCB | Hisil 210 | 3.82% | 201 | 480 |
| B2 | TCB | Syloid 244 | 0.96% | 106 | 430 |
| B3 | TCB | Syloid 244 | 1.85% | 106 | 500 |
| B5 | TCB | Syloid 244 | 0.32% | 106 | 368 |
| B6 | TCB | Syloid 244 | 0.64% | 106 | 494 |
| B7 | TCB | Syloid 244 | 1.28% | 106 | 572 |
| C1 | Pol-ZN | Hisil 210 | 0.34% | 237 | 227 |
| C2 | Pol-ZN | Hisil 210 | 1.03% | 201 | 364 |
| C3 | Pol-ZN | Hisil 210 | 0.36% | 942 | 255 |
| C4 | Pol-ZN | Hisil 210 | 3.03% | 400 | 385 |
| C6 | Pol-ZN | Syloid 244 | 1.53% | 400 | 446 |
| C7 | Pol-ZN | Syloid 244 | 0.67% | 409 | 400 |
| C8 | Pol-ZN | Cabosil EH-5 | 0.43% | 445 | 285 |
| C9 | Pol-ZN | Cabosil EH-5 | 0.22% | 500 | 315 |
| C10 | Pol-ZN | Cabosil EH-5 | 0.61% | 800 | 406 |
| C11 | Pol-ZN | Cabosil EH-5 | 0.61% | 500 | 401 |
| C12 | Pol-ZN | Cabosil EH-5 | 0.36% | 500 | 302 |
| C14 | Pol-Cr | Inneos | 1.27% | 300 | 286 |
| D1 | Pol-ZN | SiO2 | 0.22% | 176 | 241 |
| D2 | Pol-Gel | MgO | 1.72% | 950 | 290 |
| D3 | Pol-Gel | MgO | 0.30% | 1206 | 250 |
| D4 | Pol-ZN | None | 0.74% | 85 | 333 |
| F1 | Control | | 0.00% | 225 | 295 |
| F2 | Control | | 0.00% | 173 | 301 |
| F5 | Control | | 0.00% | 895 | 236 |
| F6 | Control | | 0.00% | 248 | 326 |
| F7 | Control | | 0.00% | 89 | 347 |
| F8 | Control | | 0.00% | 106 | 358 |

In general the nanotubes had much the same effect on physical properties as other fillers. Flexural modulus was increased by the nanotubes, but at the expense of flexibility and toughness. FIG. 27 shows the stress-strain curves for the composites made by preparation A, suspended by sonication in PE/TCB solution, followed by coprecipitation. The initial slope of the lines (the modulus) increases with increasing nanotube concentration.

Figure 28:
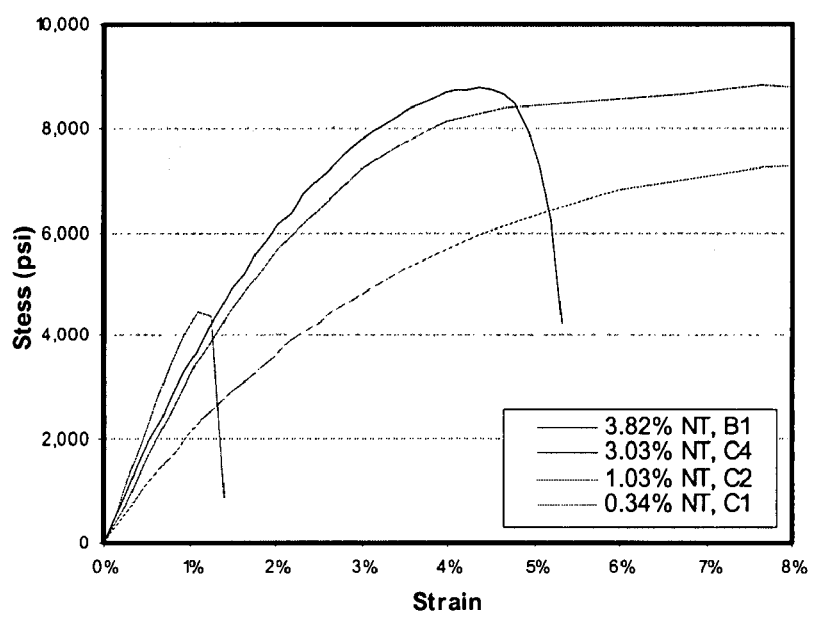
FIG. 28 is a graph showing flexural curves for composites made by method B and C using nanotubes supported on Hisil 210 silica.

FIG. 28 shows the stress-strain curve for another group of composites, all made from SS-NT based on Hisil 210 silica. One of these was made by method B, suspension in PE/TCB solution, while the other three were made by method C, polymerization. Again, the initial slope increases as the nanotube concentration increases. However, the stiffer samples also tend to break more quickly. This behavior is typical of fillers in polyethylene. Notice that a lower level of nanotube concentration is required to achieve the same level of stiffness, indicating (in agreement with rheology tests) that the silica-supported nanotubes are more effective than purified nanotubes.

FIG. 29 shows the stress-strain curves for another series of composites, this time made by method B, coprecipitation from TCB suspension, using SS-NT supported on Syloid 244. Here, the initial slopes are even steeper than before, but these samples also break quickly. The higher the nanotube concentration the higher the slope, and the earlier the sample breaks. Notice also that this series achieves this level of stiffness at lower levels of nanotubes than in FIGS. 27 and 28.

Finally FIG. 30 shows the flexural curves for samples made by method C, polymerization, using Cabosil EH-5. The level of nanotubes in the polymer is lower still, with the highest sample shown at only 0.61% NT. Again the initial slope increases with nanotube level. The highest level of nanotubes broke quickly upon bending.

Figure 31:
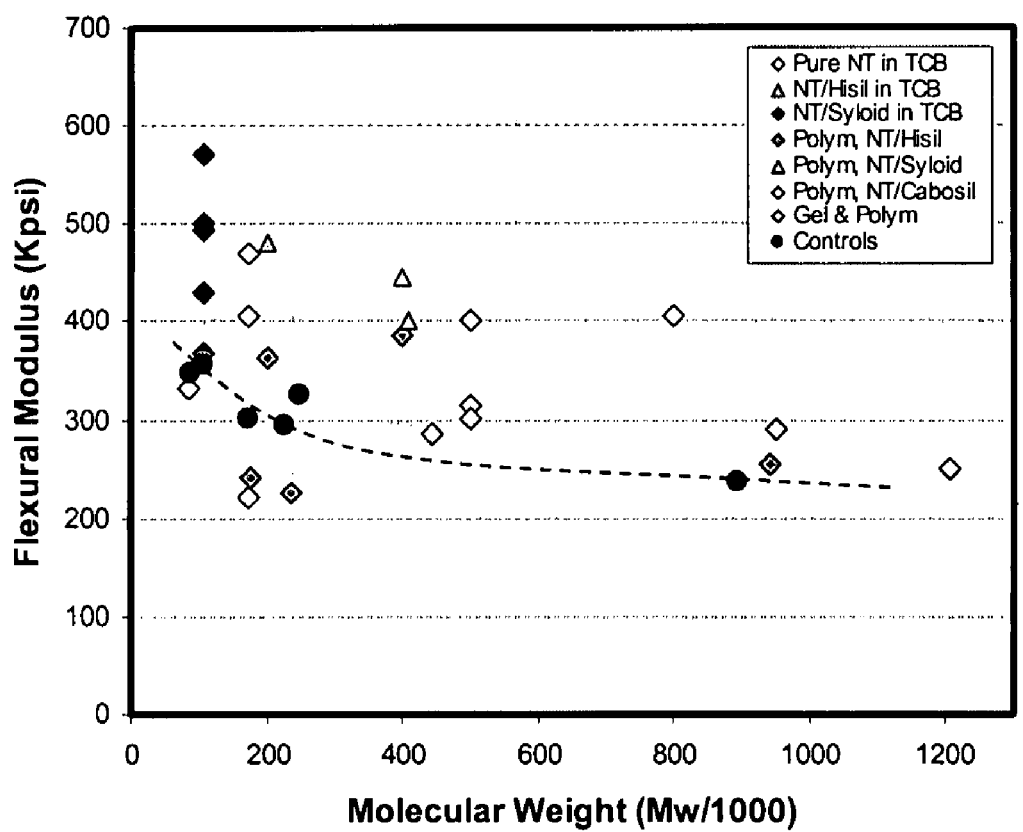
FIG. 31 is a graph showing flexural modulus as a function of molecular weight for the various composite families and for PE controls. The distance from the control line is the effect of the nanotubes.

The molecular weight of these composites varied somewhat with the preparation method. Since the flexural modulus of polyethylene depends on molecular weight, control resins were run and the result is plotted in FIG. 31. Also plotted in FIG. 30 are the various composites that were tested. In general the composites lie above the reference line in blue, as would be expected. The effect of the nanotubes on flexural modulus was quantified by taking the flexural modulus, then subtracting the flexural value from the reference line at the same molecular weight. This number has been dubbed the "modulus response factor" to nanotubes.

Figure 32:
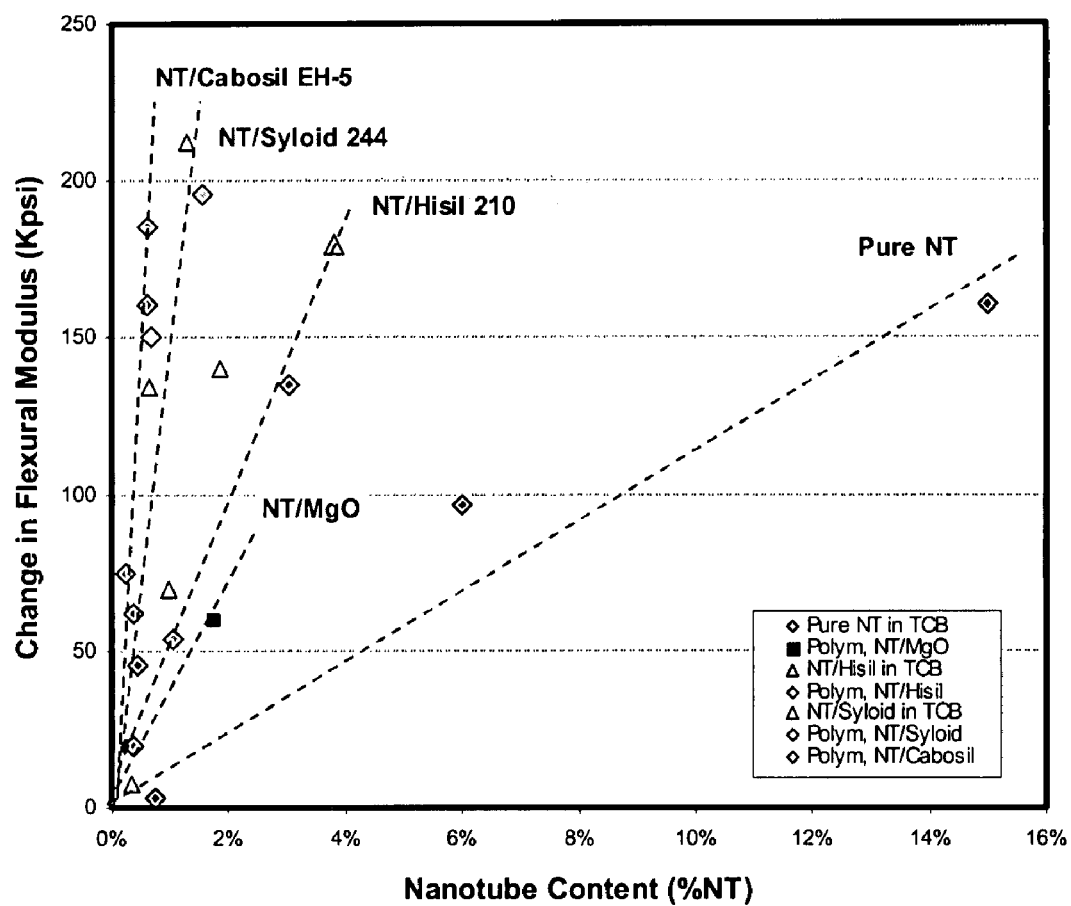
FIG. 32 is a graph showing flexural response factor (FRF) as a function of nanotube concentration for the various composite families. FRF is the distance from the control line in FIG. 30.

The modulus response factors for the various families of composites are plotted in FIG. 32 as a function of nanotube concentration. The physical properties seem to break down into the same grouping, and in the same rank order, that was observed from the viscosity curves. Within each family, increasing nanotube concentration also increases stiffness. However, significant differences in effectiveness were observed between the groups. Preparation A, adding refined nanotubes via TCB, had the least effect on stiffness. Next came preparation method D, followed by the composites made from preparation B and D. Within this B&D class, subgroups appeared according to which silica had been used to make the SS-NT. The choice of silica appeared to be more significant than the choice of preparation methods B or C. Hisil 210 was least effective, followed by Syloid 244, then Cabosil EH-5, the same order observed from rheology. The slopes of the lines in FIG. 32 are tabulated in Tables 2 and 3 for comparison to rheology. This flexural data and the viscosity data from before agree well, regarding the relative efficiencies of the dispersion methods. A few comparisons were made, and are shown in FIG. 32, between method B (TCB) and method C (polymerization) for the same silica bases. Within the limits of this experiment there did not appear to be a strong preference for one or the other.

Tensile Modulus

Tensile properties of these composites were also investigated. Table 5, below, contains the results of these tests. In general, the tensile tests produced much the same behavior as the flexural tests; nanotubes increased the modulus but at the expense of elongation. Also, the different methods of dispersion yielded very different tensile responses.

TABLE 5

Tensile modulus as determined on various composites.

| Composite | Method | Base Silica | % NT | Mw/1000 | Modulus Kpsi |
|---|---|---|---|---|---|
| A1 | TCB | None | 3.20% | 173 | 552 |
| A3 | TCB | None | 15.00% | 173 | 696 |
| A2 | TCB | None | 6.00% | 173 | 647 |
| B3 | TCB | Syloid 244 | 1.85% | 106 | 655 |
| B6 | TCB | Syloid 244 | 0.64% | 106 | 938 |
| B5 | TCB | Syloid 244 | 0.32% | 106 | 683 |
| C1 | Polym-ZN | Hisil 210 | 0.34% | 237 | 486 |
| C2 | Polym-ZN | Hisil 210 | 1.03% | 201 | 649 |
| C4 | Polym-ZN | Hisil 210 | 3.03% | 400 | 491 |
| C7 | Polym-ZN | Syloid 244 | 0.67% | 400 | 816 |
| C8 | Polym-ZN | Cabosil EH-5 | 0.43% | 445 | 460 |
| C10 | Polym-ZN | Cabosil EH-5 | 0.61% | 800 | 843 |
| C12 | Polym-ZN | Cabosil EH-5 | 0.36% | 500 | 438 |
| C14 | Pol-Cr | Inneos | 1.27% | 300 | 449 |
| D2 | Polym-Gel | MgO | 1.72% | 950 | 280 |
| D3 | Polym-Gel | MgO | 0.30% | 1,206 | 306 |
| D4 | Polym-Gel | None | 0.74% | 85 | 598 |
| F1 | Control | | 0 | 225 | 435 |
| F2 | Control | | 0 | 173 | 348 |
| F5 | Control | | 0 | 895 | 241 |
| F6 | Control | | 0 | 248 | 413 |
| F7 | Control | | 0 | 89 | 543 |
| F8 | Control | | 0 | 106 | 562 |

Figure 33:
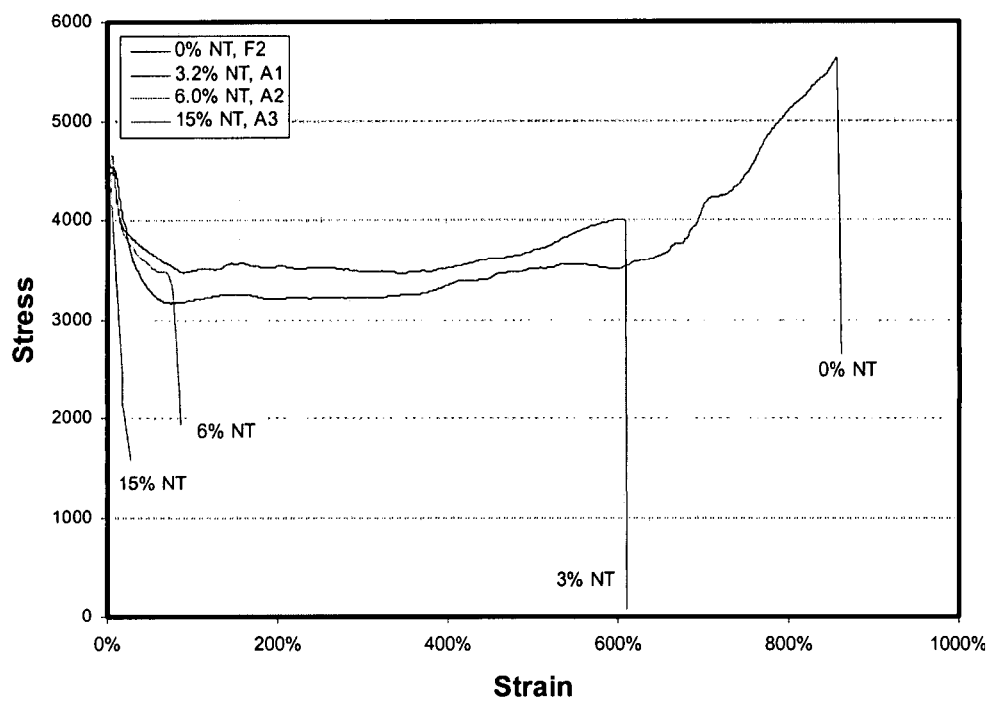
FIG. 33 is a graph showing tensile stress-strain curves for composites made by method A, coprecipitation with PE from TCB solutions.
Figure 34:
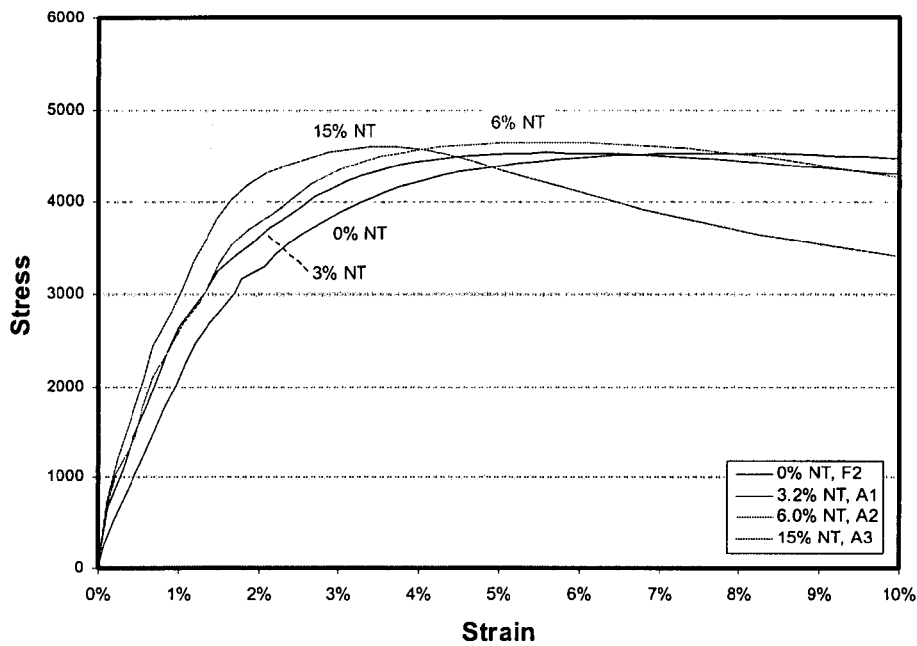
FIG. 34 is a graph showing tensile stress-strain curves, showing initial slope, for composites made by method A, coprecipitation with PE from TCB solutions.

FIG. 33 shows a typical tensile stress-strain curve for one series. The composites in this group were all from preparation A, precipitation of refined nanotubes from PE/TCB solution. From this figure it is obvious that the nanotubes decrease the elongation of the composites. There is a large loss in elongation between 3% NT and 6% NT in this series. The initial slope of the curve, from which the modulus is derived, is difficult to see in the figure due to compression, so a second plot of this data is also shown (see FIG. 34) in which only the initial part of the curve is visible.

Figure 35:
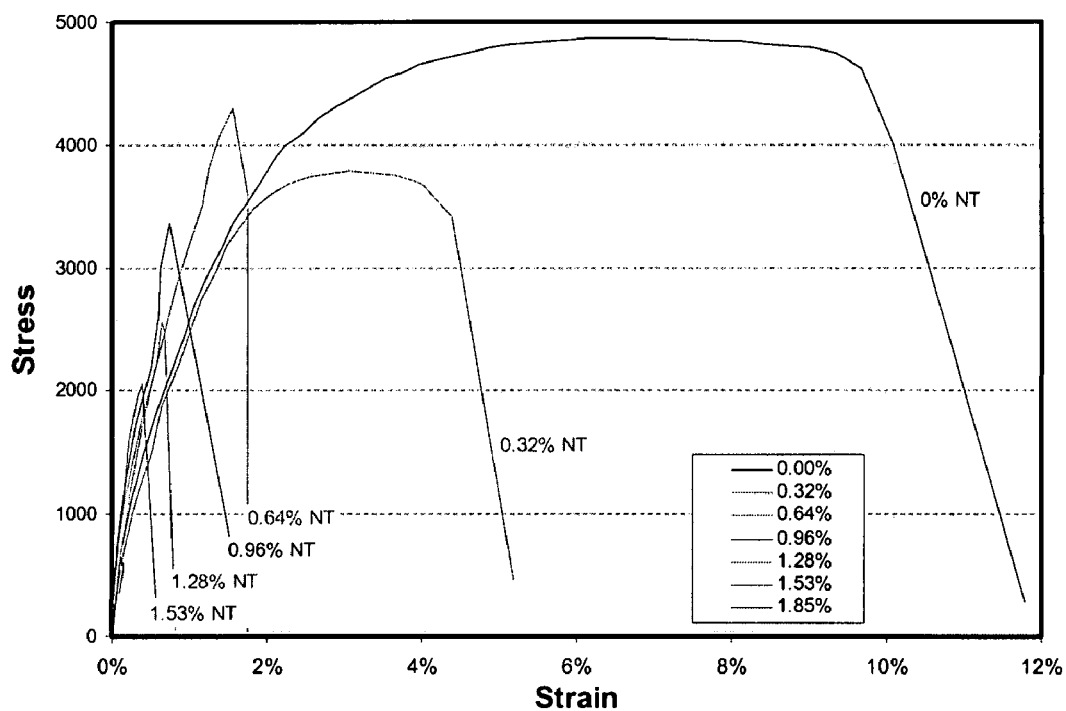
FIG. 35 is a graph showing tensile stress-strain curves for composites made by method B, coprecipitation of PE and SS-NT from TCB solutions. (Syloid 244).

FIG. 35 shows another example of this behavior. These curves were obtained from composites made by method B, coprecipitation of PE and SS-NT from TCB solution. These samples were all made from Syloid 244. Again the nanotubes increase the modulus but decrease the elongation. However, these changes, which are similar to those in FIG. 33, occur at much lower concentrations than when pure nanotubes were used.

The effects of inert fillers, like silica, on physical properties of polymers are well known, and is much less significant than the effects observed here. For this reason, and the evidence from FIG. 34, whose constituents do not contain silica, the observed deviations from normal PE are attributed solely to the nanotubes. That is, because the tensile trends observed in series B (TCB coprecipitation of SS-NT and PE) are also observed in series A (TCB coprecipitation of P-NT and PE), the effect is attributed to the presence of the nanotubes, rather than to the silica support (in the case of series B).

Figure 36:
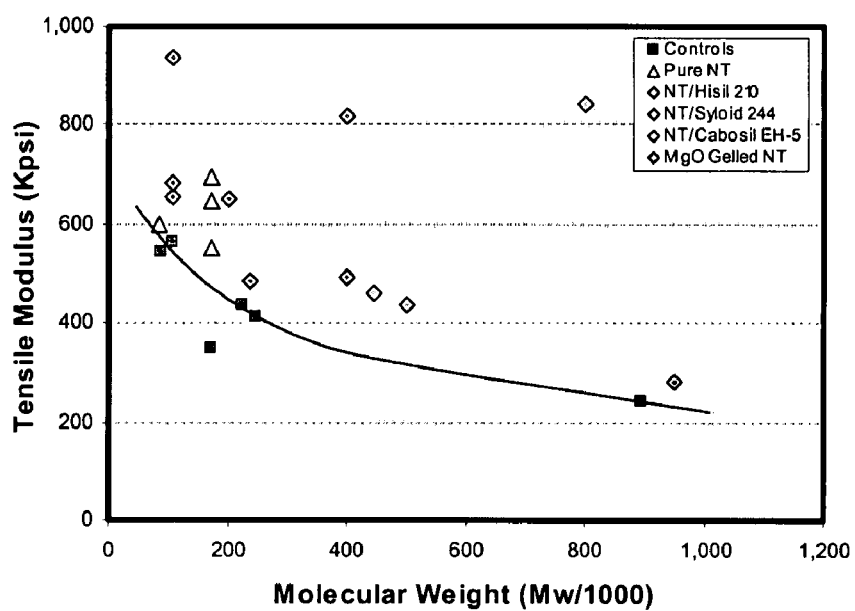
FIG. 36 is a graph showing change in tensile modulus with varying nanotube concentration for various composite families.

Tensile modulus, like flexural modulus, is dependent upon molecular weight. The modulus values in Table 5 are plotted against weight average molecular weight in FIG. 36. The control polymers form a curve, like before, which serves as a reference. The composites generally exhibit values higher than this line, due to the effect of the nanotubes. As was done above, a new parameter was defined to help quantify this effect. The "tensile response factor" was defined as the composite modulus minus the reference at the same molecular weight. This variable is plotted in FIG. 37 as a function of nanotube concentration, for the various families of composites.

In FIG. 37 the increase in tensile modulus with nanotubes (or tensile response) plots to make approximately the same pattern that has been observed above for other variables tested. Four lines become evident, corresponding to four different methods of preparing the composite. Again, the choice of silica seems to be more important than the dispersion method. However, in the one case where comparison is possible using the same silica, method C (polymerization) is preferred over B (TCB).

The slopes of the lines in FIG. 37, indicating the tensile response factor to nanotubes, is listed in Tables 2 and 3 with the other tests that were performed on these composites. The same rank order of these groups that was observed before holds true here as well, for all the variables. Even the approximate magnitudes of nanotubes' effects on these different properties are similar, as can be seen in the normalized values of Table 3.

Figure 38:
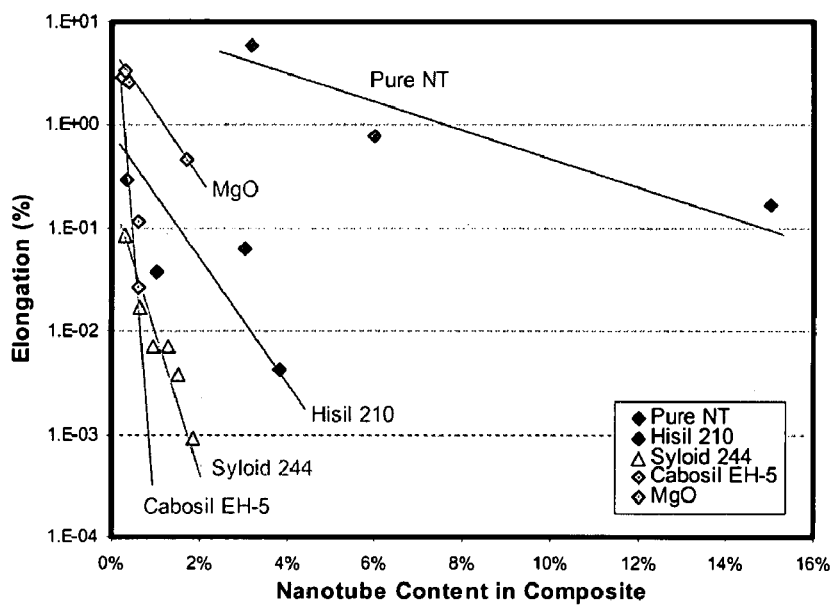
FIG. 38 is a graph showing change in elongation with varying nanotube concentration for various composite families.

FIG. 38 plots the elongation observed from these composites against the nanotube concentration. Again the different families group along distinct lines. Since each method produced or used a different molecular weight of polymer, the lines to not all come together at a single intersection point. Nevertheless one can judge the response to the nanotubes by the slope of the lines. Since elongation is decreased by the nanotubes, the slopes of these lines are all negative. Pure nanotubes had the least effect on elongation, as is apparent from shallow slope of the green line. Magnesia and Hisil 210 came next, followed by Syloid 244. Composites made with Cabosil EH-5 were most affected, as is clear from the steep slope of the blue line in FIG. 38. The slopes of these lines are also listed in Tables 2 and 3. Again the agreement with other tests is remarkable.

Conductivity Measurements

Electrical resistance from these composites was measured by pressing two ¾ inch brass plates onto opposite sides of a sample plaque in a sandwich structure (see experimental section above). A voltmeter was then used which was capable of measuring as low as 0.1 ohms and up to 200 million ohms. In cases of low conductivity, the sample thickness was sometimes decreased from the initial 0.05 inches; sometimes a film of the composite was used to obtain the measurement. Units of resistivity, or conductivity, were obtained by dividing the ohm reading by the path distance and multiplying by the brass plate area. Resistance measurements sometimes varied considerably, depending on the contact pressure applied (more below) and often the sample itself. For example, a voltmeter lead, held stationary on the plaque while the other was moved around the plaque, sometimes yielded significantly different results. This may reflect heterogeneity in the sample in some cases and also the degree of contact with the lead. Sometimes poking and prodding the lead caused some variation.

To neutralize some of this inconsistency, the brass plate set-up was introduced, so that an average conductivity was obtained over a larger area. Pressure was also applied to the brass plates in the form of a steel clamp (properly insulated, of course). Usually 2 inch by 2 inch plaques were compression molded and the brass plates were moved around this area to obtain multiple readings, which could also sometimes vary slightly around the plaque. For these measurements we favored the highest average conductivity values that could legitimately be obtained within that four square inch area, although these variations were usually minor.

The conductivity results are listed the in Table 6, below. The composites are again grouped into the same families presented in the other characterization measurements noted above. These types of measurements (rheological, physical, electrical) might at first seem to be unrelated, nevertheless the same groupings do appear to result naturally, suggesting that they all proceed from the effect of the nanotubes. From Table 6 it becomes evident that method A (pure nanotubes) does not provide the same conductivity (for a given amount of nanotubes) as that obtained from the other methods. This was a consistent pattern in all the characterization tests.

nanotubes. It was followed in increasing efficiency by the MgO group (method D), the Hisil 210 group (method B and C), and then by the Syloid 244 group (first B then C). The most effective efficient use of the nanotubes for conductivity was from the Cabosil EH-5 group (B and C), although there was only a minor difference between the Cabosil and Syloid groups. This is approximately the same rank order that was observed from rheology and physical properties. The slopes of these lines are also shown in Table 2. Since these lines were generally curved, the initial slopes were measured. In the case of Syloid 244, it is method C (polymerization) that is repre-

TABLE 6

Measured resistivity for composites, grouped according to preparation.

| Sample | Process | Base Support | % NT in Polymer | Resistance ohms | Area cm2 | Path cm | Resistivity ohm-cm | Log Contuctivity |
|---|---|---|---|---|---|---|---|---|
| A1 | TCB | None | 3.20% | 9,200 | 2.849 | 0.1245 | 8.3E+04 | −5.32 |
| A2 | TCB | None | 6.00% | 990 | 1.614 | 0.1092 | 1.5E+04 | −4.17 |
| A3 | TCB | None | 15.00% | 22 | 2.222 | 0.1321 | 1.5E+02 | −2.57 |
| A4 | DCB | None | 3.53% | 100 | 2.849 | 0.0013 | 2.2E+05 | −5.35 |
| B1 | TCB | Hisil 210 | 3.82% | 100 | 2.849 | 0.1626 | 1.8E+03 | −3.24 |
| C1 | Polym-ZN | Hisil 210 | 0.34% | >200 mil | 2.849 | 0.1702 | >3.3E+09 | <−9.52 |
| C2 | Polym-ZN | Hisil 210 | 1.03% | 1,000,000 | 2.849 | 0.0076 | 3.7E+08 | −8.57 |
| C3 | Polym-ZN | Hisil 210 | 0.36% | >200 mil | 2.849 | 0.1524 | >3.7E+09 | <−9.57 |
| C4 | Polym-ZN | Hisil 210 | 3.03% | 45 | 2.849 | 0.0025 | 5.0E+04 | −4.70 |
| B2 | TCB | Syloid 244 | 0.96% | 300 | 2.849 | 0.1397 | 6.1E+03 | −3.79 |
| B3 | TCB | Syloid 244 | 1.85% | 32 | 2.222 | 0.1956 | 3.6E+02 | −2.56 |
| B4 | TCB | Syloid 244 | 2.62% | 45 | 0.244 | 0.3175 | 3.5E+01 | −1.54 |
| B6 | TCB | Syloid 244 | 0.64% | 33 | 2.222 | 0.1422 | 5.2E+02 | −2.71 |
| B7 | TCB | Syloid 244 | 1.28% | 25 | 2.222 | 0.1803 | 3.1E+02 | −2.49 |
| B5 | TCB | Syloid 244 | 0.32% | 1,400,000 | 2.222 | 0.1511 | 2.1E+07 | −7.31 |
| C6 | Polym-ZN | Syloid 244 | 1.53% | 1.8 | 2.222 | 0.1765 | 8.9E+00 | −1.36 |
| C7 | Polym-ZN | Syloid 244 | 0.67% | 19 | 2.849 | 0.2000 | 1.1E+02 | −2.43 |
| C8 | Polym-ZN | Cabosil EH-5 | 0.43% | 74 | 2.849 | 0.1473 | 1.4E+03 | −3.16 |
| C9 | Polym-ZN | Cabosil EH-5 | 0.22% | 12,000 | 2.849 | 0.0076 | 4.5E+06 | −6.65 |
| C10 | Polym-ZN | Cabosil EH-5 | 0.61% | 25 | 2.849 | 0.1930 | 3.7E+02 | −2.57 |
| C11 | Polym-ZN | Cabosil EH-5 | 0.61% | 145,000 | 2.849 | 0.1600 | 2.6E+06 | −6.41 |
| C12 | Polym-ZN | Cabosil EH-5 | 0.36% | 2,000,000 | 2.849 | 0.0076 | 7.5E+08 | −8.87 |
| C13 | Polym-ZN | Cabosil EH-5 | 0.97% | 50 | 2.137 | 0.2300 | 4.6E+02 | −2.67 |
| B8 | TCB | Cabosil EH-5 | 0.75% | 14 | 1.709 | 0.1778 | 1.3E+02 | −2.13 |
| B9 | TCB | Cabosil EH-5 | 0.42% | 5000 | 2.849 | 0.1270 | 1.1E+05 | −5.05 |
| C14 | Polym-Cr | Inneos | 1.27% | >200 mil | 2.849 | 0.1359 | >4.2E+09 | <−9.62 |
| D1 | Polym-Gel | SiO$_2$ | 0.22% | >200 mil | 2.849 | 0.1524 | >3.7E+09 | <−9.57 |
| D2 | Polym-Gel | MgO | 1.72% | 35,000 | 2.849 | 0.0005 | 2.0E+07 | −7.29 |
| D3 | Polym-Gel | MgO | 0.30% | >200 mil | 2.849 | 0.1486 | >3.8E+09 | <−9.58 |
| D4 | Polym-Gel | None | 0.74% | 100 | 2.849 | 0.0013 | 2.2E+05 | −5.35 |

Figure 39:
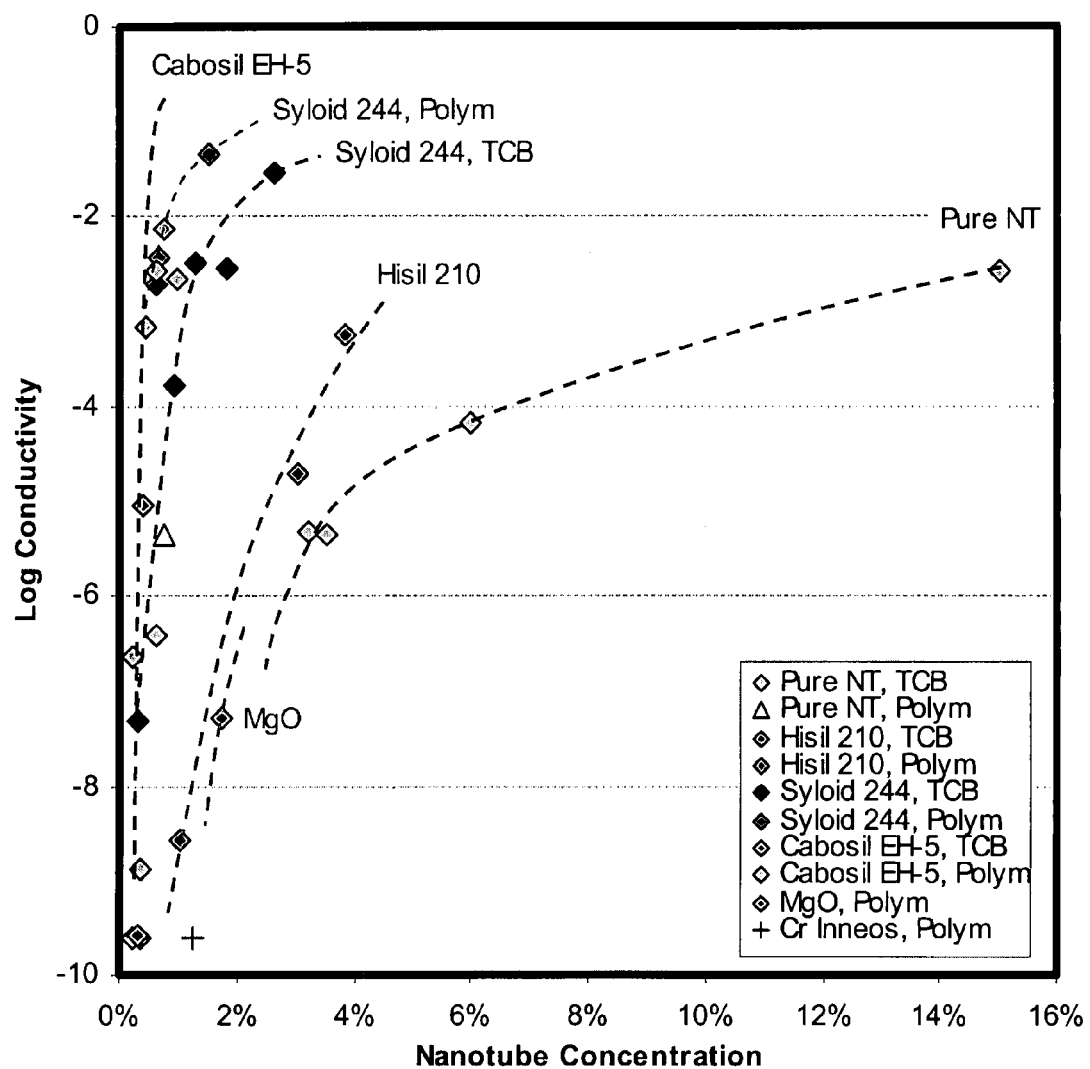
FIG. 39 is a graph showing conductivity as a function of nanotube concentration for the various composites.

FIG. 39 shows these same results in graphical form. Log conductivity (which is the negative of log resistivity) is plotted against nanotube concentration. The data separate to form distinct curves which correspond to the different families of nanotubes. At low nanotube concentrations each line starts at low values of log conductivity, around −10, which corresponds to the 200 million ohm detection limit of the voltmeter. Because of this limit, many of these low numbers should be considered "less than" the plotted value, as shown in Table 6. As nanotube concentration increases, each line moves up at different slopes, and appears to finally curve over near log conductivity of 0. In principle log conductivity could go into the positive region. For comparison, the brass plates alone (without composite sample) when pressed together, produced a resistance of 0.2 ohms, which is still small compared to most of the readings taken. This would place the inherent log conductivity of the brass plates (including wires, clamps, and voltmeter circuit) at about 0.35.

Once again preparation method A, using refined nanotubes, yielded the lowest conductivity for a given level of sented. Table 3 presents the normalized slopes. Although there is no known relationship between these properties, the qualitative agreement is evident, and surprising.

Again the method of dispersing SS-NT in the polymer was less significant than the type of silica chosen. Nevertheless, there were differences. There are four different occasions in FIG. 38 where it is possible to compare dispersal in PE/TCB solution versus dispersal by polymerization.

Four samples were also subjected to intensive mixing extrusion for 10-15 min at 240-260° C. Conductivity was measured before and after this treatment. One of the composites was sampled after a single, brief pass through the extruder, then the treatment was continued for the full duration. In all cases conductivity decreased after the extrusion, and the longer the extrusion, the lower the conductivity became. This data is presented in Table 7 below.

TABLE 7

Electrical conductivity before and after intensive mixing extrusion.

| Sample | Process | Base Support | % NT in Polymer | Resistance ohms | Area cm2 | Path cm | Resistivity ohm-cm | Log Contuctivity |
|---|---|---|---|---|---|---|---|---|
| D4 | Polym-ZN | None | 0.74% | 100 | 2.849 | 0.001 | 2.2E+05 | −5.35 |
| D4 - Extruded 5 min | Polym-ZN | | | 700 | 2.849 | 0.001 | 7.9E+05 | −5.89 |
| D4 - Extruded 15 min | Polym-ZN | | | 70000 | 2.849 | 0.001 | 7.9E+07 | −7.89 |
| C2 | Polym-ZN | Hisil 210 | 1.03% | 1,000,000 | 2.849 | 0.003 | 3.7E+08 | −8.57 |
| C2 - Extruded 15 min | Polym-ZN | | | >200 mil | 2.849 | 0.003 | >4.0E+09 | <−9.61 |
| C4 | Polym-ZN | Hisil 210 | 3.03% | 45 | 2.849 | 0.001 | 5.0E+04 | −4.70 |
| C4 - Extruded 15 min | Polym-ZN | | | 1,500,000 | 2.849 | 0.001 | 1.7E+09 | −9.23 |
| C9 | Polym-ZN | Cabosil EH-5 | 0.22% | 12,000 | 2.849 | 0.003 | 4.5E+06 | −6.65 |
| C9 - Extruded 15 min | Polym-ZN | | | >200 mil | 2.849 | 0.002 | >1.1E+11 | <−11.1 |

It was noted above that the melt viscosity of these samples also decreased upon intensive extrusion. Polymer degradation (chain breaking) was suggested as one possible cause to consider, even though the temperature was not extreme and BHT was added. But chain breaking cannot explain the change in electrical conductivity. Extrusion may affect the nanotubes by breaking them, or allowing them to agglomerate.

Figure 40:
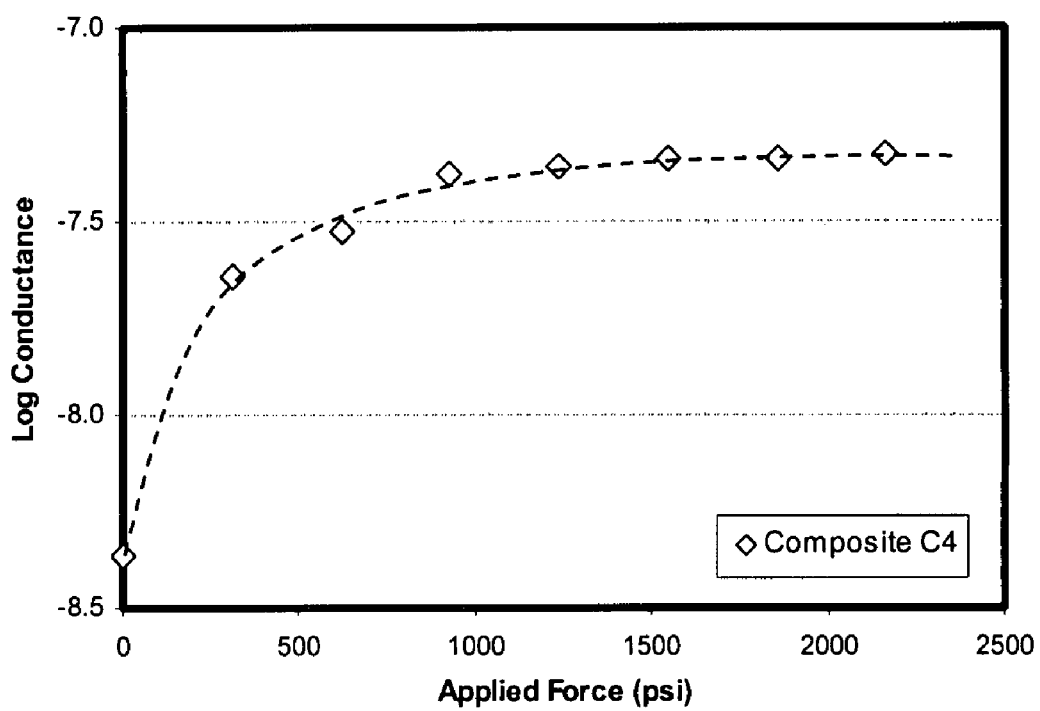
FIG. 40 is a graph showing conductivity of composite C4 as a function of externally applied pressure.
Figure 41:
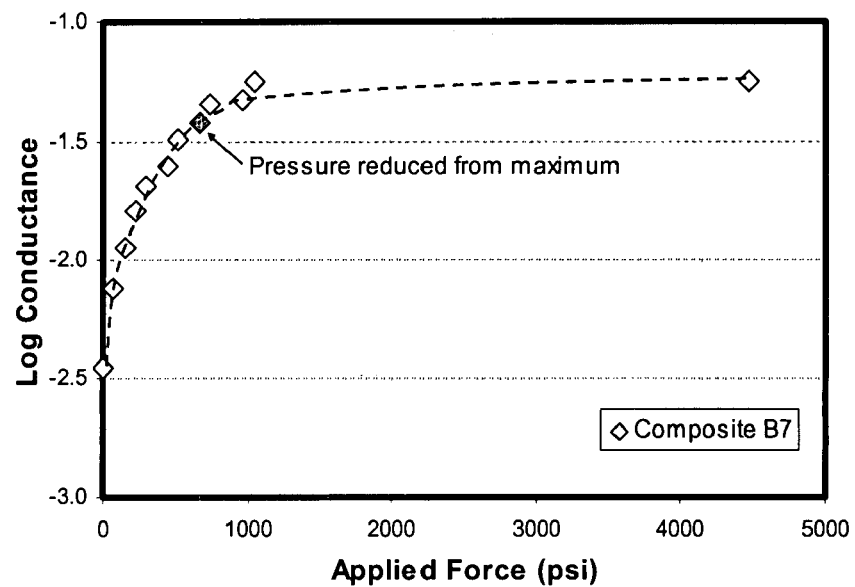
FIG. 41 is a graph showing conductivity of composite B7 as a function of externally applied pressure.

It was mentioned above that the conductivity of these composites, especially those having a low nanotube content, seemed to be touch sensitive, and for that reason a steel clamp was used to take the conductivity measurement. An attempt was made to quantify this relationship. Three composite plaques (2 in×2 in×0.05 in) were placed in a hydraulic press between layers of polished brass. Wooden blocks were used to transmit force to the brass and thereby insulate the circuit from the press. The conductivity was then measured for these samples as a function of applied pressure. The results are shown in FIGS. 40-42.

Conductivity improved by almost two orders of magnitude with increased pressure, eventually leveling off at some maximum value. After full pressure had been applied, the force was reduced back to a lower level, which is shown by the odd colored point in two of the graphs. In two cases, the pressure was totally released, and the same curve was then generated again in the same way. Thus, this trend was found to be completely reversible.

Without wishing to be bound by theory, it is interesting to consider the possible causes for such a pressure dependence. Two possibilities were considered: (1) pressure causes the nanotubes to make better contact within the composite; and (2) the surface of the plaque is rich in polymer which tends to hide the nanotubes from contact with the metal lead.

Regarding the first possibility, although these PE samples are somewhat malleable, they will not compress or flatten enough to accredit the change in conductivity of two orders of magnitude to a change in path length. Since the voltage drop is linearly related to path length, this would require a compression down to 1% of the original thickness. This did not happen. In fact, the plaques compressed very little, and the recovered plaques appeared to be unchanged. Thus, it is difficult to understand how applied force (causing no real deformation) could change the degree of contact between encapsulated nanotubes.

Regarding the second possibility, contact with the surface, the voltmeter leads can be touched to the plaque causing different readings to be obtained according to how much force is applied. This was especially true of the ¾-inch brass plates used for conductivity measurements. One would think that simply pushing the two plates by hand-held force would be enough to make electrical contact. But the addition of a large steel clamp, used for gluing wooden pieces together, further increased the conductivity. Two clamps increased the reading still more. This is far more force than should be needed to make ordinary electrical contact. Increased force did not change the conductivity observed when metal pieces were used in place of the composite.

One could imagine that the surface of the plaque is rich in a micro-layer of polymer, formed during molding, and that some applied pressure smoothes out ridges the surface allowing the more rigid nanotubes to penetrate up from underneath, making electrical contact with the metal plate. To test this idea, two experiments were done. In the first two metal pins were driven clear through the composite plaque and into a block of wood. These two pins were about 2 mm apart. Conductivity was then measured by placing the voltmeter leads onto the same place where the pins had penetrated, then again by touching the voltmeter leads to the two pins. Very little difference was noted. This suggested that either the phenomenon was not a surface effect, or that driving pins through the plaque generated its own surface effect.

The second experiment was perhaps more revealing. Metal foil, 2 cm×2 cm, was placed above and below the plaque, which was then compression molded again at 350° F. Brass was used as a first attempt, but brass did not adhere to the composite. However, in a second test, heavy aluminum foil did. The two pieces of metal had been melted into the plaque, and could not be easily removed. This plaque is shown in FIG. 43. When the leads of the voltmeter were lightly touched to the two aluminum surfaces (no pressure applied) immediate conductivity was noted. In contrast, lightly touching the leads to the plaque itself generated little or no conductivity until some pressure was applied. The conductivity measured between these metal plaques did not change with applied pressure, but it did match the conductivity measured in the normal way with applied pressure. Thus, it would seem that the pressure dependence is indeed a surface effect.

Many of the composites described herein are quite conductive, and easily molded into films. These films can be press-molded onto other plaques to form a strip of black conducting polymer on top of a normal white solid polymer. Some examples are shown herein (FIGS. 43-47). This illustrates how the nanotubes can be conserved and their current high price can be made more affordable for many polyethylene applications. In products such as drums and fuel tanks it would be advantageous for some part of the tank, and not necessarily the whole container, to be conductive to prevent static. Multiple layers in blow molding, blown film, extruded pipe, and cast geomembrane are already quite commonly manufactured. It would be a simple matter to add a small amount of nanotubes in a very thin external layer to afford conductivity on these articles.

Another technique was also used, as an illustration. A TCB suspension of nanotubes, generated by extreme sonication, was painted onto the surface of a normal plaque, after which the plaque was press-molded. The nanotubes were pressed into the molten surface to form a black glossy surface on top of the white polymer. The surface was highly conductive and could not be easily removed. Again this illustrates how the nanotubes could be used to minimize their cost.

Figure 47:
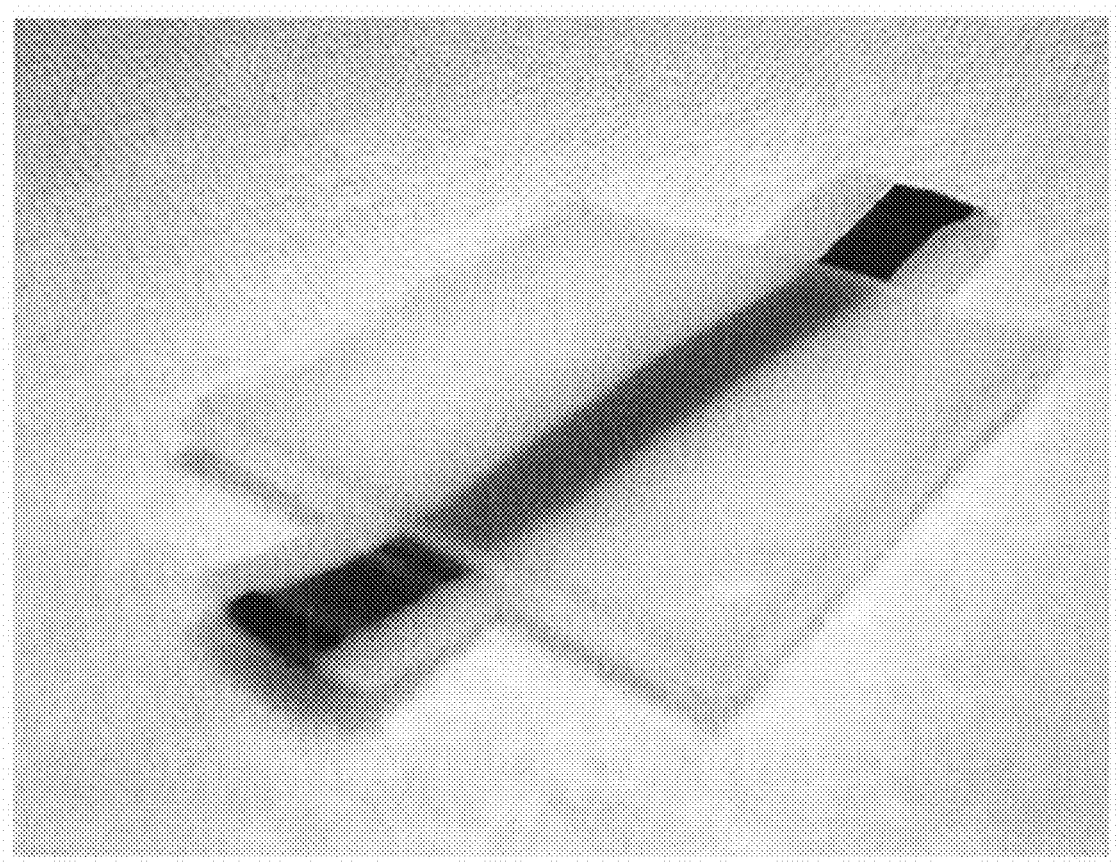
FIG. 47 is a photograph showing objects painted with NT/TCB suspension and press-molded to form a embedded nanotubes surface that is conductive and cannot be easily removed.

As a final application example, a strip of highly conductive polymer was sandwiched and press-molded between two plates of high molecular weight polyethylene, leaving only the conductive ends exposed, as shown in FIG. 47. This plastic wire thus has the hardness of high MW polyethylene, and the conductivity of metal.

These nanotube-polyethylene composites have been investigated in four different ways: melt rheology, flexural, tensile, and electrical. To a remarkable extent the results of all four of these diverse analyses agree. This agreement is summarized numerically in Table 3. Refined nanotubes (P-NT) are much less effective than silica-supported nanotubes (SS-NT). Results among the SS-NT composites indicate that the choice of silica has the major influence on the final properties, with this consistent order: Hisil 210<<Syloid 244<Cabosil EH-5. Within a given family of composites using the same silica, results suggest that polymerization is the preferred method of dispersion.

The main difference between visual inspection of the film and polymer characterization was between composites made with pure versus silica-supported nanotubes. Pure nanotubes produced visual uniformity but had the least effect on polymer properties. The very small particle size of the pure nanotubes no doubt accounts for the visual uniformity, but this is not necessarily indicative of good "micro-dispersion". As noted above, even sonication did not produce the expected "inky" appearance in TCB suspension. Instead, when a drop of this liquid was placed on a glass slide one could even see a fine grainy texture.

Gelling these same refined nanotubes in magnesia during sonication, followed by polymerization, gave mixed results, both visually in the film and by the other polymer characterization techniques. Some results suggested some improvement over pure nanotubes (but not over SS-NT), while other results indicate no change.

Some of the differences between silicas have been noted above. Hisil 210, perhaps a good choice for SS-NT production, is a less optional choice for polymerization or dispersion within PE. This silica was formed by precipitation, and therefore has low meso-pore volume, low surface area, and is more prone to sintering (fusion) due to high sodium content. All this makes the silica less likely to fragment, and the original particle size (even after grinding for these tests) was very large compared to Syloid 244 or Cabosil EH-5.

All attempts to further homogenize the composite by intensive extrusion resulted in improved visual uniformity, but a loss of rheological and electrical properties. This again suggests that visual uniformity and "micro-dispersion" are not the same. Extrusion may even break nanotubes or allow their agglomeration.

The Role of Silica

Despite these deficiencies, even Hisil 210 produced better composite properties than the refined nanotubes (P-NT). The contribution from inert fillers, like silica, to the melt rheology of polyethylene has been studied extensively, and the effects are known to be much smaller than the effects with SS-NT observed in this study. For example, 2% silica left in polyethylene as catalyst residue does not affect the rheology. The effect of another inert filler, carbon black, is shown for comparison in Table 8, below. The increase in viscosity at low shear rate as a result of adding carbon black is listed. Also listed are the viscosity increase factors for composites having similar or lower amounts of silica or magnesia filler. It was not possible to obtain rheological data on samples containing much more than 35% silica as SS-NT because the viscosity was beyond the measurable limit. Table 8 lists all the composites having the highest silica content from each family where rheology was still possible.

The viscosity response of the masterbatches to their carbon black filler is miniature compared to the remarkable impact of nanotubes on the properties of their PE composites. While 2% carbon black (or silica) had no effect on the viscosity, only 0.4% SS-NT multiplied the viscosity by a factor of 12 in composite C14. Similarly, 35% carbon black increased viscosity by about 30 fold, whereas 29% SS-NT increased the viscosity by over seven thousand fold in composite B2.

TABLE 8

Comparison of the effect of carbon black with SS-NT.

| Sample | Method of Dispersion | Filler Type | % Filler C, SiO2, or MgO | Viscosity Increase Factor (0.01/sec) |
|---|---|---|---|---|
| Silica | Polym-Cr | Inneos | 2% | no change |
| Carbon Black 1 | Extrusion | C | 2% | no change |
| Composite C14 | Polym-Cr | Inneos | 0.4% | 12.1X |
| Composite D1 | Polym-ZN | SiO2 | 1.2% | 3.2X |
| Composite D2 | Polym-Gel | MgO | 1.7% | 6.0X |
| Carbon Black 2 | Extrusion | C | 35% | 31.6X |
| Carbon Black 3 | Extrusion | C | 35% | 12.2X |
| Carbon Black 4 | Extrusion | C | 35% | 29.6X |
| Carbon Black 5 | Extrusion | C | 35% | 30.9X |
| Composite B7 | TCB | Syloid 244 | 38.7% | too high |
| Composite B2 | TCB | Syloid 244 | 29.1% | 7154X |
| Composite C10 | Polym-ZN | Cabosil EH5 | 27.9% | 1527X |
| Composite C4 | Polym-ZN | Hisil 210 | 35.8% | 1750X |
| Composite B6 | TCB | Syloid 244 | 19.4% | 1205X |

These data indicate that carbon nanotubes can have a powerful effect on polymer properties, provided they are dispersed properly. At least in certain embodiments, preserving the structure generated during nanotube production on the metal catalyst is closer to that ideal than what is obtained by refining those nanotubes. One explanation is that refining the nanotubes and suspending them in an organic solvent allows them to agglomerate. The lack of an "inky" appearance of the TCB suspension suggests this, as well as the loss in rheological and electrical properties upon extrusion. Apparently the suspended nanotubes agglomerate in ways that are less dispersed than the random arrangement generated in virgin SS-NT, even after fragmentation by polymerization.

The differences between Hisil 210 and the other silicas can be attributed in large part to the initial particle size of the base silica. Where comparisons between dispersal methods B (TCB suspension) versus C (polymerization) were possible, method C was always equal or better. The conductivity of the Syloid 244 composites especially makes this point. It is likely that the effect would have been more pronounced had higher catalyst productivities (g PE produced per g catalyst) been possible, where fragmentation becomes more complete. To achieve this, and still maintain reasonably high % NT in the final composite, SS-NT samples containing higher loadings of nanotubes would be required.

The issue of whether these embedded nanotubes should be considered compatible with amorphous polyethylene (even PE homopolymer is some 30-40% amorphous), or whether they constitute a separate phase, is the root of the dispersion concern. Since extrusion generally caused the properties to decrease, one might surmise that a separate phase is preferred whenever it has the opportunity to form.

Commercial Implications

The observation that SS-NT results in a preferred polymer composite (at least for PE) over refined NT (P-NT) has commercial significance, since the refinement of the nanotubes constitutes perhaps the largest share of the current cost structure. It also allows for more efficient use of those nanotubes, without accompanying production of significant waste.

This work has also shown that high levels of conductivity are possible from SWNT-polymer composites, sometimes even approaching that of metal strips. These materials will be far more compatible with polymer commercial applications than metal in any form. SWNT-polymer composites can be molded with other polymers as separate, but 100% compatible, surface layers so that conductivity of the article is achieved with minimal use of nanotubes, and without sacrificing other physical properties.

The main handicap of the nanotube composites for polymer properties is their high viscosity. Fortunately it is the high shear viscosity that is most important in molding processes, and it is also the high shear viscosity that is least affected by nanotubes. Many of the composites made in this study were easily molded, but to further counteract this potential problem lower molecular weight polymer can be made in the composite. In this study molecular weights in the range of 100,000 to about 1 million were made, but for easy processing still lower Mw could be made. PE of 20,000 Mw has been produced commercially. By lowering the molecular weight, NT/PE composites of ordinary melt viscosity could be made.

While the invention is described herein in connection with certain embodiments so that aspects thereof may be more fully understood and appreciated, it is not intended that the invention be limited to these particular embodiments. On the contrary, it is intended that all alternatives, modifications and equivalents are included within the scope of the invention as defined by the appended claims. Thus the examples described below, which include preferred embodiments, will serve to illustrate the practice of this invention, it being understood that the particulars shown are by way of example and for purposes of illustrative discussion of preferred embodiments of the present invention only and are presented in the cause of providing what is believed to be the most useful and readily understood description of procedures as well as of the principles and conceptual aspects of the invention. Changes may be made in the formulation of the various compositions described herein or in the steps or the sequence of steps of the methods described herein without departing from the spirit and scope of the invention as described and claimed herein.

Each of the applications, articles, patents and publications cited herein is hereby expressly incorporated by reference herein in its entirety.

What is claimed is:

1. A method of preparing a carbon nanotube-polymer composite, comprising:
   providing a carbon nanotube-polymerization catalyst comprising a carbon nanotube product comprising single-walled carbon nanotubes and a metal catalyst, the metal catalyst further comprising a metal disposed upon a support material, and wherein the single-walled carbon nanotubes were formed from the metal catalyst and are still associated therewith, and wherein the carbon nanotube product has been treated to convert the carbon nanotube product into the carbon nanotube-polymerization catalyst; and
   combining the carbon nanotube-polymerization catalyst with at least one monomer and initiating polymerization thereof to form the carbon nanotube-polymer composite.

2. The method of claim 1 wherein the metal of the metal catalyst is at least one of a Group VIII, Group VIb, Group Vb, or lanthanide metal, or rhenium, or combinations thereof.

3. The method of claim 1 wherein the metal of the metal catalyst is at least one of Co, Ni, Ru, Rh, Fe, Pd, Ir, Pt, Cr, Mo, W, Re, or Nb, or combinations thereof.

4. The method of claim 1 wherein the metal catalyst comprises at least one Group VIII metal and at least one Group VIb metal.

5. The method of claim 1 wherein the metal of the carbon nanotube product comprises Co and Mo and the support material is a silica.

6. The method of claim 1 wherein the support material of the metal catalyst is selected from the group consisting of silica, alumina, MgO, $ZrO_2$, aluminum-stabilized magnesium oxides, $Al_2O_3$, La-stabilized aluminas, precipitated silicas, fumed silicas, silica gel, high porosity silica, mesoporous silicas including MCMs, MCM-41, and SBA-15, and zeolites including Y, beta, mordenite, and KL and combinations thereof.

7. The method of claim 6 wherein the silica is selected from the group consisting of Cabosil EH5, Syloid 244, MS 3050, Hisil 210, and colloidal silica Ludox.

8. The method of claim 1 wherein the carbon nanotube-polymerization catalyst is a Ziegler-Natta catalyst.

9. The method of claim 1 wherein the carbon nanotube-polymerization catalyst is a Phillips catalyst.

10. The method of claim 1 wherein the carbon nanotube-polymerization catalyst is a metallocene catalyst.

11. The method of claim 1 wherein the monomer comprises at least one of ethylene, propylene, 1-butene, 1-pentene, 1-hexene, 1-heptene, 1-octene, 4-methylpent-1-ene, 1-decene, 1-dodecene, 1-hexadecene, polyenes, 1,3-hexadiene, 1-4-hexadiene, butadiene, cyclopentadiene, dicyclopentadiene, ethylidene norbornene, 4-vinylcyclohex-1-ene, dicyclopentadiene, 1,5-cyclooctadiene, 5-vinylidene-2-norbornene and 5-vinyl-2-norbornene, styrenes, isoprenes, adipic acids, hexamethylene diamines, urethanes, acrylic acids, acrylates, such as methyl methacrylate, butyl methacrylate, laurl methacrylate, dodecyl methacrylate, and stearyl methacrylate, acrylamides, acrylonitrile, vinyl chlorides, vinyls, vinyl benzyl chloride, vinyl acetate, acetates, arylacetylenes, fluorinated arylacetylenes, ethylene glycols, terephthalates, chlorinated hydrocarbons, fluorinated hydrocarbons, diisocyanates, dichlorides, epoxy resins (e.g., diamine/diepoxide) and bisphenol A (BPA), or combinations thereof.

12. The method of claim 1 wherein the carbon nanotube-polymer composite comprises a copolymer.

13. The method of claim 1 further comprising adding a cocatalyst to the carbon nanotube-polymerization catalyst.

14. The method of claim 1 wherein the carbon nanotube-polymer composite comprises 1 to 99.99% polymer.

15. The method of claim 1 wherein the carbon nanotube-polymer composite comprises 0.001% to 30% of single-walled carbon nanotubes.

16. The method of claim 1 wherein single-walled carbon nanotubes comprise at least 50% to 60% to 70% to 80% to 90% to 95% of carbon nanotubes in the carbon nanotube-polymer composite.

17. The method of claim 1 wherein the carbon nanotube-polymer composite has an electrical resistance of less than $10^9$ ohm-cm, less than $10^8$ ohm-cm, less than $10^7$ ohm-cm, less than $10^6$ ohm-cm, less than $10^5$ ohm-cm, less than $10^4$ ohm-cm, less than $10^3$ ohm-cm, less than $10^2$ ohm-cm, or less than $10^1$ ohm-cm.

18. The method of claim 1 wherein the carbon nanotube-polymer composite has at last a 10-fold increase in dynamic melt viscosity when measured at 0.1 rad/sec.

19. A carbon nanotube-polymer composite produced by the method of claim 1.

20. A method of preparing a carbon nanotube-polymer composite, comprising:
    providing a metal catalyst, the metal catalyst comprising a metal disposed upon a support material, and wherein the metal catalyst has been treated to convert the metal catalyst into a metal catalyst-polymerization catalyst;
    exposing the metal catalyst-polymerization catalyst to carbon nanotube-catalyzing conditions to form single-walled carbon nanotubes on the metal catalyst-polymerization catalyst, thereby producing a carbon nanotube-polymerization catalyst; and
    combining the carbon nanotube-polymerization catalyst with at least one monomer and initiating polymerization thereof to form the carbon nanotube-polymer composite.

21. The method of claim 20 wherein the metal catalyst-polymerization catalyst is a Ziegler-Natta catalyst.

22. The method of claim 20 where the metal catalyst-polymerization catalyst is a Phillips catalyst.

23. The method of claim 20 wherein the metal catalyst-polymerization catalyst is a metallocene catalyst.

24. A carbon nanotube-polymer composite produced by the method of claim 20.

25. A method of preparing a carbon nanotube-polymer composite, comprising:
    providing a solvent suspension of single-walled carbon nanotubes in an aqueous or organic solvent wherein the single-walled carbon nanotubes have been dispersed within the solvent suspension to form a carbon nanotube-solvent dispersion;
    incorporating the carbon nanotube-solvent dispersion into a gel matrix forming a carbon nanotube-oxide or a carbon nanotube-hydroxide and drying the gel matrix to form dried carbon nanotube-oxide/hydroxide particles;
    treating the dried carbon nanotube-oxide/hydroxide particles to convert them into carbon nanotube-polymerization catalysts; and
    combining the carbon nanotube-polymerization catalysts with at least one monomer and initiating polymerization of the monomer thereby forming the carbon nanotube-polymer composite.

26. The method of claim 25 wherein the carbon nanotube-polymerization catalyst is a Ziegler-Natta catalyst.

27. The method of claim 25 wherein the carbon nanotube-polymerization catalyst is a Phillips catalyst.

28. The method of claim 25 wherein the carbon nanotube-polymerization catalyst is a metallocene catalyst.

29. The method of claim 25 wherein the carbon nanotubes have been dispersed within the carbon nanotube-solvent dispersion via ultrasonication.

30. The method of claim 25 wherein the monomer comprises at least one of ethylene, propylene, 1-butene, 1-pentene, 1-hexene, 1-heptene, 1-octene, 4-methypent-1-ene, 1-decene, 1-dodecene, 1-hexadecene, polyenes, 1,3-hexadiene, 1,4-hexadiene, butadiene, cyclopentadiene, dicyclopentadiene, ethylidene norbornene, 4-vinylcyclohex-1-ene, dicyclopentadiene, 1,5-cyclooctadiene, 5-vinylidene-2-norborene and 5-vinyl-2-norbornene, styrenes, isoprenes, adipic acids, hexamethylene diamines, urethanes, acrylic acids, acrylates, such as methyl methacrylate, butyl methacrylate, lauryl methacrylate, dodecyl methacrylate, and stearyl methacrylate, acrylamides, acryonitrile, vinyl chlorides, vinyls, vinyl benzyl chloride, vinyl acetate, acetates, arylacetylenes, fluorinated arylacetylenes, ethylene glycols, terephthaltes, chlorinated hydrocarbons, fluorinated hydrocarbons, diiocyanates, dichlorides, epoxy resins (e.g., diamine/diepoxide) and bisphenol A (BPA), or combinations thereof.

31. The method of claim 25 wherein the carbon nanotube-polymer composite comprises a copolymer.

32. The method of claim 25 further comprising adding a cocatalyst to the carbon nanotube-polymerization catalyst.

33. The method of claim 25 wherein the single-walled carbon nanotubes comprise at least 50% to 60% to 70% to 80% to 90% to 95% of carbon nanotubes in the carbon nanotube-polymer composite.

34. The method of claim 25 wherein the carbon nanotube-polymer composite has an electrical resistance of less than $10^9$ ohm-cm, less than $10^8$ ohm-cm, less than $10^7$ ohm-cm, less than $10^6$ ohm-cm, less than $10^5$ ohm-cm, less than $10^4$ ohm-cm, less than $10^3$ ohm-cm, less than $10^2$ ohm-cm, or less than $10^1$ ohm-cm.

35. The method of claim 25 wherein the carbon nanotube-polymer composite comprises 1 to 99.99% polymer.

36. The method of claim 25 wherein the carbon nanotube-polymer composite comprises 0.001% to 30% of single-walled carbon nanotubes.

37. The method of claim 25 wherein the carbon nanotube-polymer composite has at least a 10-fold increase in dynamic melt viscosity when measured at 0.1 rad/sec.

38. A carbon nanotube-polymer composite produced by the method of claim 25.

39. A method of preparing a carbon nanotube-polymer composite, comprising:
    providing single-walled carbon nanotubes in an organic solvent wherein the single-walled carbon nanotubes are dispersed within the organic solvent to form a carbon nanotube-solvent dispersion;
    dissolving a polymer with the carbon nanotube-solvent dispersion to form a carbon nanotube-polymer-solvent dispersion; and
    combining the carbon nanotube-polymer-solvent dispersion with a precipitating agent thereby causing instantaneous precipitation of a carbon nanotube-polymer within the organic solvent, wherein the carbon nanotubes are highly dispersed within the polymer of the carbon nanotube-polymer composite.

40. The method of claim 39 wherein the precipitating agent is an oxygenate compound selected from the group consisting of acetone, water, formaldehyde, acetic acid, and an alcohol such as methanol, ethanol, isopropyl alcohol, propanol, and butanol, and combinations thereof.

41. The method of claim 39 wherein the volume of the precipitating agent has at least an equal volume to volume of carbon nanotube-polymer-solvent dispersion.

42. A carbon nanotube-polymer composite produced by the method of claim 39.

* * * * *